US007570165B2

(12) United States Patent
Abraham, Jr. et al.

(10) Patent No.: US 7,570,165 B2
(45) Date of Patent: Aug. 4, 2009

(54) RADIO FREQUENCY IDENTIFICATION APPLICATION SYSTEM

(75) Inventors: Thomas C. Abraham, Jr., Dallas, TX (US); Daniel J. Ahearn, Highland Village, TX (US); Chandrakumar Bhumireddy, Coppell, TX (US); Dean L. Frew, McKinney, TX (US); Balaraju Velupula, Coppell, TX (US); Matthew D. Wilson, McKinney, TX (US)

(73) Assignee: Xterprise, Incorporated, Carrollton, TX (US)

( * ) Notice: Subject to any disclaimer, the term of this patent is extended or adjusted under 35 U.S.C. 154(b) by 447 days.

(21) Appl. No.: 11/364,675

(22) Filed: Feb. 28, 2006

(65) Prior Publication Data

US 2006/0212164 A1 Sep. 21, 2006

Related U.S. Application Data

(60) Provisional application No. 60/657,023, filed on Feb. 28, 2005.

(51) Int. Cl.
 *G08B 13/14* (2006.01)
 *G06K 7/10* (2006.01)
(52) U.S. Cl. .............................. 340/572.1; 235/462.01
(58) Field of Classification Search ............ 340/539.26, 340/10.41, 10.1, 10.2, 572.1–572.9; 235/462.01, 235/462.07; 700/225; 705/28
 See application file for complete search history.

(56) References Cited

U.S. PATENT DOCUMENTS 5,594,384 A    1/1997   Carroll et al.

6,307,517 B1   10/2001  Lee
6,377,176 B1    4/2002  Lee
6,853,087 B2    2/2005  Neuhaus et al.
7,114,655 B2 * 10/2006  Chapman et al. ........ 235/462.01
2006/0212141 A1  9/2006  Abraham et al.

OTHER PUBLICATIONS

"Technical Report: 860 MHz-930 MHz Class I Radio Frequency Identification Tag Radio Frequency & Logical Communication Interface Specification Candidate Recommendation," Version 1.0.1, Nov. 14, 2002, 18 pp., Auto-ID Center, Massachusetts Institute of Technology, Cambridge, MA.
"Whitepaper: EPCglobal Class 1 Gen 2 RFID Specification," 2005 (approved Dec. 2004), 7 pp., http://www.alientechnology.com/docs/AT_wp_EPCGlobal_WEB.pdf, Alien Technology Corporation, Morgan Hill, CA.

* cited by examiner

*Primary Examiner*—Benjamin C Lee
*Assistant Examiner*—Sigmund Tang
(74) *Attorney, Agent, or Firm*—Slater & Matsil, L.L.P.

(57) ABSTRACT

A radio frequency identification ("RFID") application system for use with an RFID system adapted to apply an RFID tag to a product and method of operating the same. In one embodiment, the RFID application system includes a printer applicator controller configured to manage an operation of a printer applicator of the RFID system. The RFID application system also includes a compliance manager configured to coordinate RFID compliance data to derive a unique identification number for the RFID tag. The RFID application system still further includes an event manager configured to coordinate an operation of the printer applicator controller to facilitate proper placement of the RFID tag on the product.

30 Claims, 65 Drawing Sheets

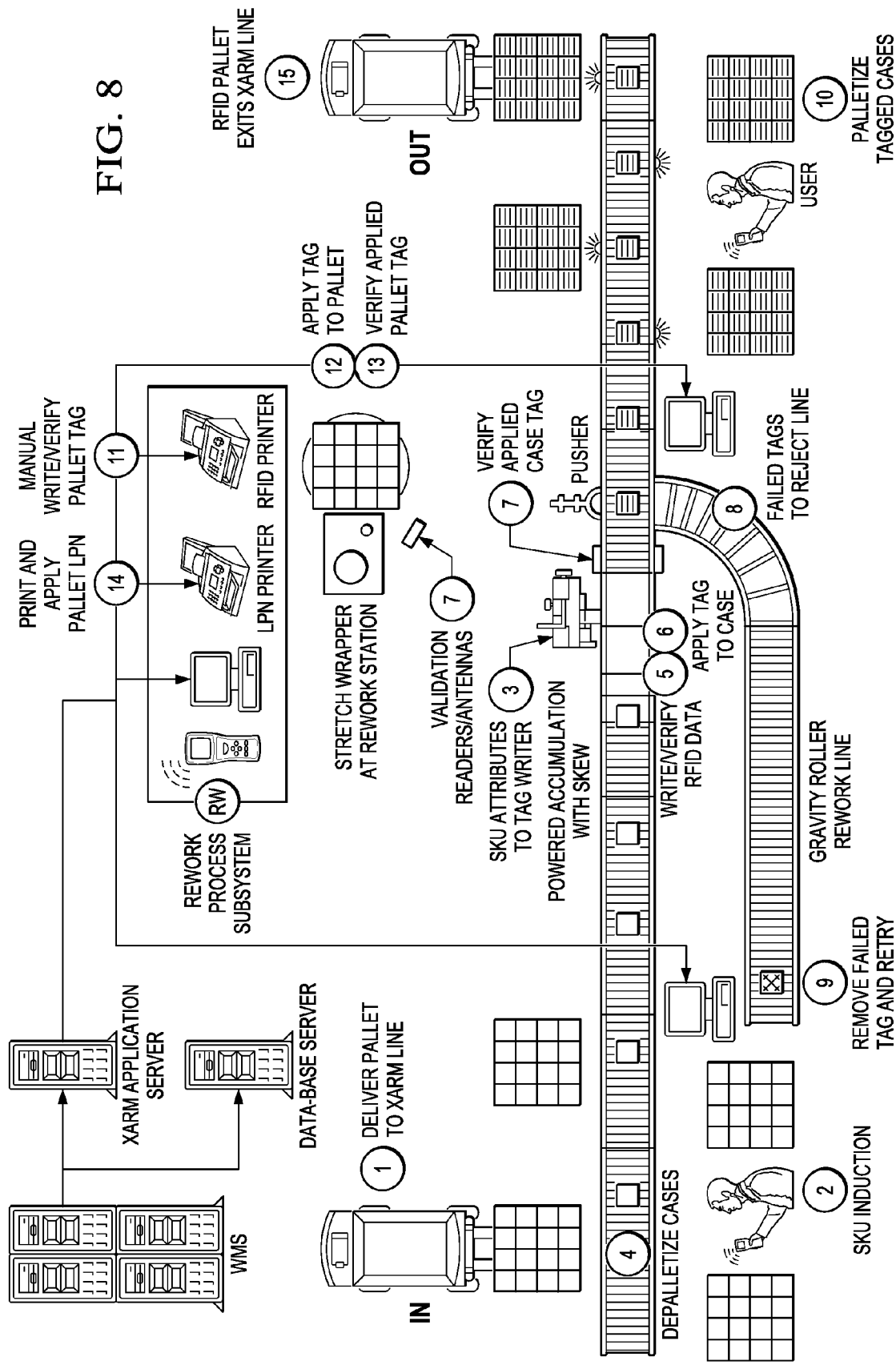

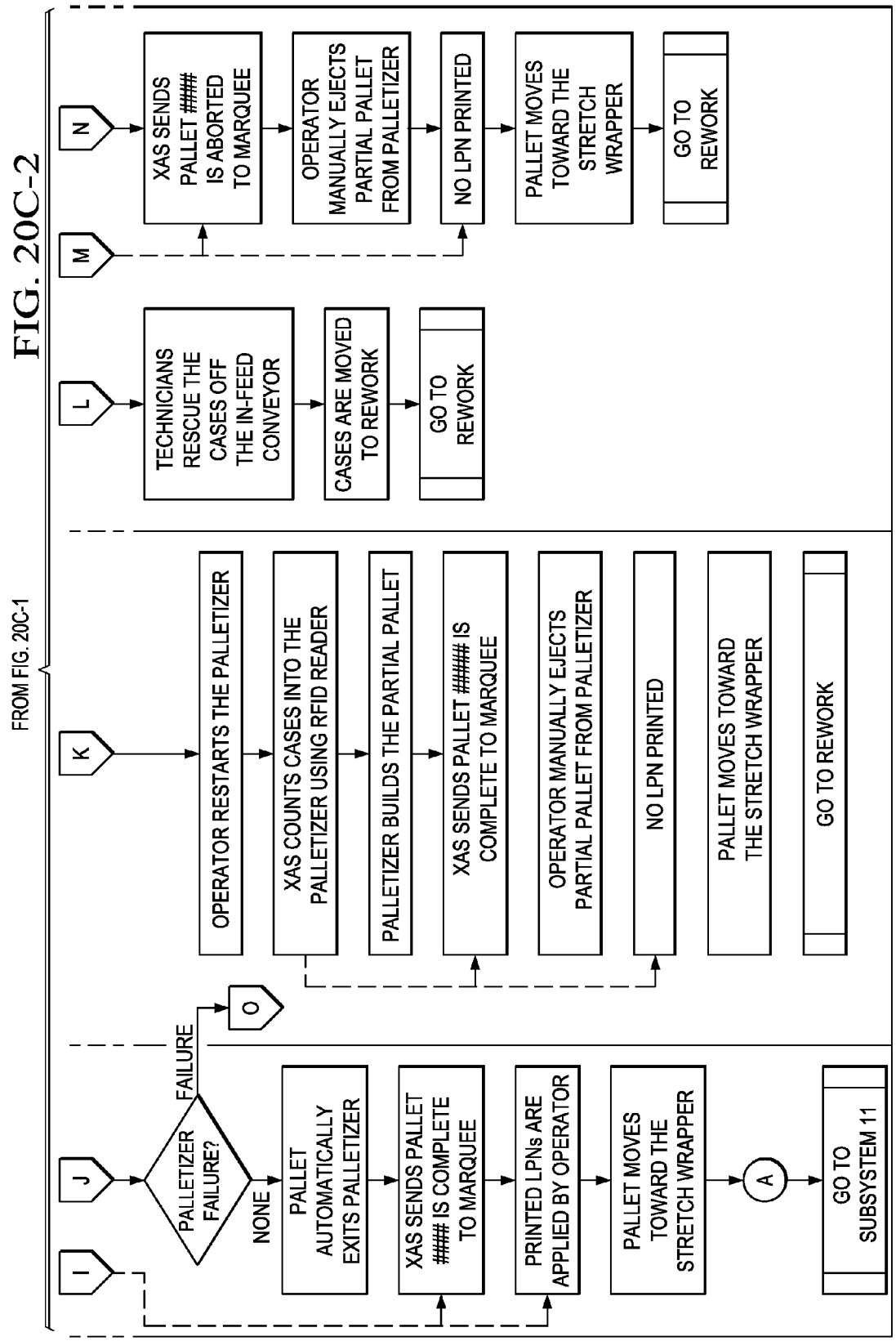

FIG. 20D

Outbound Operation — SKU:QO07690 - CGB LOW FAT CHOCOLATE CHUNK

1. Confirm properly tagged case
2. Remove case from conveyor
3. Stack cases according to the TI HI diagram
4. Confirm when pallet is built

| Rejected Cases | 0 |
|---|---|
| Validated Cases | 0 |
| Total Cases to be on Pallet | 75 |

ⓘ Pallet Completed
Completed Validating Pallet CGB LOW FAT CHOCOLATE CHUNK

1. Remove all the cartons from current outbound pallet station
2. Finish building the TI-HI for the current pallet
3. Press OK Button when ready for building the TI-HI for next pallet

OK

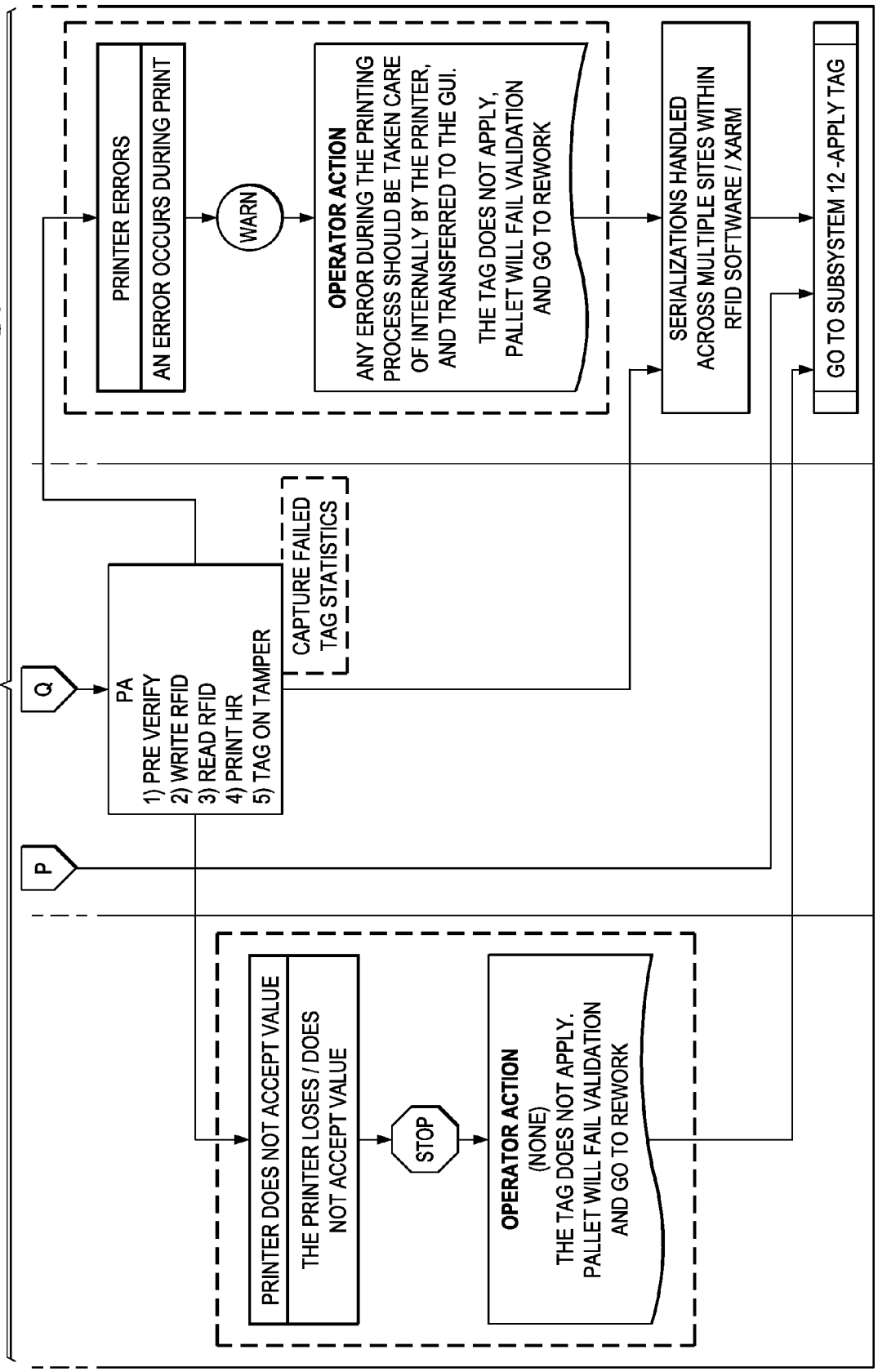

FIG. 21D

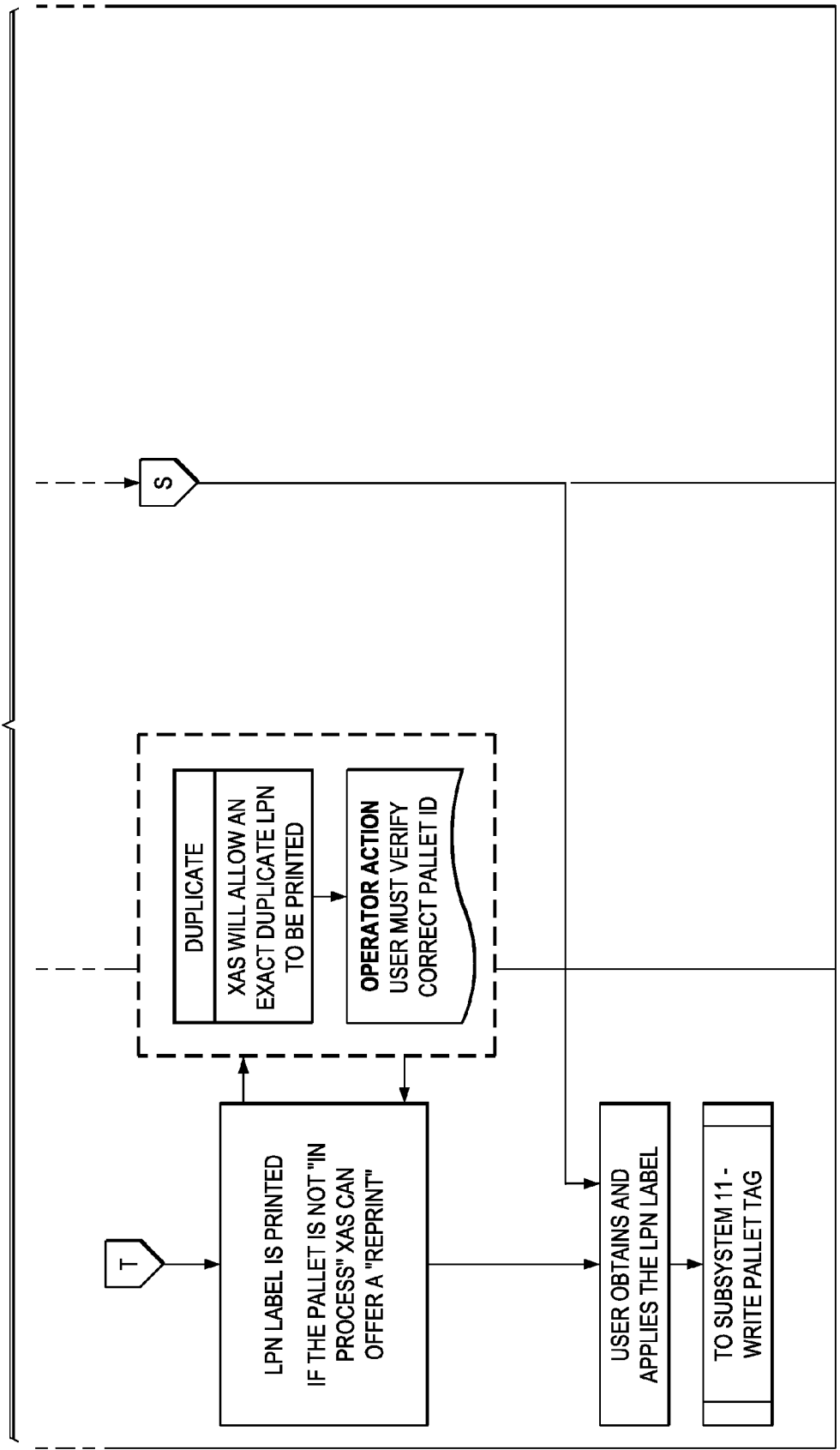

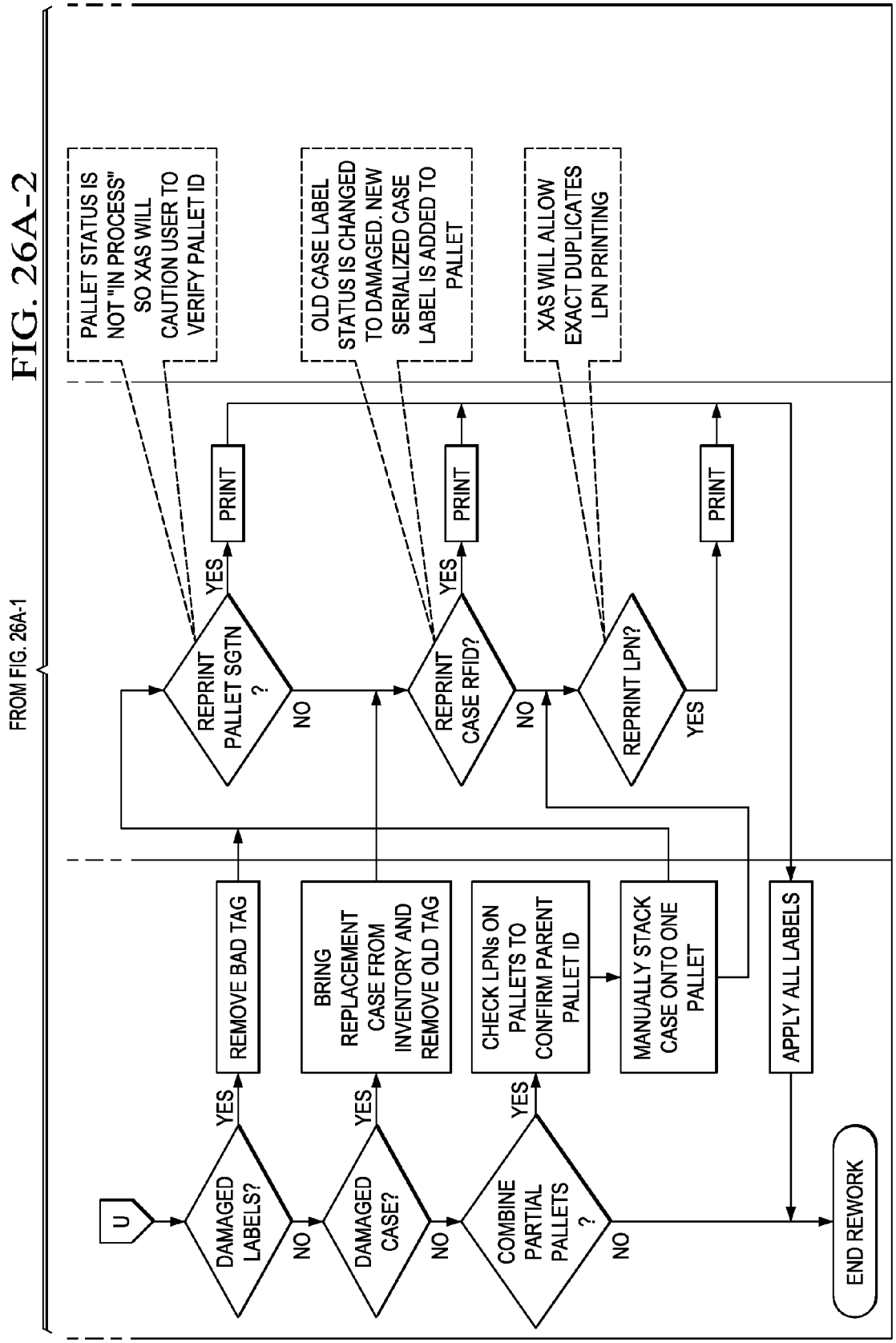

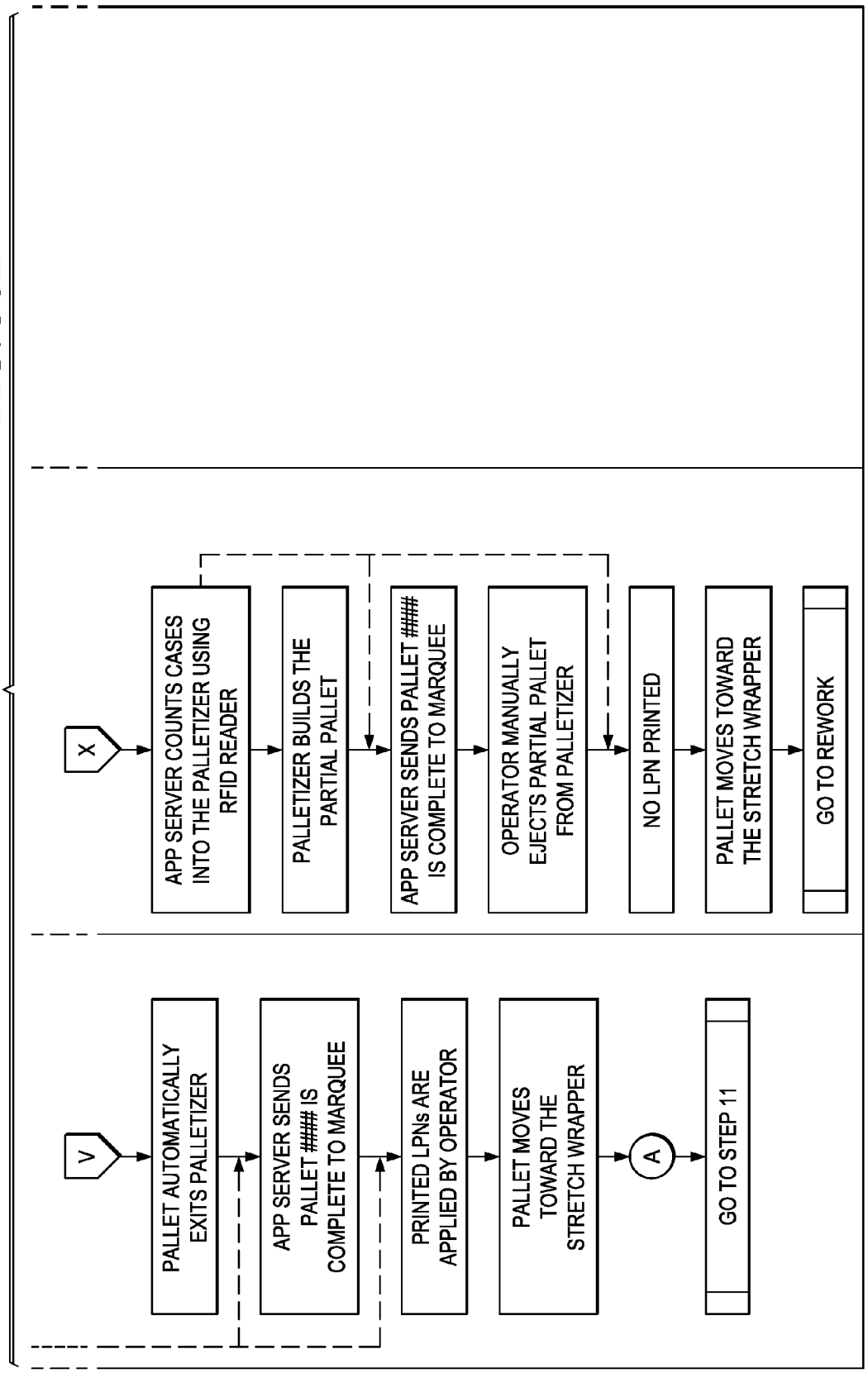

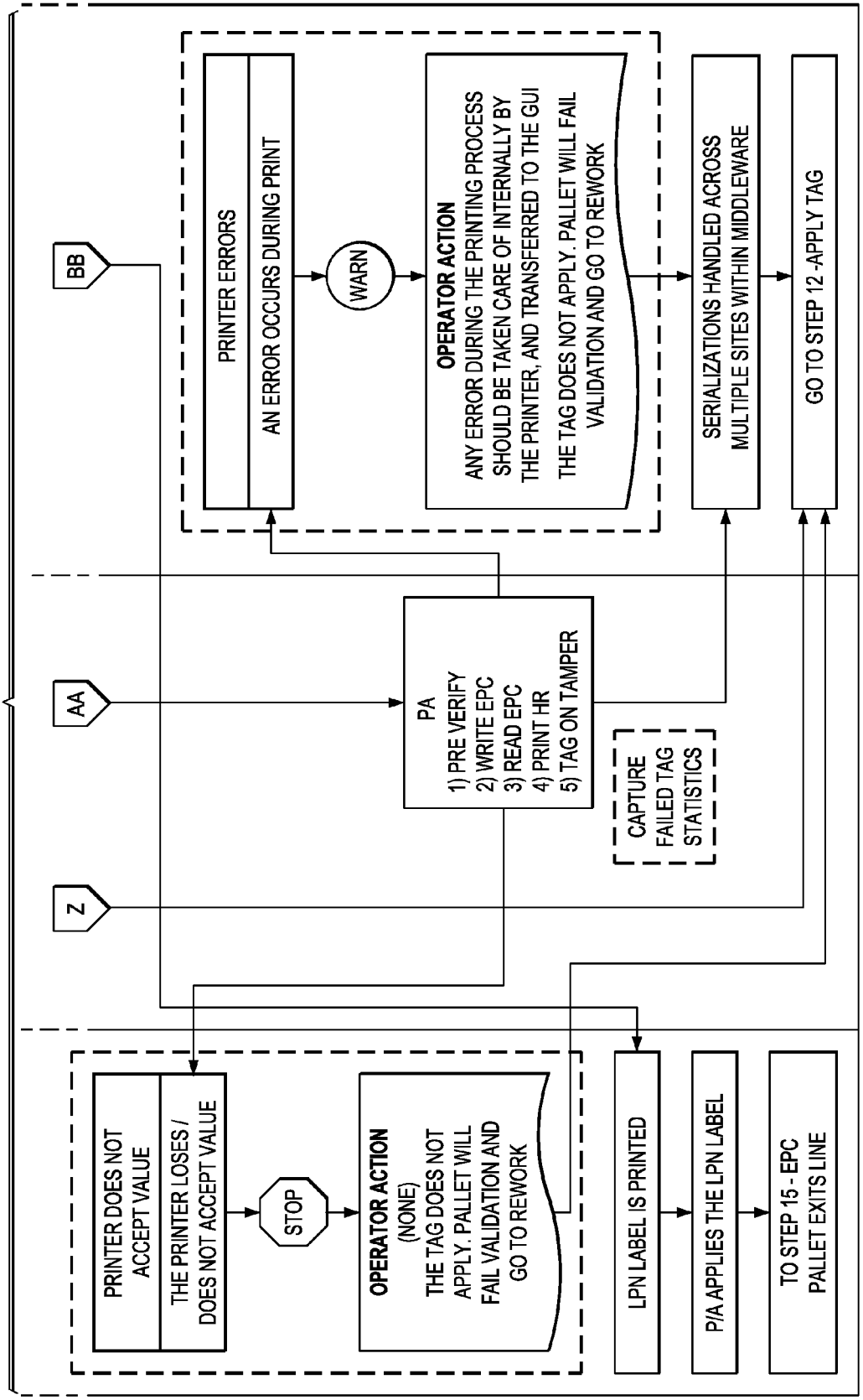

RADIO FREQUENCY IDENTIFICATION APPLICATION SYSTEM

This application claims the benefit of U.S. Provisional Application No. 60/657,023, entitled "Automated RFID Supply Chain Management System," filed on Feb. 28, 2005, which is incorporated herein by reference.

TECHNICAL FIELD

The present invention is directed, in general, to radio frequency identification ("RFID") systems and, in particular, to an RFID application system and method of operating the same.

BACKGROUND

Radio frequency identification ("RFID") systems include RFID readers communicating with RFID tags via radio waves. The RFID readers send radio signals via antennas, which are received by the RFID tags. The RFID tags may be passive, semi-active or active. The passive RFID tags are the most common and least costly and derive energy for operation from the transmitted signal from the RFID reader thereby illuminating the RFID tag. The semi-active and active RFID tags have independent power sources for processing functions and for independent or enhanced transmit functions. After the RFID tag receives enough energy to respond, and the proper interrogation sequence is generated by An RFID reader, the RFID tag replies with information (e.g., payload information) thereabout, which is usually a unique identification number (also referred to as an "ID") or other information available to the RFID tag. The RFID reader receives the identification number from the RFID tags in response to the transmitted signal by the RFID reader.

For purposes of a brief introduction, FIGS. 1 to 6 illustrate diagrams introducing foundational concepts regarding RFID technologies and the use thereof in the supply chain management of the retail industry or other industries. Referring initially to FIGS. 1A and 1B, illustrated are diagrams of typical RFID tags, of which other physical configurations are possible. The RFID tags each typically include an RFID microchip 110, a chip carrier or strap 120 and an antenna 130. As an example regarding passive RFID tags, the RFID tag collects the radiated energy of the transmitted signal from an RFID reader and uses the collected energy to control a modulation thereof within the RFID microchip 110. By changing an impedance of the antenna 130 of the RFID tag, the incident signal is either substantially reflected back to the RFID reader or it is not. This basic modulation mechanism is used in RFID applications from tracking motor vehicles on toll roads to tracking animals.

Turning now to FIG. 2, illustrated is a perspective view of an RFID tag 210 embedded within a standard paper adhesive label 220 and applied to a product (e.g., case) 230. The aforementioned application is a common application for RFID technologies in supply chain management, but RFID tag only applications (i.e., without the label) are also used. Regarding FIGS. 3A to 3D, illustrated are diagrams demonstrating an operation of an RFID reader 310 and RFID tag 330. FIG. 3A illustrates the RFID reader 310 transmitting a signal through an antenna 320 to an RFID tag 330 on a product (e.g., case) 340. FIG. 3B illustrates the RFID tag 330 absorbing the signal from the transmitted inbound signal from the RFID reader 310. FIG. 3C illustrates the RFID tag 330 using the collected energy to control a modulation of the transmitted signal and, by altering the impedance of an antenna thereof, the RFID tag 330 modulates the amount of the reflected signal (and data available to the RFID tag 330) back to the RFID reader 310. The term modulation generally refers to a range of techniques for encoding information on a carrier signal (e.g., a sine-wave signal) and is typically performed by a modulator. FIG. 3D illustrates the RFID reader 310 sending information associated with the RFID tag 330 back to a computer 350 so that the information can be used for other applications.

The RFID tags typically include an identification number stored in memory of a microchip thereof in a format consistent with EPCGlobal or other standards such as International Organization for Standardization ("ISO") ISO18006. A few examples of industry recognized standards include EPCGlobal release EPC Specification for Class 1 Gen 1 RFID Specification, November 2002 and EPC Specification for Class 1 Gen 2 RFID Specification, December 2004 (see, also, a related publication entitled "Whitepaper: EPCglobal Class 1 Gen 2 RFID Specification," published by Alien Technology Corporation, Morgan Hill, Calif., 2005), which are incorporated herein by reference. An example of an identification number is a serialized global trade identification number ("SGTIN") conforming to an EPCGlobal standard Class 1 Gen 1 96 bit RFID tag. For instance, the SGTIN "01 1234567 123456 123456789" includes a header "01," a manufacturer code "1234567," a object class "123456," and a serial number "123456789." The SGTIN provides an example of an identification number for an application of RFID technologies to supply chain management.

Significant compliance mandates are being placed on the use of RFID technologies for use in tracking products of all types. Present systems are unable to satisfy the mandates, in general, and if the systems approach satisfying such mandates, the cost thereof is prohibitive. Retailers are now adopting RFID technologies across a broad range of products and placing mandates on suppliers to provide products with RFID tags (and potentially a label) on cases and pallets of products with stock keeping unit identifiers ("SKUs"). An SKU is a unique name or number assigned to a product for ease of use and tracking throughout manufacturing and supply chain management systems. Present mandates provide that the RFID tags be encoded with unique values and follow prescribed RFID standards set by the standards body of choice by the customers. In addition, no single standard enjoys universal acceptance, so multiple standards are being adopted.

Turning now to FIGS. 4 and 5, illustrated are diagrams demonstrating scan points for a distribution center and retail location, respectively, for a supply chain network. Major retailers (e.g., Wal-Mart) are leading the RFID mandates and the Department of Defense ("DoD") and the healthcare industry, among others, are following their lead with RFID requirements on cases and pallets of shipped products. Present plans for initial rollouts include scan points at five places in the supply chain network including two at a distribution center (including a receiving location 410 and a shipping location 420 as illustrated in FIG. 4) and three at a retail location (including a receiving location 510, entrance to a retail floor 520 and a trash compactor 530 as illustrated in FIG. 5). Future plans will increase and refine tracking and tracking locations. Requirements of this type are disruptive to suppliers' operations, systems, personnel, costs and schedules. In addition, RFID mandates have imposed constraints on the suppliers and the constraints have generated additional problems as described below.

Attempts to respond to the basic changes in the supply chain management have not been successful. Suppliers have implemented various manual processes to meet the compliance requirements, which have proven to be costly, inefficient, and prone to errors that are difficult to detect and correct. Compounding the problem is the fact that future requirements will be more extensive (more RFID-enabled distribution centers, SKUs and suppliers) than those now in place and these will only further aggravate the problem. In light thereof, existing solutions concentrate on more hardware and labor to address the problem, which only ramps up the amount of losses incurred to implement the processes and further aggravates the issues of error checking, error detection and error correction. Additionally, expanding the manual approaches is not efficiently scalable or tenable.

Turning now to FIG. 6, illustrated is a diagram demonstrating a manual process for the application of an RFID tag on a product (e.g., a case and a pallet). The manual process is performed by a computer operator 610 operating a computer 620 with a spreadsheet and an RFID label printer with integrated reader 630 printing labels (one of which is designated 640) with RFID tags for manual application by another operator 650 on an RFID-tagged case 660 and an RFID-tagged pallet 670. A case designated 680 is a non-RFID-tagged case and a pallet designated 690 is a non-RFID-tagged pallet. The illustrated approach provides a single pallet going through the manual process, of which the manual process becomes exponentially more difficult as multiple pallets and cases are added thereto.

The manual process provides a first step toward the growth of RFID technologies. For instance, the manual process enables the encoding of RFID tags (at the case and pallet level), allows operators to print onto a human readable label, and enables RFID tags to be manually applied to cases and pallets. The manual process also allows operators to track the identification numbers for the products and the numeric constructions for the products and customers via a spreadsheet. It is possible, however, that the same product will have to be encoded to different standards depending upon the customer. While the manual process allows businesses to scale, it is labor and hardware intensive and leads to a proportional increase in errors associated with the application of the RFID tags on products and the like.

While the manual process provides some advantages, such a manual process is not conducive to a full scale proliferation of RFID technologies, especially in supply chain management. For instance, the manual process does not automatically qualify a uniqueness of case and pallet identification numbers (also referred to as "case identifier or case ID" and "pallet identifier or pallet ID," respectively). Additionally, the manual process does not automatically integrate with external systems such as enterprise resource planning ("ERP") systems and warehouse management systems ("WMS") to make RFID standards determinations. The manual process also does not readily integrate multiple disparate systems and aggregate the case identification number and pallet identification number associations automatically. For compliance, it is beneficial to know which unique case ID is assigned to each unique pallet ID. As an example, suppose a pallet ID "123456789" is associated with case IDs "1001," "1002," to "1050." If the pallet ID is read at a scan point, it would be beneficial to know that 50 case IDs are associated therewith. In much the same way, if any case ID of the 50 unique case identification numbers was read, it would be beneficial to know the pallet identification number "123456789" by default. Again, the manual process does not provide such a tracking capability for the supply chain management system.

The manual processes exhibit many other limitations as hereinafter provided. For instance, the manual process does not instruct personnel of proper RFID tag placement, which is very different from barcode labels that require line of sight to work. The RFID tags also depend on RFID friendliness or physical characteristics of the product being tagged, and the placement of the RFID tag is important for acceptable performance. In accordance therewith, the manual process does not automatically apply labels to cases and qualify RFID tag placement tolerances. In addition, the manual process does not control the material handling equipment ("MHE") systems to perform automation and integrate with other automated systems including MHE devices such as conveyers and forklifts used to move products in the supply chain. The manual process further does not align cases for automatic RFID tag application and send shipment information to a receiver. In accordance therewith, the manual process does not validate applied case and pallet RFID tags and automate the handling of rejected RFID tags (e.g., for encoding failures). The aforementioned limitations associated with the manual processes detract from the proliferation of RFID technologies in, for instance, the supply chain management systems.

Accordingly, what is needed in the art is a system and method that addresses the above issues in a cost effective manner that is scalable and capable of being integrated into existing manufacturing and distribution center processes concentrating on supply chain management and other applications.

SUMMARY OF THE INVENTION

These and other problems are generally solved or circumvented, and technical advantages are generally achieved, by advantageous embodiments of the present invention that include a radio frequency identification ("RFID") application system for use with an RFID system adapted to apply an RFID tag to a product and method of operating the same. In one embodiment, the RFID application system includes a printer applicator controller configured to manage an operation of a printer applicator of the RFID system. The RFID application system also includes a compliance manager configured to coordinate RFID compliance data to derive a unique identification number for the RFID tag. The RFID application system still further includes an event manager configured to coordinate an operation of the printer applicator controller to facilitate proper placement of the RFID tag on the product.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 8 and 9 illustrate system level diagrams of embodiments of RFID systems including embodiments of RFID application systems constructed according to the principles of the present invention;

FIGS. 10 to 26 illustrate flow diagrams and screen shots demonstrating exemplary steps associated with the RFID systems of FIGS. 8 and 9.

DETAILED DESCRIPTION OF ILLUSTRATIVE EMBODIMENTS

Figure 1A:
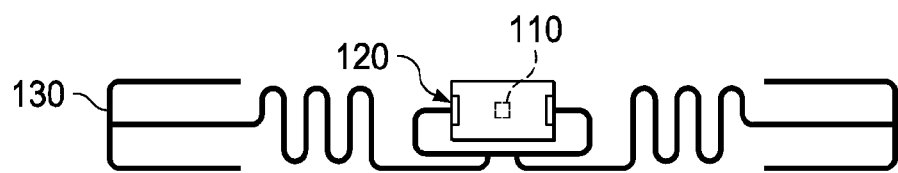
FIGS. 1 to 6 illustrate diagrams introducing foundational concepts regarding RFID technologies and the use thereof in supply chain management of the retail industry that provides an environment for an application of the principles of the present invention.
Figure 1B:
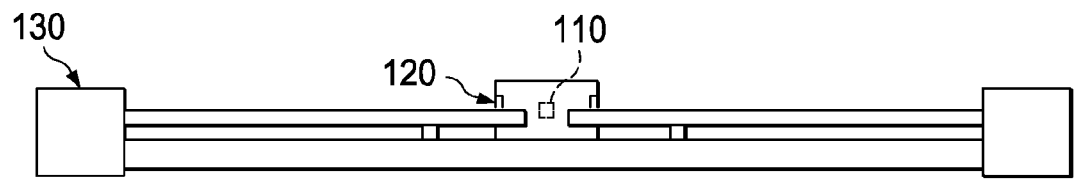

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. Unless otherwise provided, like designators for devices employed in different embodiments illustrated and described herein do not necessarily mean that the similarly designated devices are constructed in the same manner or operate in the same way.

The present invention will be described with respect to an exemplary embodiment in a specific context, namely, an RFID application system within an RFID system. The particular embodiments described herein are applied supply chain management systems in the retail industry. The principles of the present invention may be applied to other applications and industries such as the defense industry and healthcare market. The RFID application system (also referred to as "Xterprise Automated RFID Module" or "XARM") addresses the limitations as described above with pragmatic automation of inefficient processes to achieve accurate compliance. In addition to automated compliance, the RFID application system automates error handling, integrates disparate systems, and has a modular design to allow for different functions as well as different physical size options.

When RFID compliance was first imposed on suppliers, there was little equipment available to meet compliance mandates. The way to comply was to obtain an RFID-enabled printer, converted tags (RFID tags embedded in label stock), and start printing and encoding RFID tags. The encoded values were maintained manually in a spreadsheet or a stand-alone software package. Operators would print and encode labels, peel them and apply them to single cases on a pallet. The aforementioned process leads to extensive material handling of the cases, detailed level control of the RFID labels, and pallet control of the cases (case-level tracking provides that cases physically stay associated with the pallet RFID tag like a parent-child relationship).

As mentioned above, the problem with this method is that it is inaccurate, inefficient, and stand-alone, thereby not completing every task desired for compliance. True system integration including software integration is absent from this model; the requirements were solved via manual data entry and manual data manipulation, both prone to error. The manual solution is also expensive (hardware and labor intensive) for higher volumes of RFID tagging specifications, which is inevitable with the adoption of RFID technologies in different vertical markets. As higher volume specifications are placed on suppliers, the manual solution is more labor and more printers that increase their costs and errors.

The RFID application system solves the aforementioned problems with a modular approach to RFID mandates. Designed with separate functional subsystems and modules, the RFID application system solves compliance mandates automatically. The RFID application system may be employed in any number of environments including supply chain management systems that include a distribution center providing depalletization, RFID tagging, and then repalletization (or palletization). Depalletization refers to the unstacking of palletized cases to singulate the cases for RFID tagging or any other process. Repalletization refers to re-stacking of cases that were depalletized. It is also referred to as "palletization," but palletization usually refers to the first time the cases were palletized (for example, at manufacturing). In accordance therewith, a pallet stand is an ergonomic material handling equipment that elevates or lowers pallets of cases to reduce the lifting requirement on the operator. While the processes may be automated, the material handling is primarily powered at the operator's command (usually by a foot pedal). Exemplary high-level components of an RFID system that includes an RFID application system include, without limitation, computer systems with a graphical user interface and including printers and applicators, RFID readers, RFID tags, conveyers and products (e.g., cases and pallets).

Figure 7:
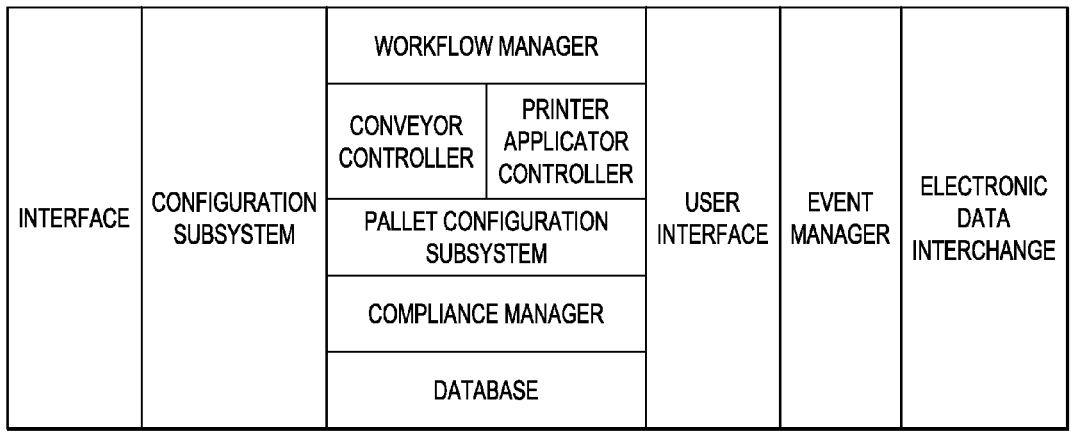
FIG. 7 illustrates a block diagram of an embodiment of an RFID application system employable with an RFID system constructed according to the principles of the present invention.

Turning now to FIG. 7, illustrated is a block diagram of an embodiment of an RFID application system employable in an RFID system constructed according to the principles of the present invention. For each respective solution, the RFID application system is employed to accomplish tasks as defined by different customers. Each of the subsystems or modules of the RFID application system can be configured independently or dependent on another subsystem to achieve the goals of a pragmatic, scalable RFID compliant system. The RFID application system may be embodied in hardware, software and combinations thereof. The RFID application system includes an interface such as a legacy interface (designated "I/F"). Systems such as external systems often contain valuable information that is often employed by RFID compliance solutions. The interface provides connectivity or a conduit to the external systems for, without limitation, shipping information, WMS license plate number ("LPN"), and inventory data.

The RFID application system also includes a configuration subsystem (designated "CFG") that configures (e.g., setup for operation) systems such as printer applicators, material handling equipment ("MHE"), conveyors, RFID readers, etc. of the RFID system. The RFID application system further includes a workflow manager (designated "WFM") that derives workflow processes to satisfy business objectives associated with the RFID system. As a configurable subsystem, the workflow manager can accommodate any workflow processes and may be modified on the fly, as necessary, to allow for changes to the business objectives. A conveyer controller (designated "CC") of the RFID application system allows for real time control and management of a conveyor to stop/start products (e.g., cases), divert bad or rejected cases, and the like. Those skilled in the art realize that a conveyor controller may control all types of material handling equipment like diverters or reject equipment and is not limited to conveyors.

The RFID application system also in includes a printer applicator controller (designated "P/A") that controls and manages a printer/applicator/encoder device (also referred to as a "printer applicator") so that products are sent thereto in a systemically documented manner. The printer applicator controller further upgrades the accuracy of the application of the RFID tags on the products (e.g., cases). A pallet configuration subsystem (designated "PC") of the RFID application system directs a breakdown, building or rebuilding of the pallet, typically after depalletization. The pallet configuration subsystem may provide pictorial training diagrams on how to restack an RFID-tagged pallet.

An RFID compliance manager or compliance manager (designated "CMGR") controls and manages subsystems of the RFID application system to properly apply RFID compliance data within the RFID system. The RFID compliance manager coordinates the RFID compliance data to derive a unique identification number for an RFID tag for placement on a product such as a case. Status updates from RFID readers are recorded in accordance with the RFID compliance manager and documented in an organized fashion. The RFID compliance manager also allows for RFID reader firmware upgrades. The RFID application system also includes a database (designated "DB") that stores information such as the RFID compliance data as well as execution parameters for conveyor control. The database also stores product and customer information as needed to make for ease of use by operators.

A user interface (designated "UI") of the RFID application system directs operators on work instructions as well as provides a way for operators to maintain system data and a status of the operations of the RFID application system. The user interface typically includes a graphical user interface and a keyboard allowing an operator to gain access to or input data into the RFID application system and operations associated therewith. The user interface is especially beneficial when system maintenance is being performed. The RFID application system also includes an event manager (designated "EM") that coordinates an operation of systems (e.g., printer applicator controller) as a function of the workflow processes to facilitate proper placement of the RFID tags on the products at the proper time. As certain statuses of interest (customer-defined) arise during the operational process of RFID compliance for the RFID system, the events should be managed and handled as the customer defines, which may affect other subsystems unbeknownst to the operators. For example, if the printer applicator runs out of labels/RFID tags, the operator may receive a message to that effect, and the conveyor may stop sending cases thereto for RFID tagging.

An electronic data interchange (designated "EDI") of the RFID application system is employable when providing data (e.g., RFID compliance data) from the database to external systems via the interface, or vice versa. For example, if a supplier wants to send an RFID advanced shipment notice ("ASN") to a customer, the information in the database should be collected and sent to the external system. The aforementioned subsystems and modules of the RFID application system will hereinafter be further described in the environment of working examples of an RFID system. The RFID application system is an adaptable solution to RFID mandates. Its extensive capability allows for scalability, modularity in size and in function, and reduced operator training at costs favorably disproportionate to the utility added by the system. The following paragraphs will describe in some detail exemplary embodiments of RFID systems employing the RFID application system illustrating many options to meet customer mandates. The foregoing RFID systems are illustrative, but not exhaustive of the capabilities of the RFID application system and those skilled in the art will readily see that other embodiments and applications are possible and are well within the broad scope of the present invention.

Figure 9:
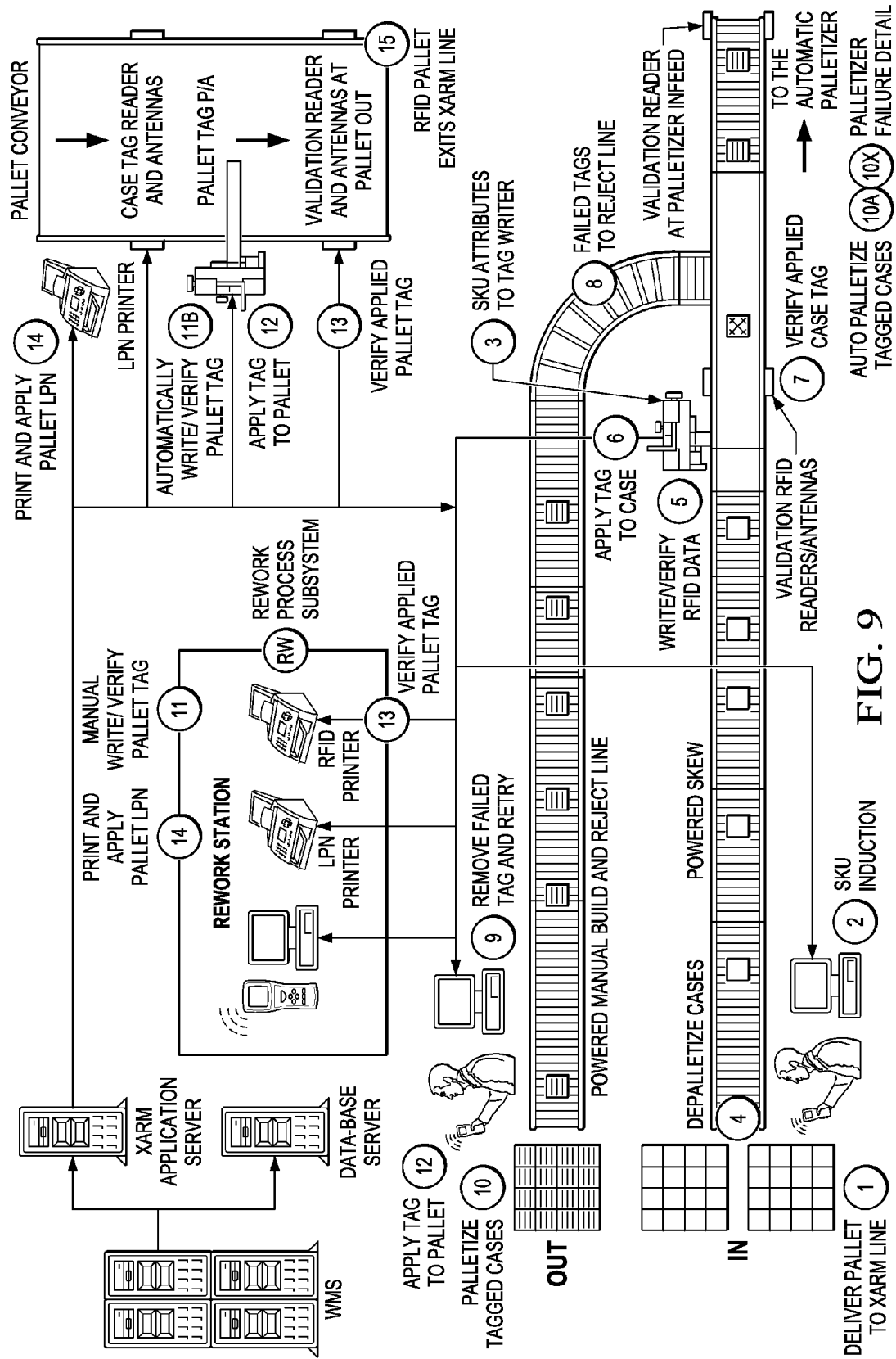

Turning now to FIGS. 8 and 9, illustrated are system level diagrams of embodiments of RFID systems including embodiments of RFID application systems constructed according to the principles of the present invention. The RFID systems illustrate exemplary methods by which the RFID application system applies RFID tags to products (e.g., cases). The RFID systems provide a distribution center model wherein depalletization of existing pallets for RFID tagging of the cases is performed. The RFID systems provide a solution for a manufacturing line associated with a supply chain management system that employ the principles of the RFID application system as described herein. Of course, the RFID systems described herein are exemplary embodiments to demonstrate some of the advantages associated with the RFID application system and the broad scope of the present invention is not so limited.

More specifically, FIG. 8 illustrates, at a high level, that external system integration exists to streamline a solution. The solution could contain more or less external system integration, for example, order management system ("OMS") integration if needed for shipment or production order information. An order management system is a general term used to identify the system in which a company manages, controls, or enters customer orders for fulfillment at a manufacturing plant or the distribution center. The RFID system of FIG. 9 differs from the aforementioned embodiment by adding an option for automated repalletization of the cases. It is possible that the RFID application system described herein may be directly applied at the manufacturing line to potentially eliminate the depalletization process altogether. The flow diagrams and screen shots that follow describe exemplary processes associated with the RFID systems to more comprehensively elucidate the advantages associated with the RFID application system.

Figure 10:
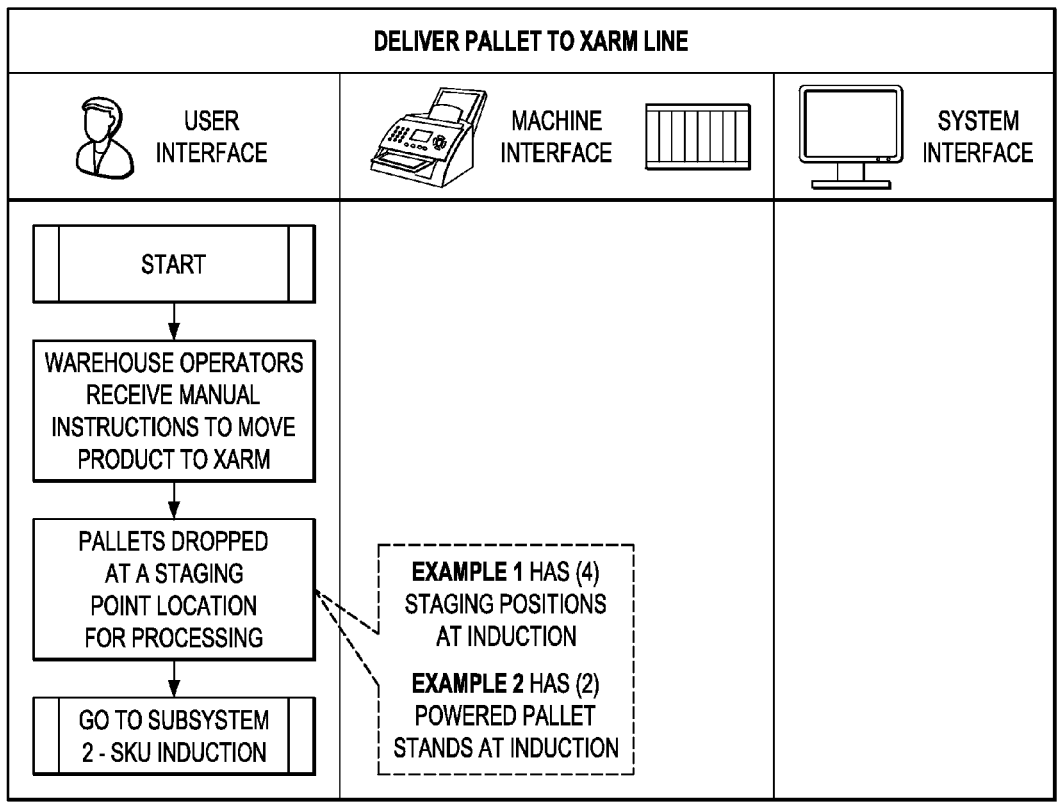

Turning now to FIGS. 10 to 26, illustrated are flow diagrams and screen shots demonstrating exemplary steps associated with the RFID systems of FIGS. 8 and 9. Beginning with FIG. 10, a pallet is delivered to a manufacturing line of the RFID system (designated step "1" in FIGS. 8 and 9). The pallet is moved to a staging point for processing in preparation for SKU induction. A warehouse management system ("WMS") or other driving system in conjunction with the RFID application system may direct the operators to move specified pallets within the manufacturing line. In yet another embodiment, in addition to systems integration to streamline the data flow, material handling equipment could also be added to convey the pallets to the operators for depalletization. The RFID system may incorporate additional automation with a robotic depalletizer, which is very beneficial with heavier products for RFID tagging and alleviates the problem of operator fatigue with products over, for instance, 35 pounds. The RFID application system handles the integration to such a depalletizer and other material handling equipment. It should be understood that many subsystems and modules within the RFID application system may be invoked to perform the aforementioned tasks and the tasks that follow. For instance, an interface to the external systems may be employed and a workflow manager and event manager may coordinate an operation of the material handling equipment.

Figure 11A:
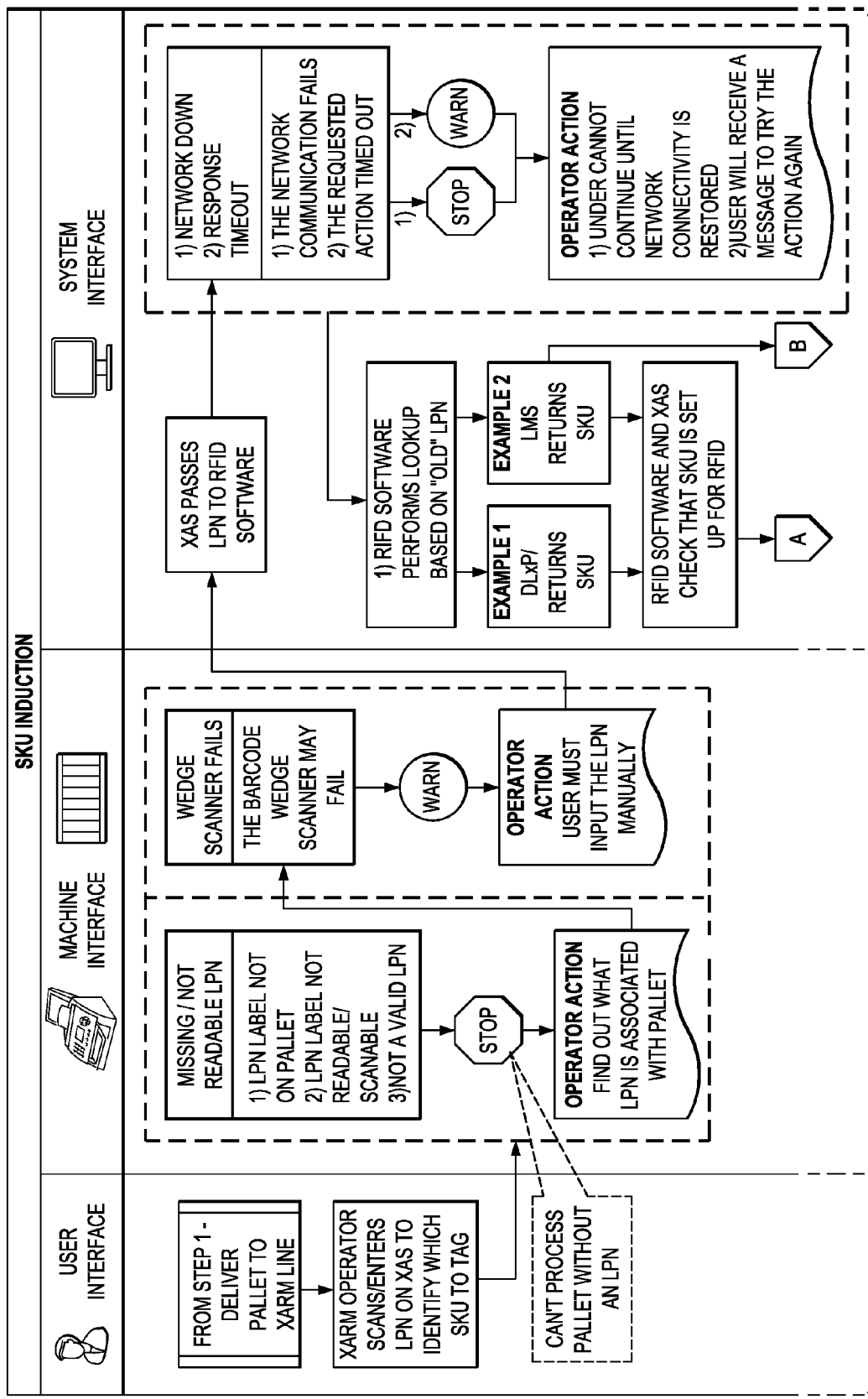
Figure 11B:
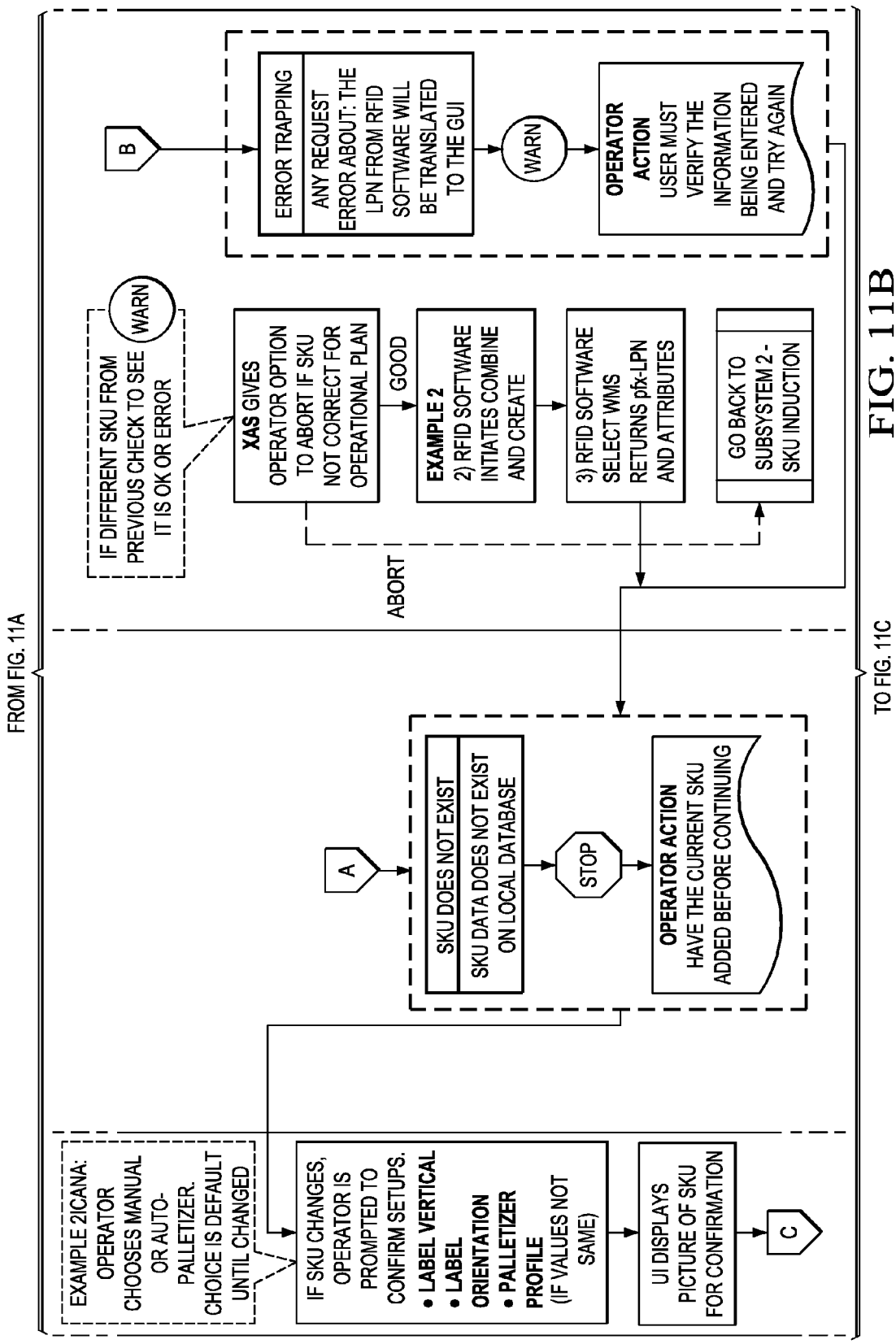
Figure 11C:
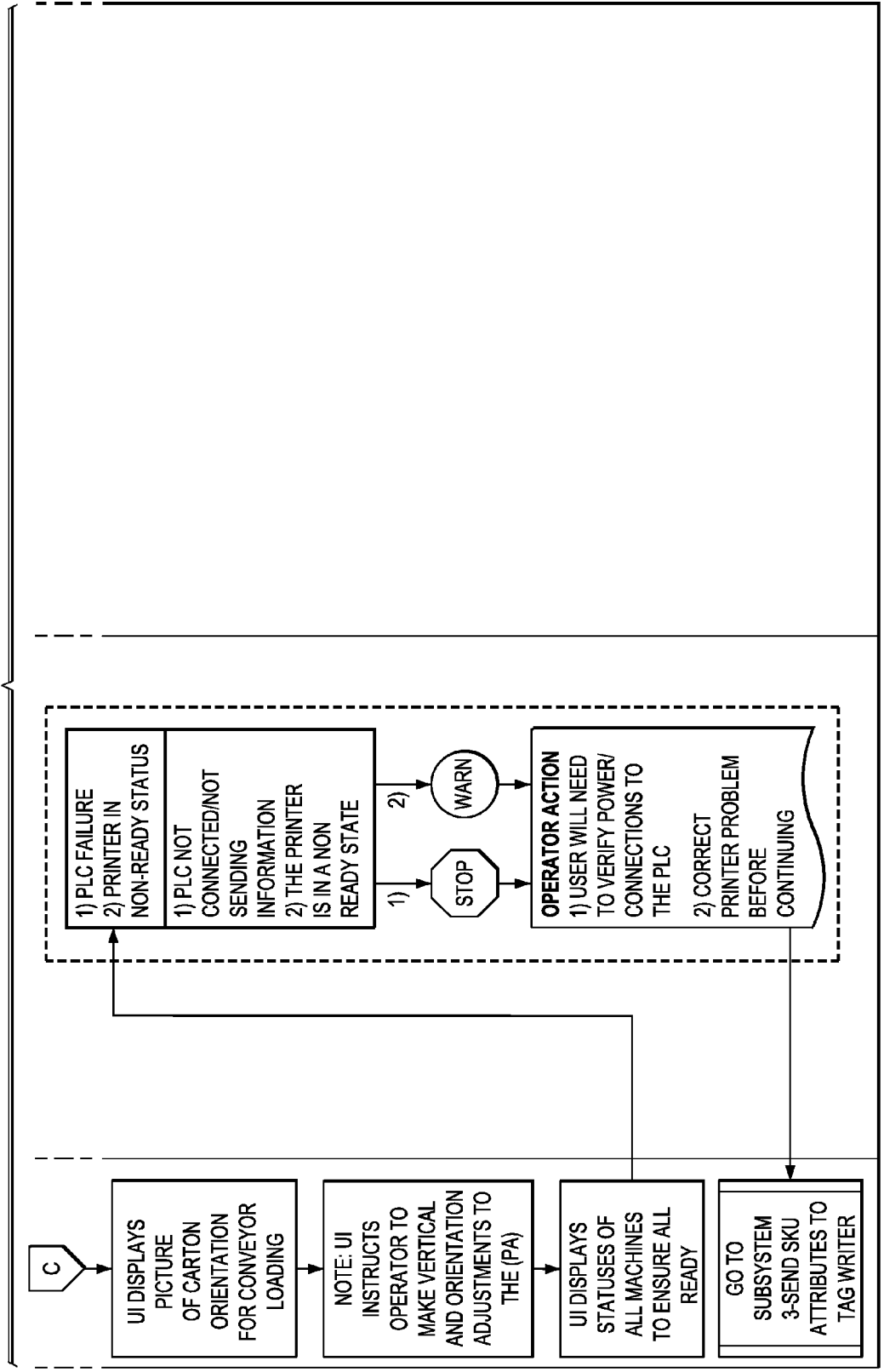

Turning now to FIG. 11 (collectively FIGS. 11A to 11C), illustrated is a flow diagram demonstrating SKU induction (referred to as "Subsystem 2" and designated step "2" in FIGS. 8 and 9). Once a product is delivered for RFID tagging, the product "next to be tagged" is identified by the RFID application system, at least partially embodied in a server (also referred to as an "XARM Application Server ("XAS")") so that the RFID application system knows specifically which RFID standard (as part of the RFID compliance data) to apply for encoding. In addition, the quantity of cases on the pallet is identified, and that information may be obtained via integration from the WMS or advising system via an interface from the RFID application system. Clearly, other information could be employed by the RFID system, for example, order management system order information or production order information could be obtained by the RFID application system to complete the SKU induction. A compliance manager of the RFID application system coordinates the RFID compliance data (e.g., product code) to derive a unique identification number for the RFID tags.

As operators begin processing a pallet, the SKU and pallet license plate number ("LPN") data are recorded in the RFID application system and stored in a database embodied in a database server. The license plate number is an identifier (usually a barcoded number or alphanumeric value) that identifies a specific lot/batch or unit of measure (pallet, case, etc.) of a particular SKU. The advantage in using LPNs is so that operators do not have to enter the variable attributes of that SKU each time the operators are trying to identify the unit of measure of the product to be moved, stored, etc. An operator will scan the LPN of the pallet being inducted, and the RFID application system will call for data (e.g., RFID compliance data) from the warehouse management system. In the event that an LPN is not available to scan, or no touch point exists between the RFID application system and the warehouse management system, the operator may select the SKU from a list provided by the compliance manager of the RFID application system. The RFID application system will alert operators if SKUs are being inducted which have not been setup for RFID processing.

Turning now to FIGS. 12A to 12E, illustrated are screen shots generated by the RFID application system to facilitate SKU induction. A first screen shot or SKU induction allows the operator to scan or enter the LPN for the next SKU to be processed (see FIG. 12A). If the LPN was already processed (pallet re-inducted by mistake), a screen appears to indicate the exception to the operator (see FIG. 12B). Per customer request, the RFID application system supports messaging when changing to a different product code. The RFID application system supports this operation as the operator acknowledges the SKU change with a button on a screen (see FIG. 12C). A main screen associated with the SKU induction process automatically tracks the status of a pallet dynamically and provides dynamic instructions to the operator along with graphical cues or instructions for processing (see FIG. 12D). Another screen appears after the full number of expected cases has been verified to indicate to the operators that the pallet is complete and that the RFID application system is ready to start the next pallet when the operator is ready (by pressing the "OK" button) (see FIG. 12E). As a result of the SKU induction process facilitated by the RFID application system, operator error and operator training are reduced. This is especially beneficial in warehouses that have high labor turnover rates associated with the operators.

Figure 13:
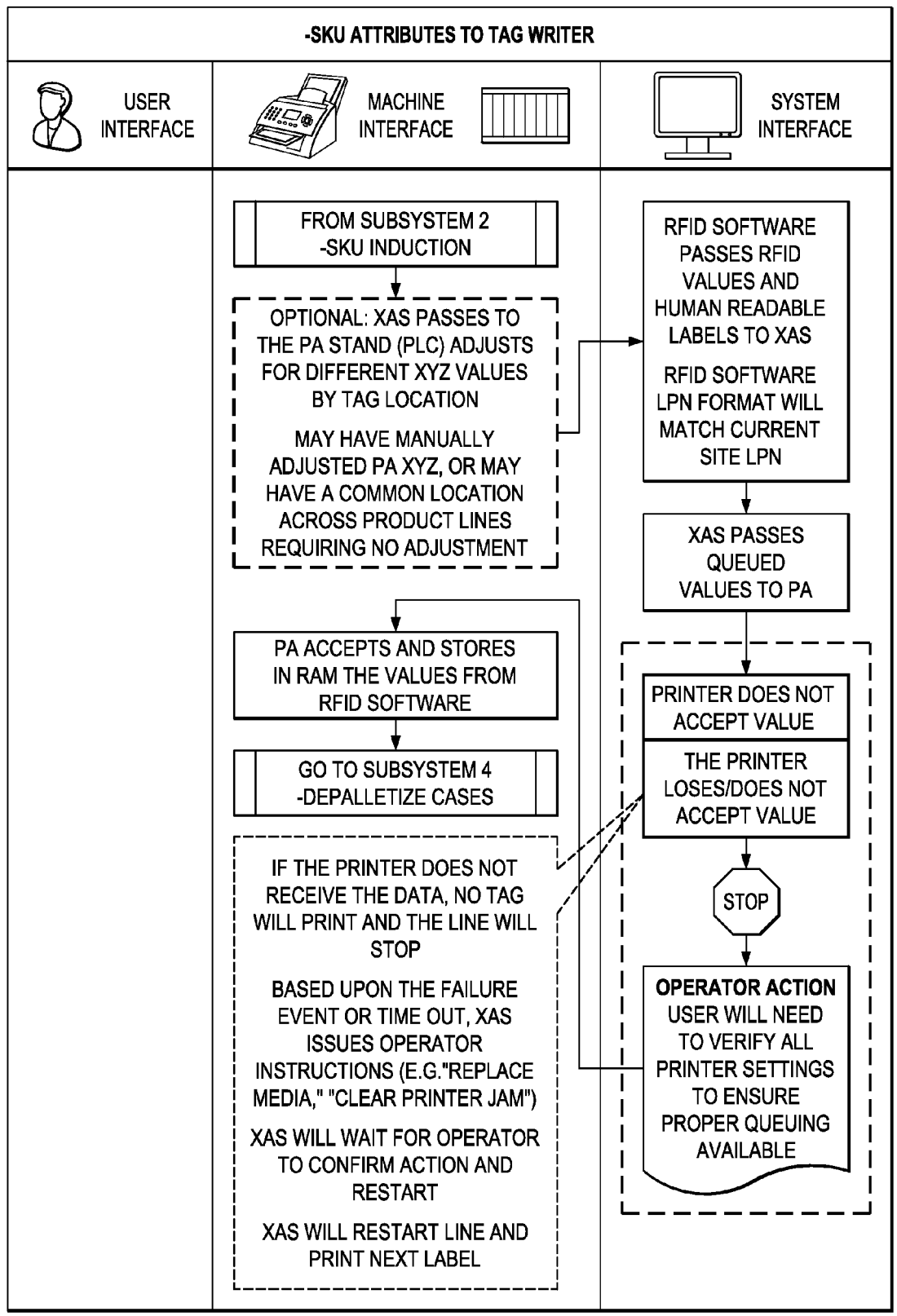

Turning now to FIG. 13, illustrated is a flow diagram illustrating the RFID application system sending the appropriate data (i.e., RFID tag values, human readable information to be printed, etc.) to a printer applicator (referred to as "Subsystem 3" and designated step "3" in FIGS. 8 and 9). A printer applicator controller of the RFID application system can automatically adjust the printer applicator based on the XYZ coordinates to control label (and RFID tag) placement outcome on the product. The XYZ coordinates are Cartesian coordinates utilized in the RFID application system to control a desired outcome of RFID tag placement on actual cases. The coordinates may be stored in a database of the RFID application system for automatic or manual RFID tag placement so that the coordinates are known at the time of SKU induction. The coordinates may also be necessary to make automated or manual adjustments to physical hardware (via a configuration subsystem of the RFID application system) so that the desired RFID tag placement is achieved while RFID tagging. The placement of the RFID tag can be important for products and especially for reading an RFID tag thereon so automating the process will not only reduce operator error and training, but augment an efficiency of the RFID system.

Figure 14A:
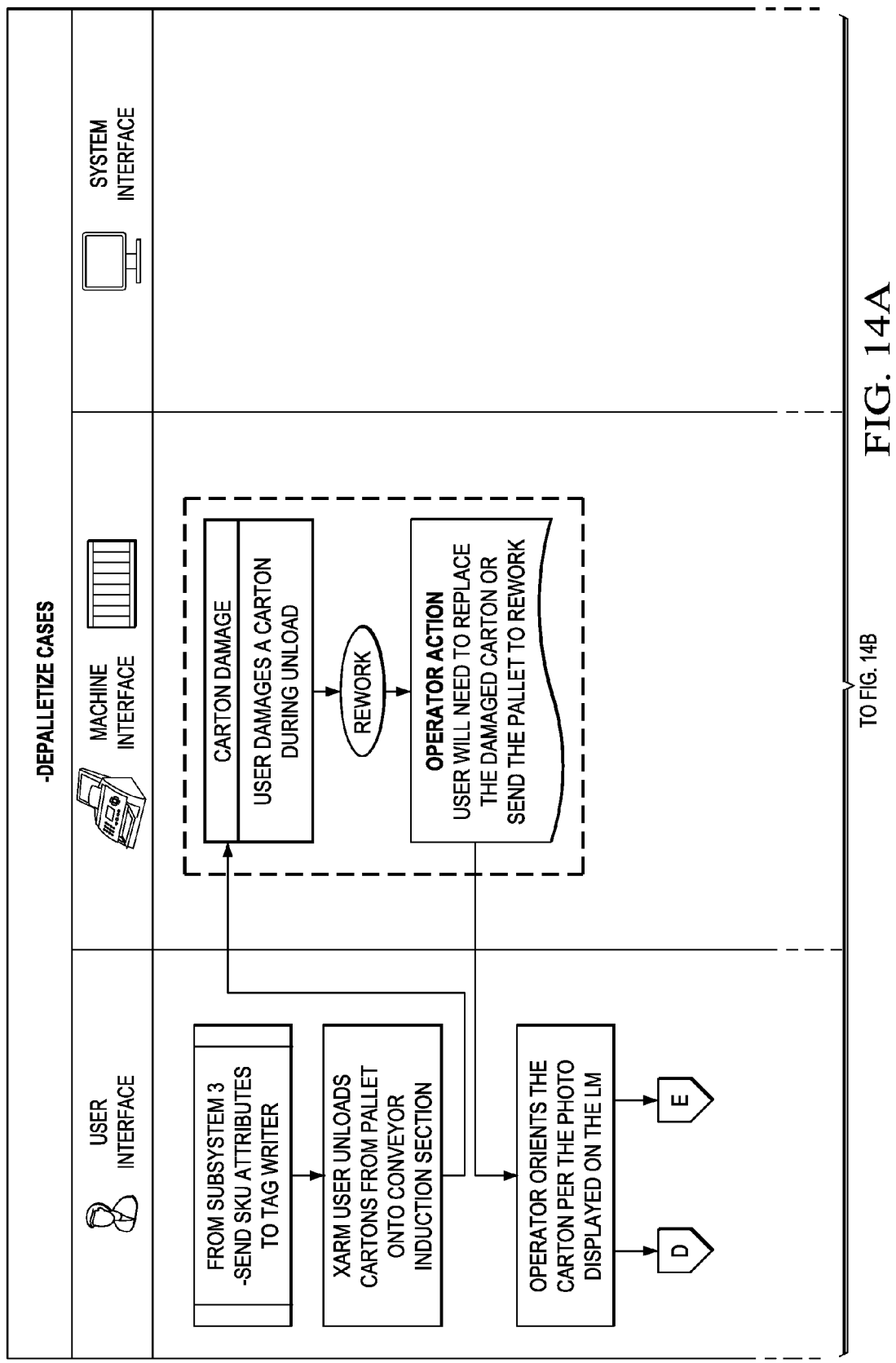
Figure 14B:
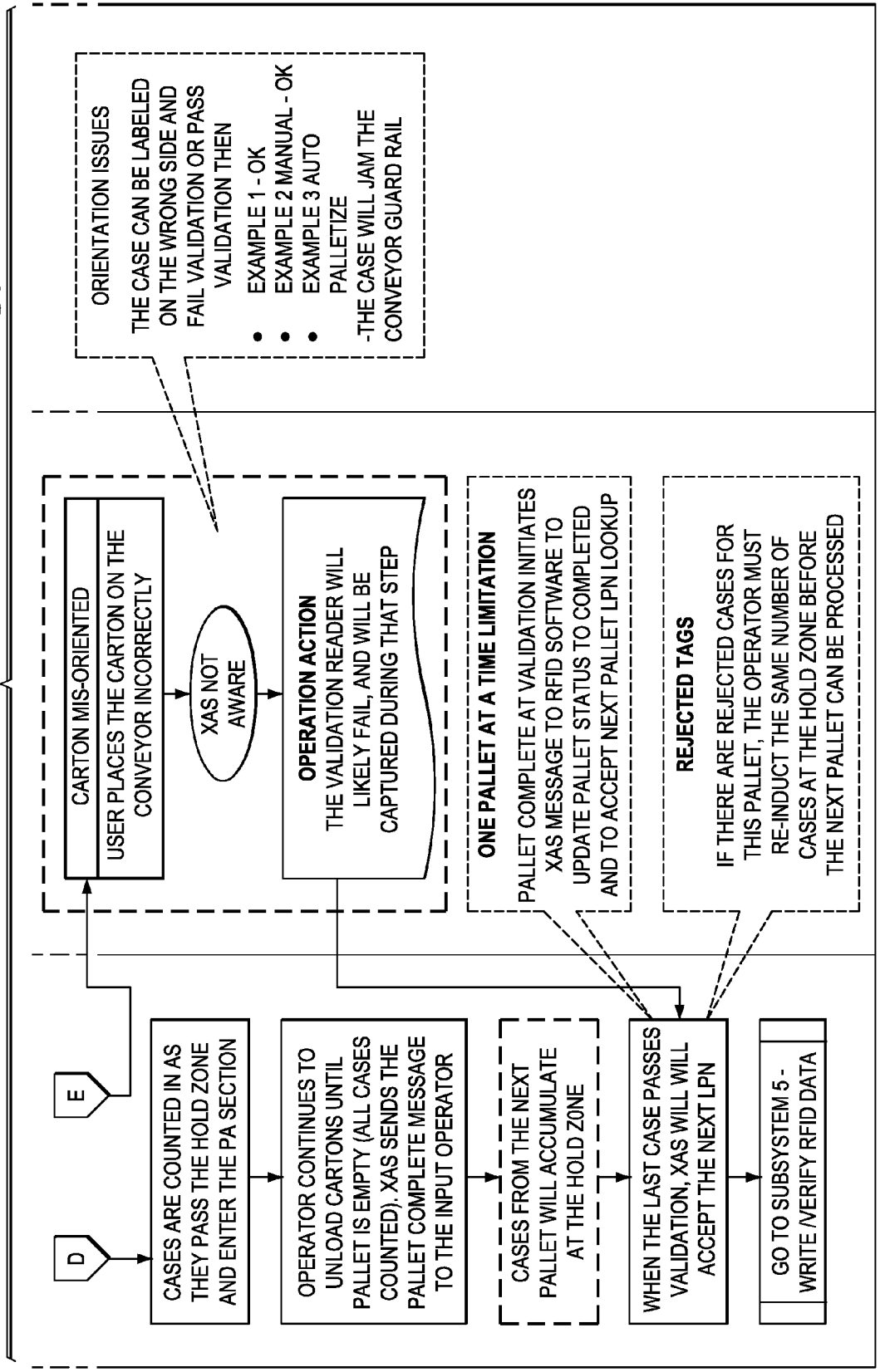

Turning now to FIG. 14 (collectively FIGS. 14A and 14B), illustrated is a flow diagram illustrating depalletizing the cases of the pallet onto a conveyor (referred to as "Subsystem 4" and designated step "4" in FIGS. 8 and 9). Line operators may manually remove the cases from the pallet and place the cases on the conveyor in an orientation that is depicted on a user interface of the RFID application system. The RFID application system also tracks the total expected cases on that particular pallet as well as how many cases have been validated and rejected (see, e.g., FIG. 12D).

Additionally, ergonomic pallet stands may be incorporated to mechanically adjust the height of the pallet to facilitate the depalletization of the cases, especially where the cases are more than 35 lbs. The RFID application system provides direction to the operator as to case orientation requirements on the conveyor and/or line setup activities that should be performed (i.e., changing Y location settings for printer applicator equipment if the XYZ automation option is not chosen).

The conveyor will accumulate cases intelligently in that the conveyor singulates or separates the cases and knows if the printer applicator is in a "ready" state for RFID tag application. The conveyer does this via a machine interface between the printer applicator and the RFID application system (e.g., a printer applicator controller and a conveyer controller thereof), thereby substantially eliminating an overrun of the printer applicator. What is meant by "overrun" is that if the printer applicator and the conveyor are not integrated, then the conveyor will send cases regardless of the status of the printer applicator, which can result in poor and expensive consequences. The event manager of the RFID application system coordinates the actions of the printer applicator controller and conveyer controller to control the printer applicator and conveyer, respectively.

As an example, if the printer applicator skips a bad RFID tag (a common internal printer applicator process), then the printer applicator will automatically take an appropriate amount of additional time (e.g., hold the next steps) to produce a good RFID tag ready for application on the next case. Without intelligent integration, the conveyor would send the next case to the printer applicator, and no RFID tag would be applied to that case. Since the RFID tag would fail validation (no RFID tag applied), the RFID system would reject that case thus creating rework. As the RFID application system is designed to include integration, the rework is substantially eliminated in that the conveyor waits until the "ready" signal from the printer applicator before allowing the next case reach the printer applicator.

Figure 15:
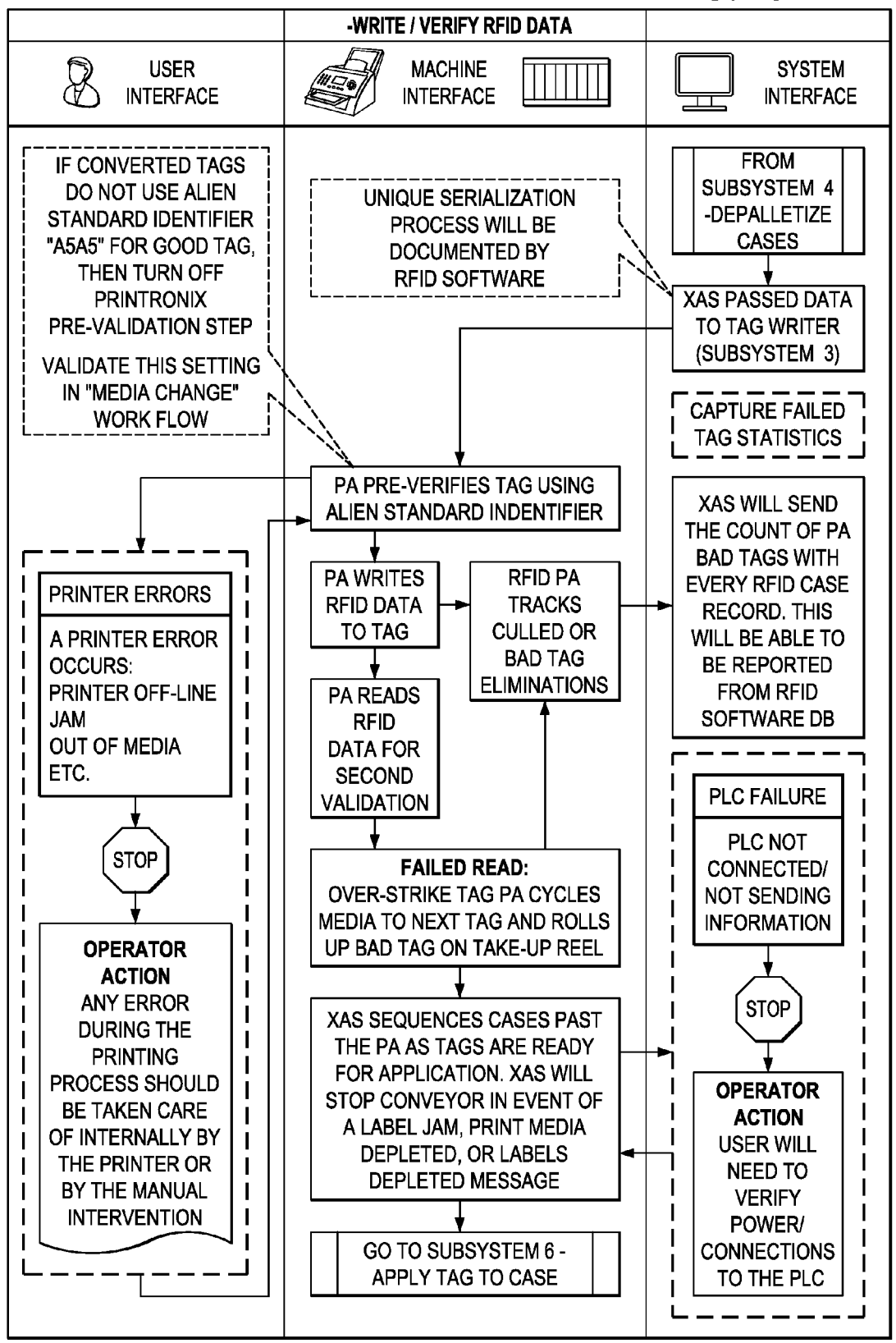

Turning now to FIG. 15, illustrated is a flow diagram directed to encoding the actual RFID values and printing the readable information on the RFID tags after cases are depalletized (referred to as "Subsystem 5" and designated step "5" in FIGS. 8 and 9). The printer applicator writes the RFID data to an RFID circuit in a label and prints any needed, for instance, human-readable information on the label per the advised information from the printer applicator controller of the RFID application system. Unique serializations for the RFID compliance data will be managed across multiple sites/locations and can be managed by the compliance manager of the RFID application system. The printer applicator will verify the RFID tags written for RFID readability, and failed RFID tags will be collected by the printer applicator. Since only good RFID tags will be applied to cases, the chances of rework are reduced. The RFID application system will also alert operators of printer applicator error conditions such as out of media jams, etc. via the printer applicator controller, thereby further enhancing overall substantially error-free operation.

Figure 16:
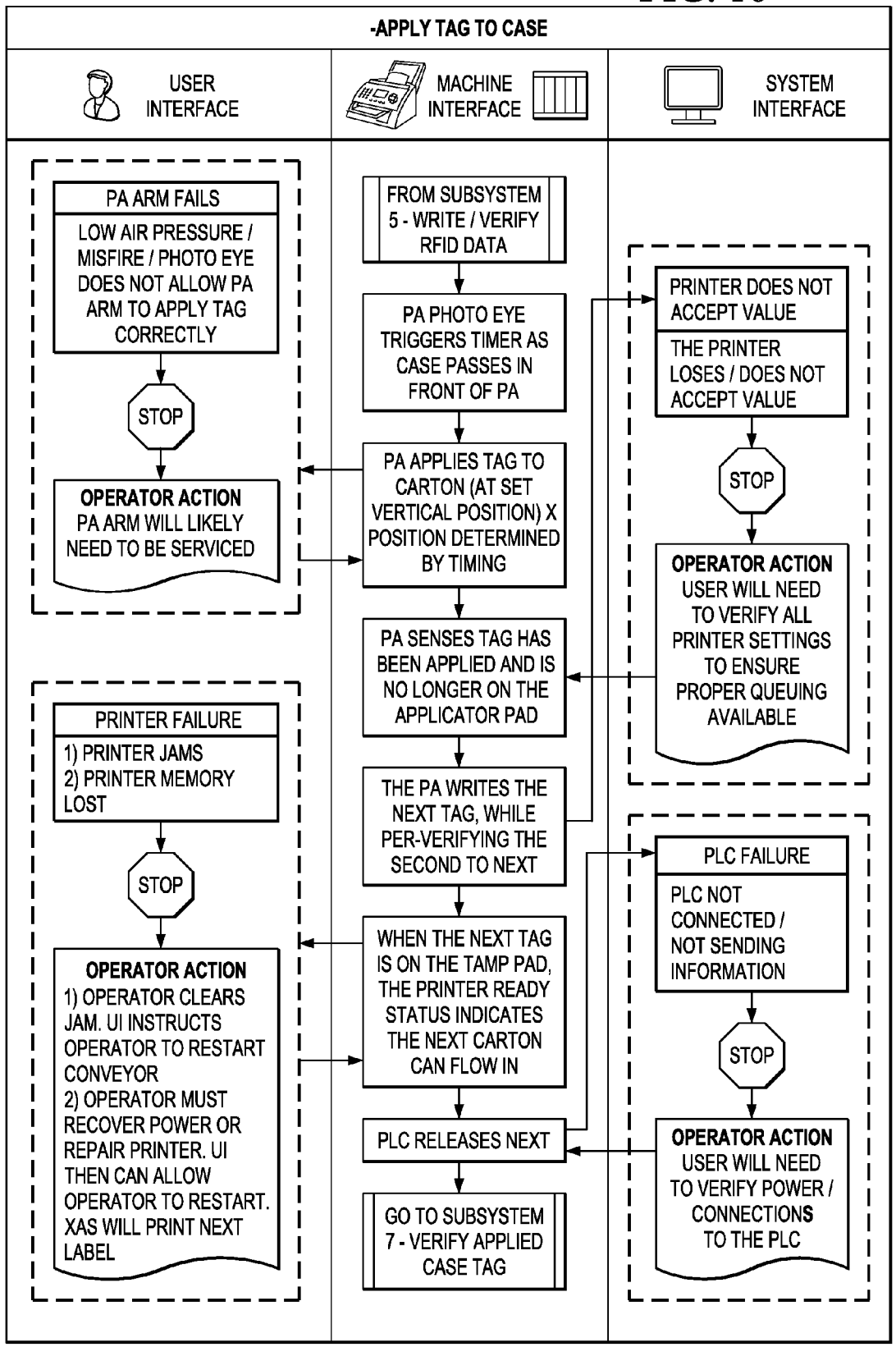

Turning now to FIG. 16, illustrated is a flow diagram for applying an RFID tag to a product (e.g., case) (referred to as "Subsystem 6" and designated step "6" in FIGS. 8 and 9). Consider that the printer applicator has just discharged an encoded RFID tag onto an applicator pad. Once the printer applicator has peeled or discharged a good RFID tag, the printer applicator sends a ready signal to the printer applicator controller of the RFID application system. Then, the RFID application system, in conjunction with the event manager, releases the next case for application from the waiting zone or queue prior to the printer applicator. As the case passes a photo eye triggering device, the applicator pad is activated to apply or tamp the RFID tag onto the case. Tamping the RFID tag is but one application method and other application methods such as air apply (a/k/a, "blow on") and "wipe on" are equally acceptable.

Timing and physical tuning of the RFID system is necessary to have the RFID tag applied in the appropriate place for each SKU, and the RFID application system in conjunction with the workflow and event managers allows for digital configuration of delay and positioning criteria for the RFID system. For example, the RFID tag placement x-coordinate is dependent on the speed of the conveyor as well as a time delay after the photo eye RFID tag application triggering event. The time delay could be zero, but it could be set to a longer time to delay, for instance, by causing the photo eye triggering device to place the RFID tag closer to a trailing edge of the case.

As the printer applicator encounters bad RFID tags, it will fail the RFID tags internally and print a readable overstrike graphic (e.g., horizontal and vertical grid lines or void) on the label. Some printer applicators are intelligent enough so as not to peel or discharge the bad RFID tags, which are then skipped by the printer applicator and the printer applicator queues up the next RFID tag for encoding. Depending on the intelligence of the printer applicator, the RFID application system may be configured to reject cases that have no RFID tag or bad RFID tags applied thereto. The RFID application system in conjunction with the printer applicator controller and compliance manager tracks the number of overstrikes in the printer applicator so that statistics on RFID tag yields may be tracked in a database thereof.

Figure 17:
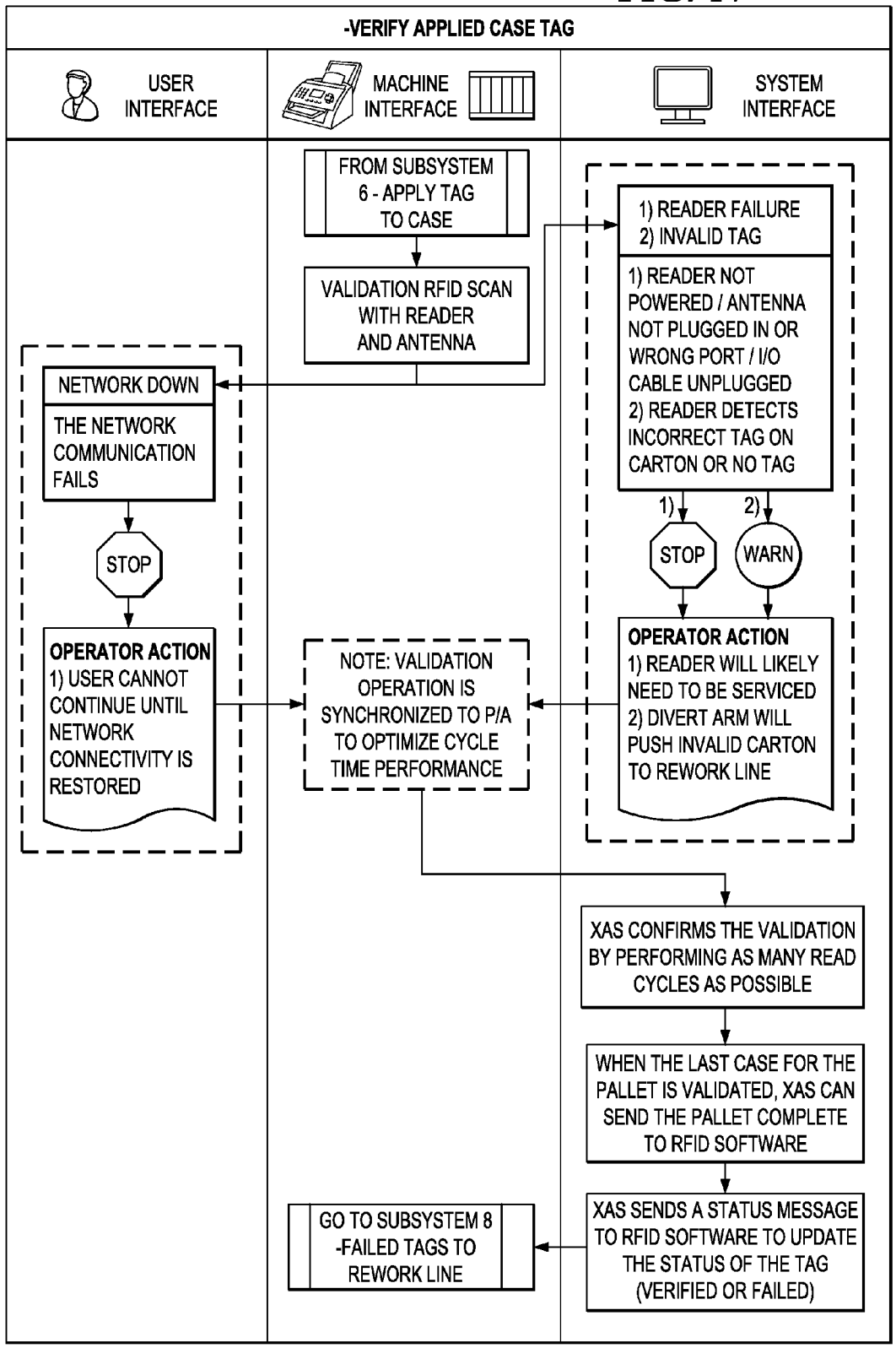

Turning now to FIG. 17, illustrated is a flow diagram demonstrating a verification of the application of the RFID tag (referred to as "Subsystem 7" and designated step "7" in FIGS. 8 and 9). Since mechanical devices may not be 100% reliable, the RFID application system allows for an independent, secondary validation of the RFID tag. The validation also provides confirmation that the RFID tag was, in fact, applied to the case, as sometimes labels fall off the printer applicator. Additionally, the RFID application system verifies that the RFID tag can be read according to the RFID specifications as determined by the standards bodies. If the encoded RFID tag value is read by an RFID reader (via an interface to the RFID reader), then the case is counted as "validated" and it is aggregated or associated with a pallet identification number ("pallet ID") in the RFID application system. The RFID application system will continue to validate the cases until the total expected cases on that pallet equals the total number of validated cases for that pallet. Again, the RFID reader may be configured by the configuration system of the RFID application system, and the validation process invokes several subsystems thereof such as the event manager to coordinate an operation of the RFID reader and the compliance manager to validate the RFID tag and the RFID tagged case.

Figure 12A:
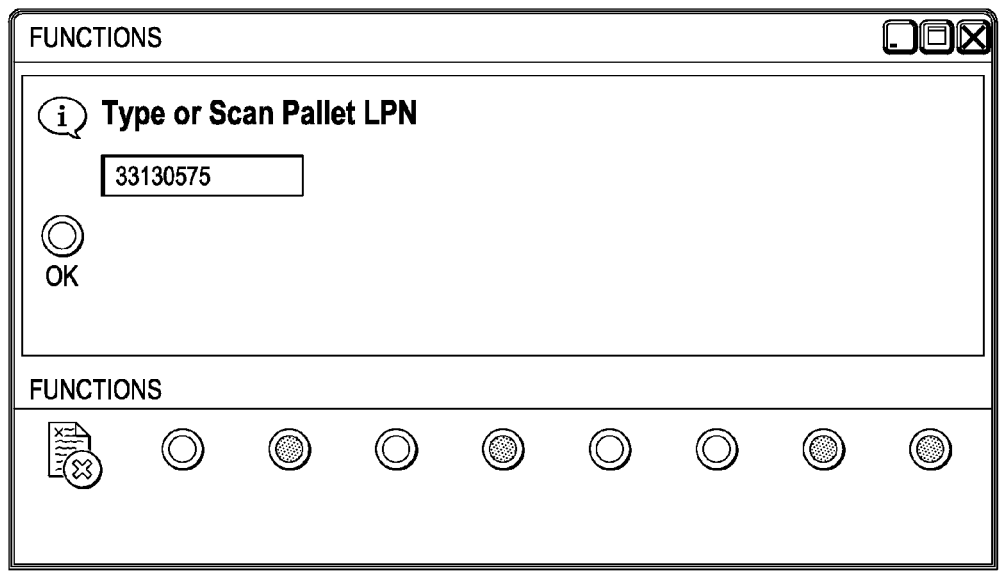
Figure 12B:
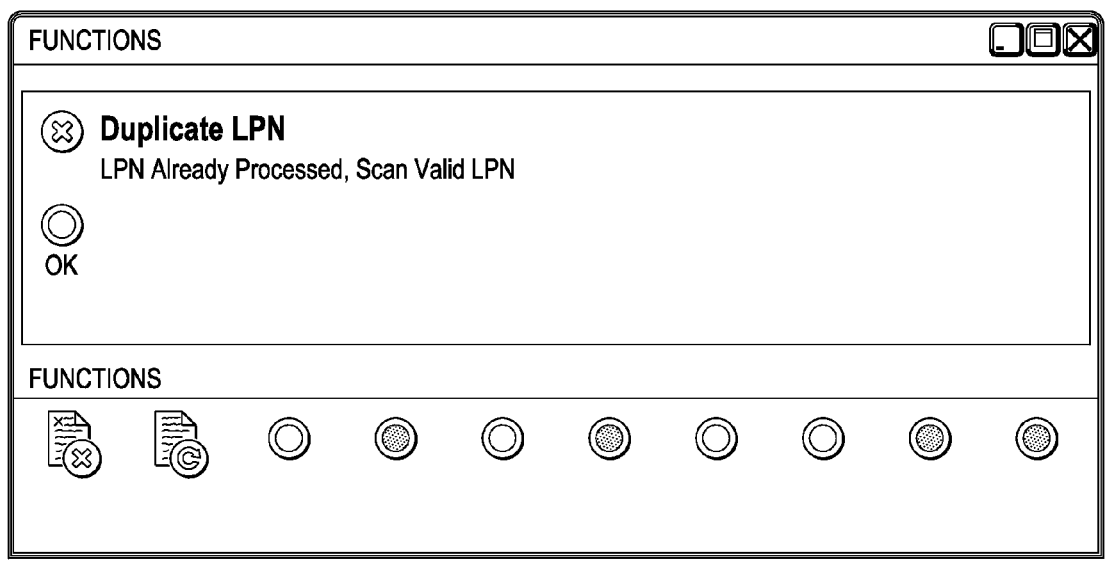
Figure 12C:
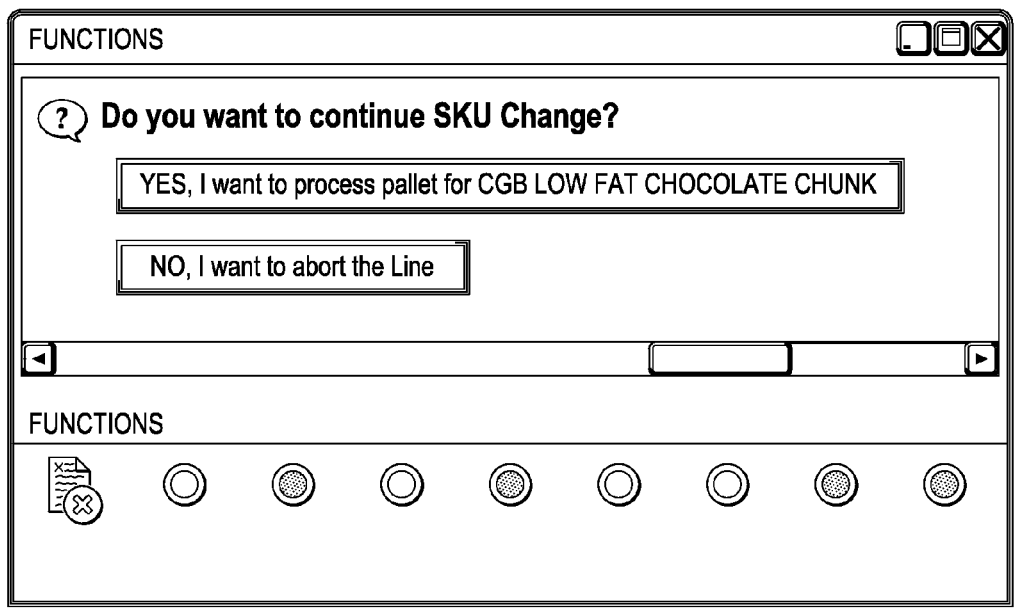
Figure 12D:
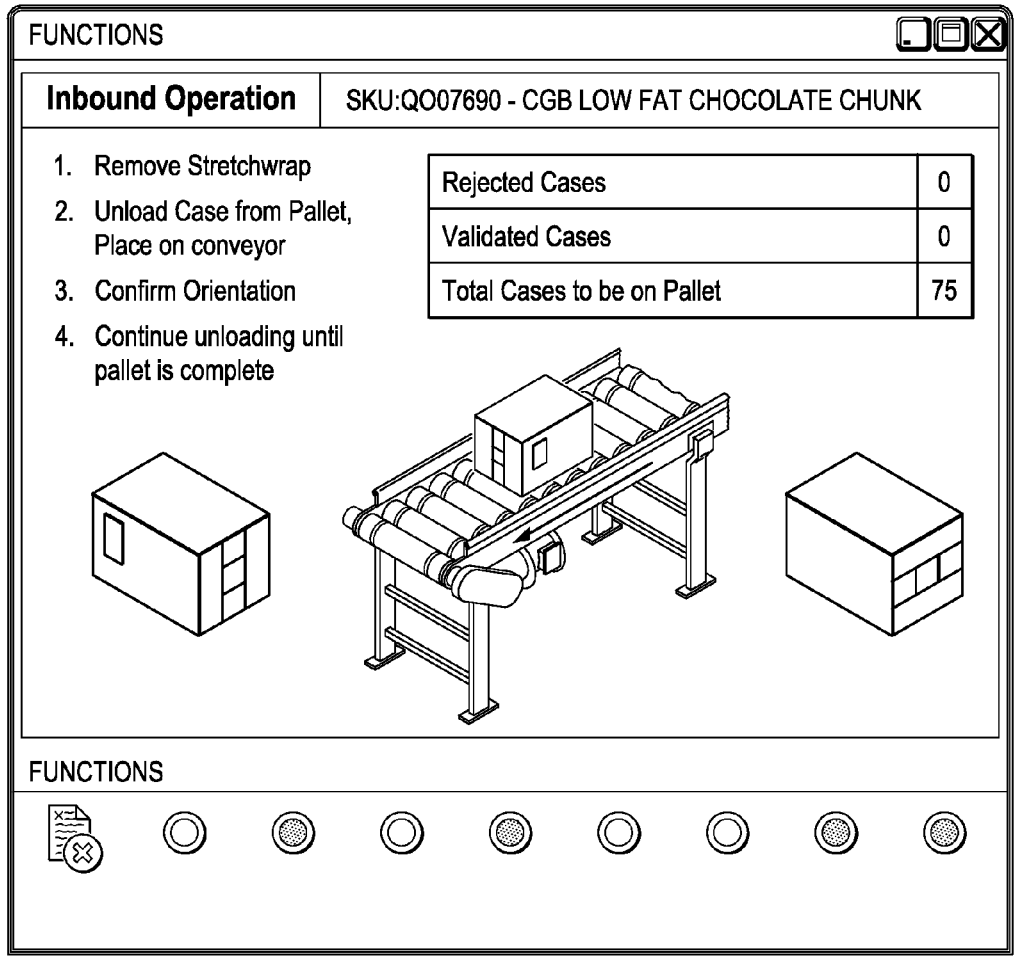
Figure 12E:
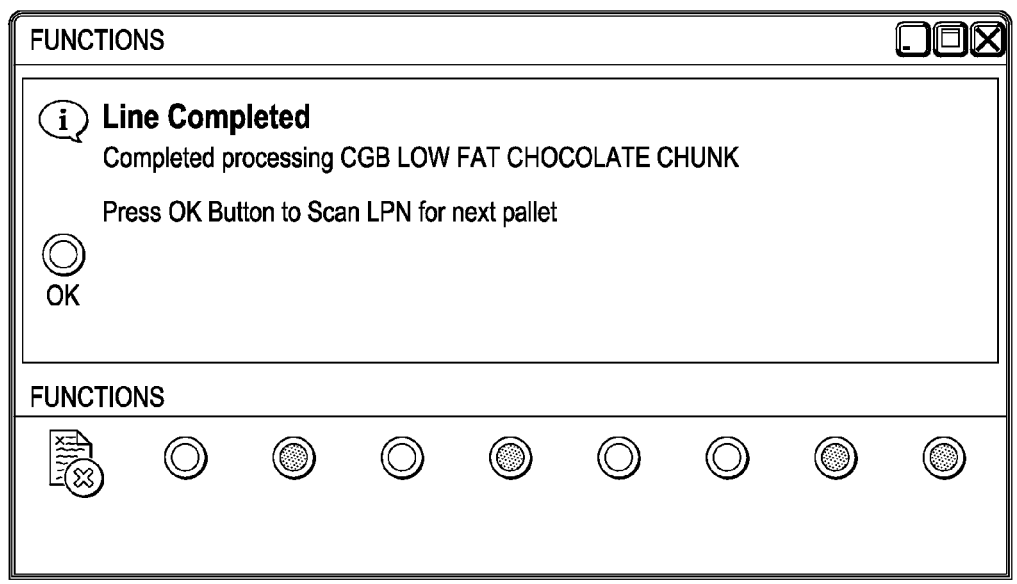
Figure 18:
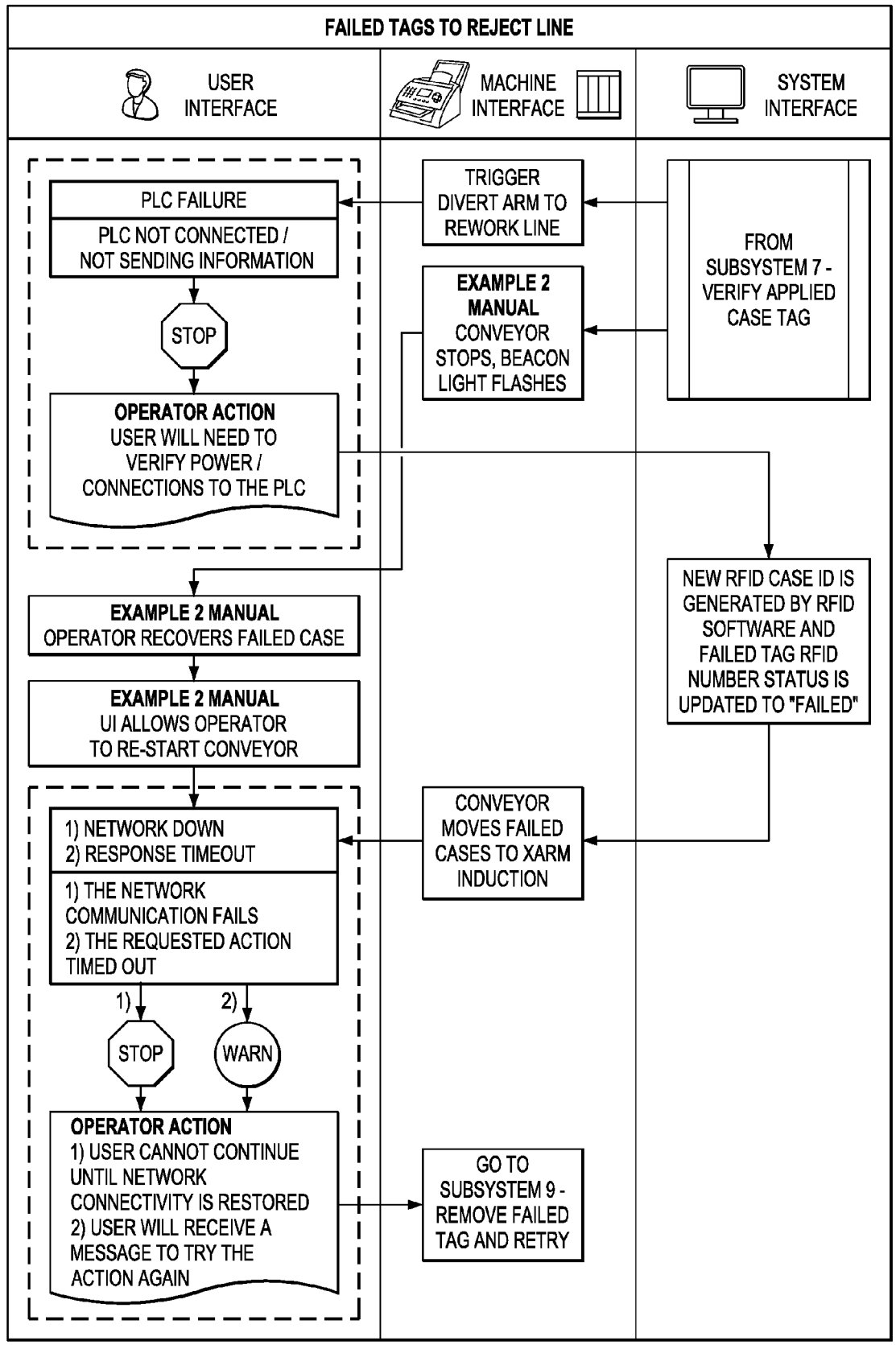

Turning now to FIG. 18, illustrated is a flow diagram of an operation should a case fail validation for, as examples, operational reasons, mechanical printer applicator failures, or programmable logic controller ("PLC") failures (referred to as "Subsystem 8" and designated step "8" in FIGS. 8 and 9). In this instance, the RFID reader will not read the expected RFID value on that case and the RFID application system via the event manager will notify a reject pusher or diverter to reject the case. The RFID application system (via the compliance manager) counts a rejection and the RFID application system triggers a new "request" for a replacement number to print a new RFID tag for that case. A counter is updated in real time automatically by the RFID application system and a sample screen shot of the operation is illustrated in FIG. 12D.

Figure 19:
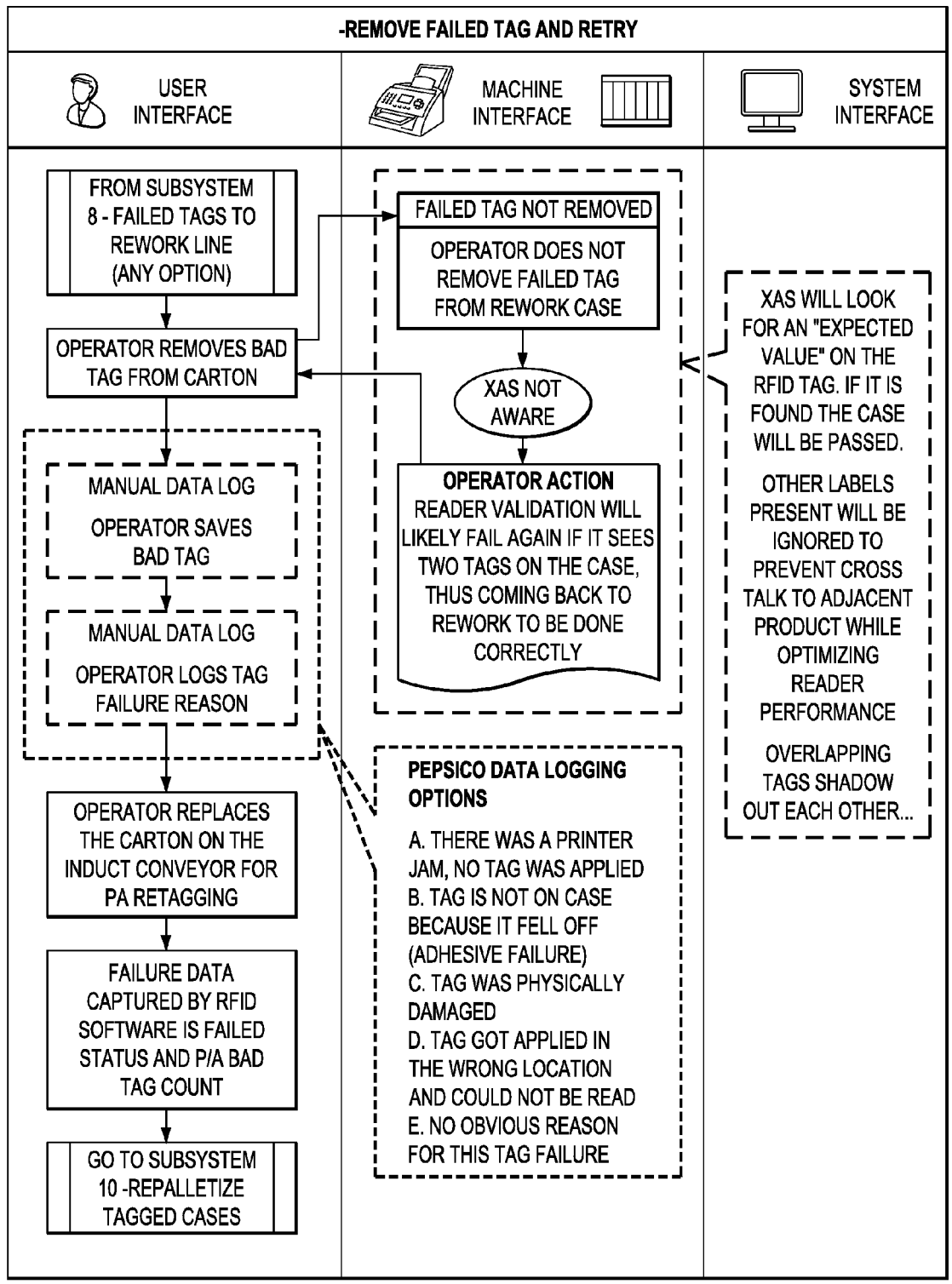

Turning now to FIG. 19, illustrated is a flow diagram demonstrating an operation of the RFID system should a reject occur (referred to as "Subsystem 9" and designated step "9" in FIGS. 8 and 9). In this instance, the case is physically removed from the main processing line without impacting production rates of subsequent cases and the information is conveyed back to an inbound operator for processing. The illustrated flow diagram illustrates the rejected case being returned to the inbound operator for removal of the bad RFID tag (if one was applied), and the placement of that case back on the inbound conveyor. This process makes it easier for inbound operators as the data is accounted for on the RFID application system with reduced operator intervention (just to remove a bad RFID tag).

The RFID application system also allows for the recording (either electronically or in a manual paper log) of bad RFID tags in a log with disposition codes in accordance with a compliance manager thereof. The logs, combined with proper conveyor intelligence, help to refine the RFID process and reduce the rejected cases. For example, conventional manual systems typically apply bad RFID tags an average of 10% of the time. Without delineating the reasons for the bad RFID tags, the conventional systems will not be able to define and solve the rejection problems.

In contrast, the RFID application system averages a reject rate around 0.25% or less, which is a cost effective alternative to scaling the manual solution that may be crippled with high rejection percentages. The reject logs have determined that the majority of the 0.25% of cases is due to mechanical printer applicator failures to peel the RFID tags, not the RFID tags themselves. The system data mining included within the RFID application system in accordance with the compliance manager clearly provides the information for future system and process improvements.

Figures 1, 20A:
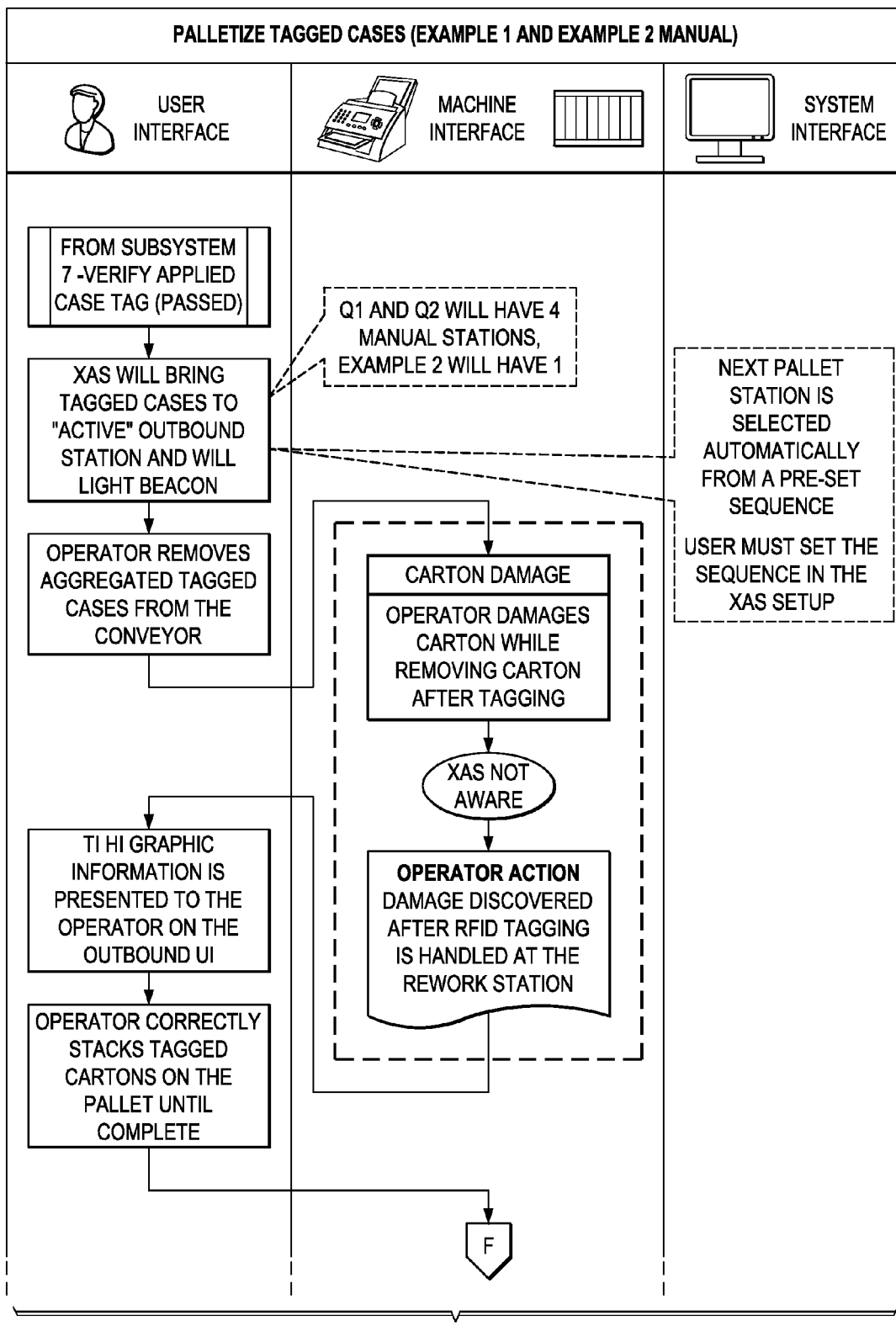
Figures 2, 20A:
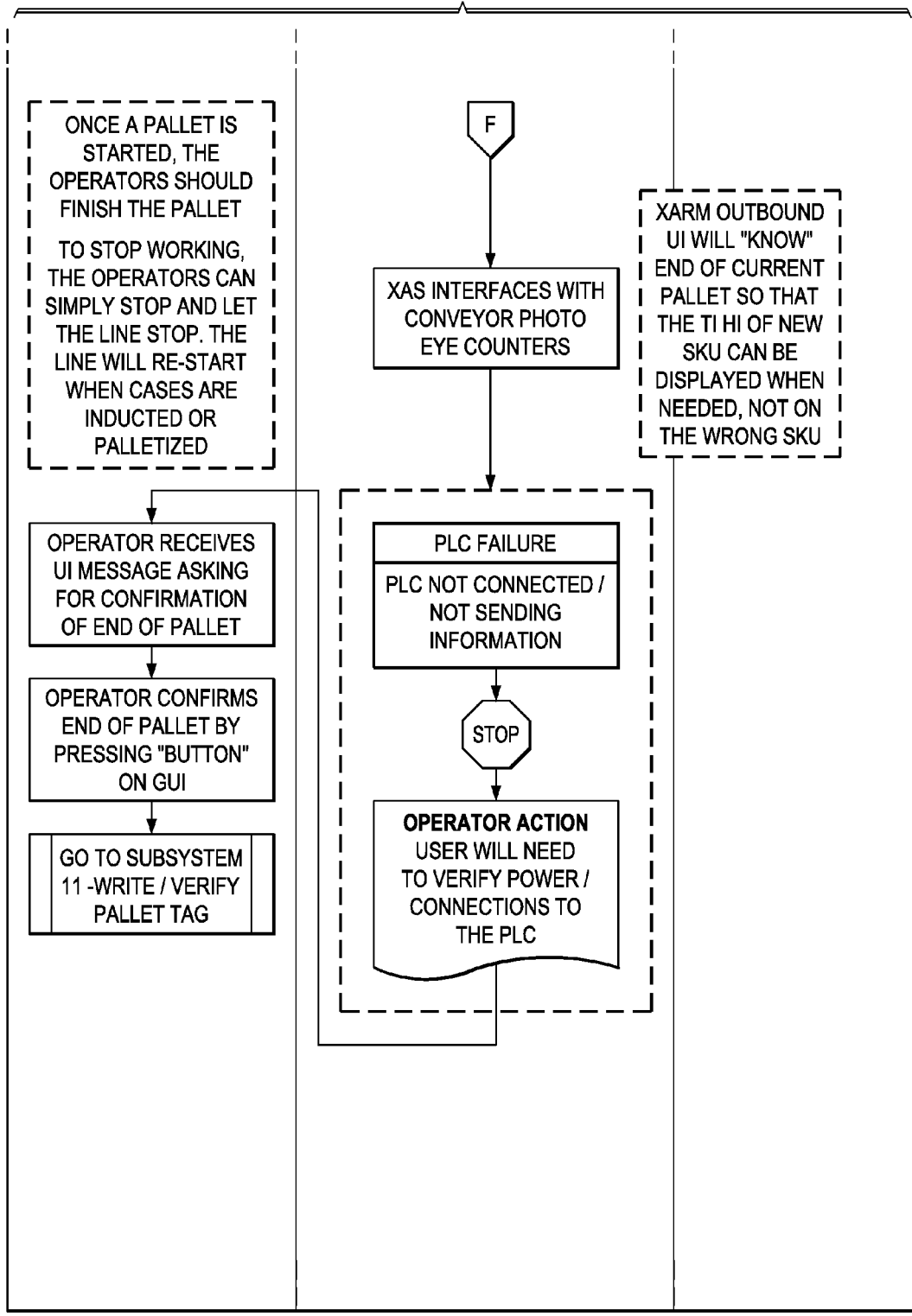

Turning now to FIGS. 20A (collectively FIGS. 20A-1 and 20A-2) to 20E, illustrated are flow diagrams and screen shots demonstrating palletizing the RFID cases onto a pallet ready for storage or outbound shipment to customers (referred to as "Subsystem 10," designated step "10" in FIG. 8 and referred to as "Subsystems 10A and 10X" and steps "10," "10A," and "10X," respectively, in FIG. 9). Beginning with FIG. 20D, illustrated is an outbound user interface that tracks the total expected number of cases as well as the number of validated and rejected cases. In this way, the operators know what to expect from a completion of the pallet stand point and are better aware of the total RFID process. In addition, since each SKU can potentially have a different stack pattern to create stable pallets for shipment and handling, the RFID application system displays a pallet configuration graphic to instruct outbound operators how to restack the cases. This approach enables the operators to receive on the job training that reduces the impact of high turnover, a common occurrence in operations, as well as operator errors. The screen shot in FIG. 20D displays palletizing RFID-tagged cases. The RFID application system (in conjunction with the pallet configuration subsystem) automatically tracks the status of the pallet dynamically and provides dynamic instructions to the operator along with graphical cues or instructions for processing.

Turning to FIG. 20E, illustrated is a screen shot of a "pallet complete" message that indicates to the operators that the RFID application system has validated as many cases as expected and, thus, the current pallet is complete. The system is ready to RFID tag the next pallet. This screen follows the main palletization screen. After the operators palletize all the cases on the conveyor, the operators press the "OK" button indicating that they are ready for the next palletization screen.

Figures 1, 20B:
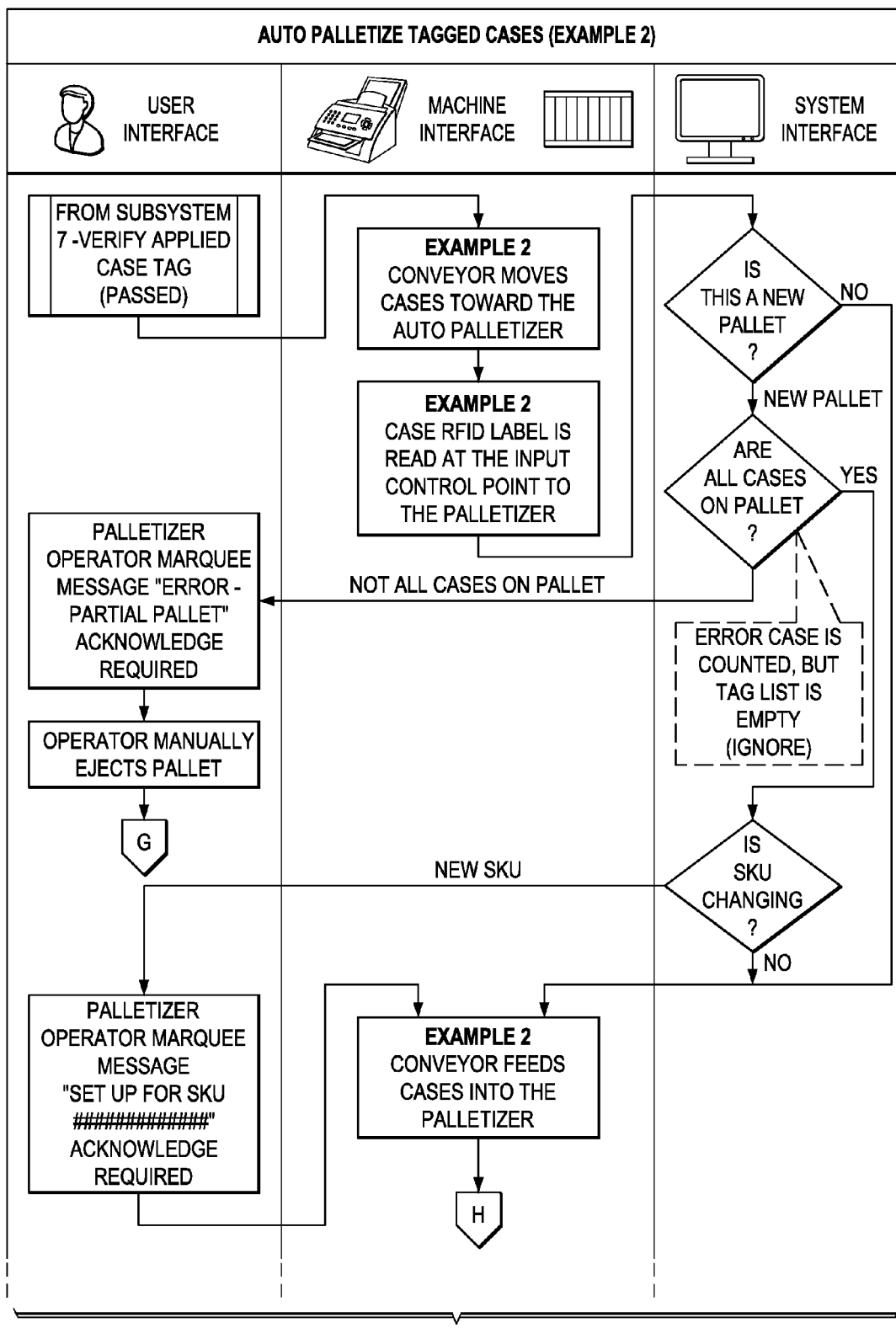
Figures 2, 20B:
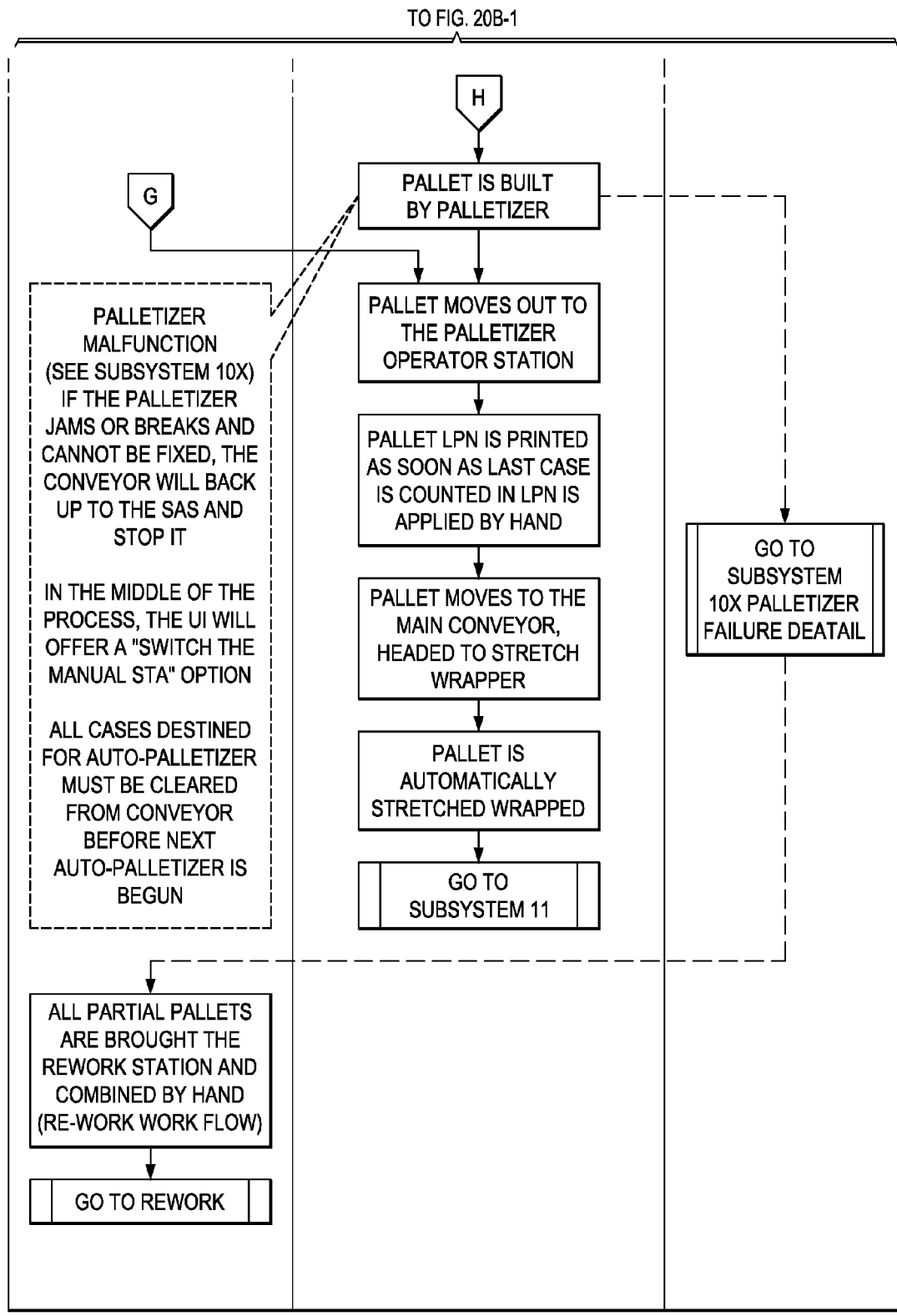

Turning now to FIG. 20B (collectively FIGS. 20B-1 and 20B-2), illustrated is a flow diagram for automatically palletizing RFID cases instead of manually restacking the cases, including the steps for interfacing to an automated palletizer. A secondary user interface is employed to know when the palletizer jams, but this is substantially avoided or eliminated if the palletizer is sufficiently intelligent to "know" this information. The flow diagram assumes that the palletizer does not possess any additional diagnostic intelligence to substantially eliminate the operator interface, which of course may be accommodated by the RFID application system.

Figures 1, 20C:
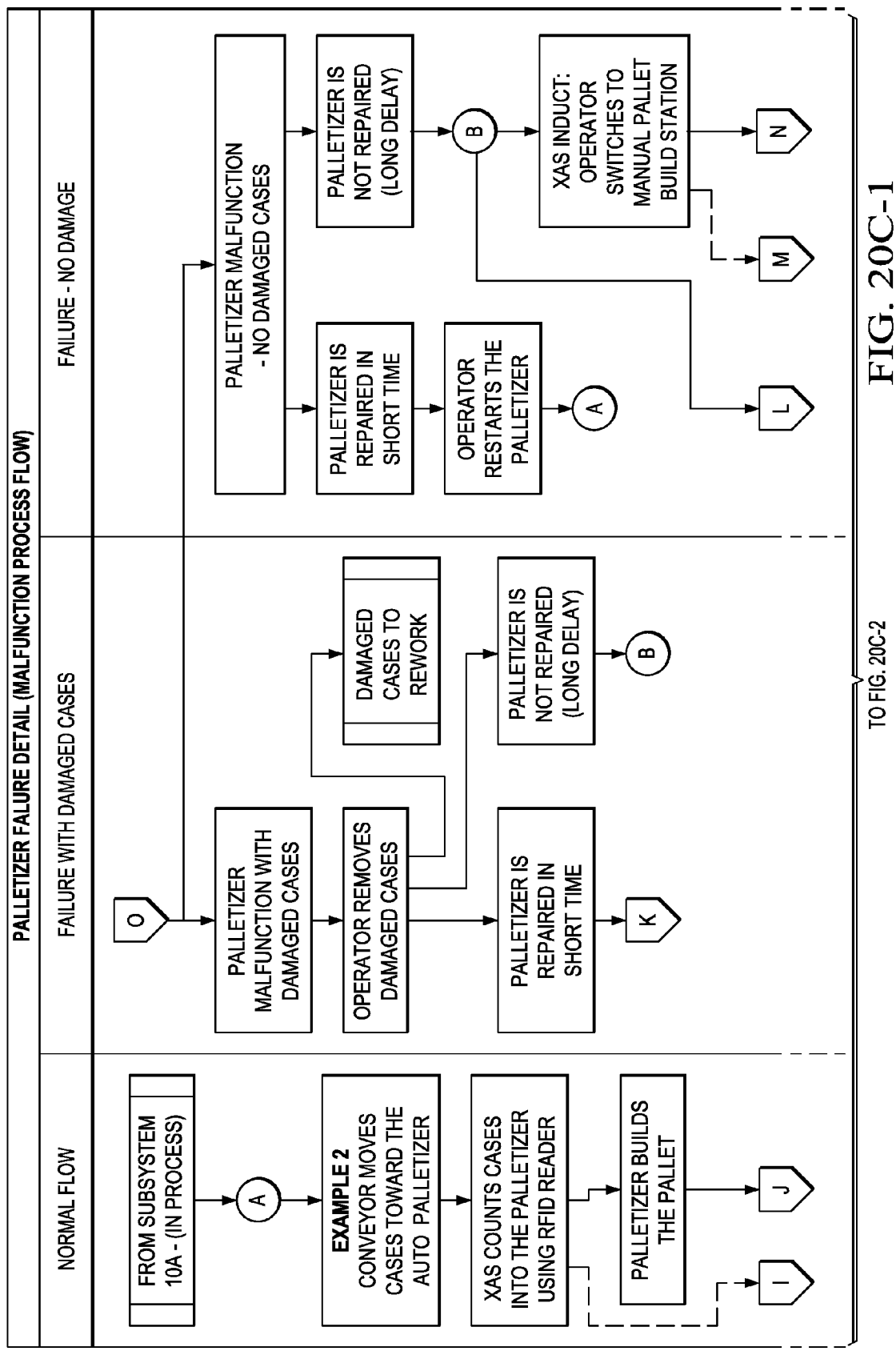

Turning now to FIG. 20C (collectively FIGS. 20C-1 and 20C-2), illustrated is a flow diagram illustrating an exemplary automated palletizer failure decision tree, with automated systems, and specifically denoting that the failure points are accounted for and handled with a solution, either manual or automatic. The RFID application system handles the possible failures with reduced input from the operators to maintain a streamlined operational process flow. Obviously there are different palletizer machines, which may have different failure points. The RFID application system can plan for, control and manage an RFID solution to accommodate any number of failures. A pallet configuration subsystem of the RFID application system directs a rebuilding of the pallets. It is also contemplated that RFID pallets can be combined to form a combined (e.g., a single) RFID pallet and the RFID application system can accommodate such a task without having to run the pallets through the entire process. In other words, the RFID application system will redirect palletizing the combined RFID pallet and update a database to reflect the case IDs with a pallet ID of the combined pallet.

Figure 21A:
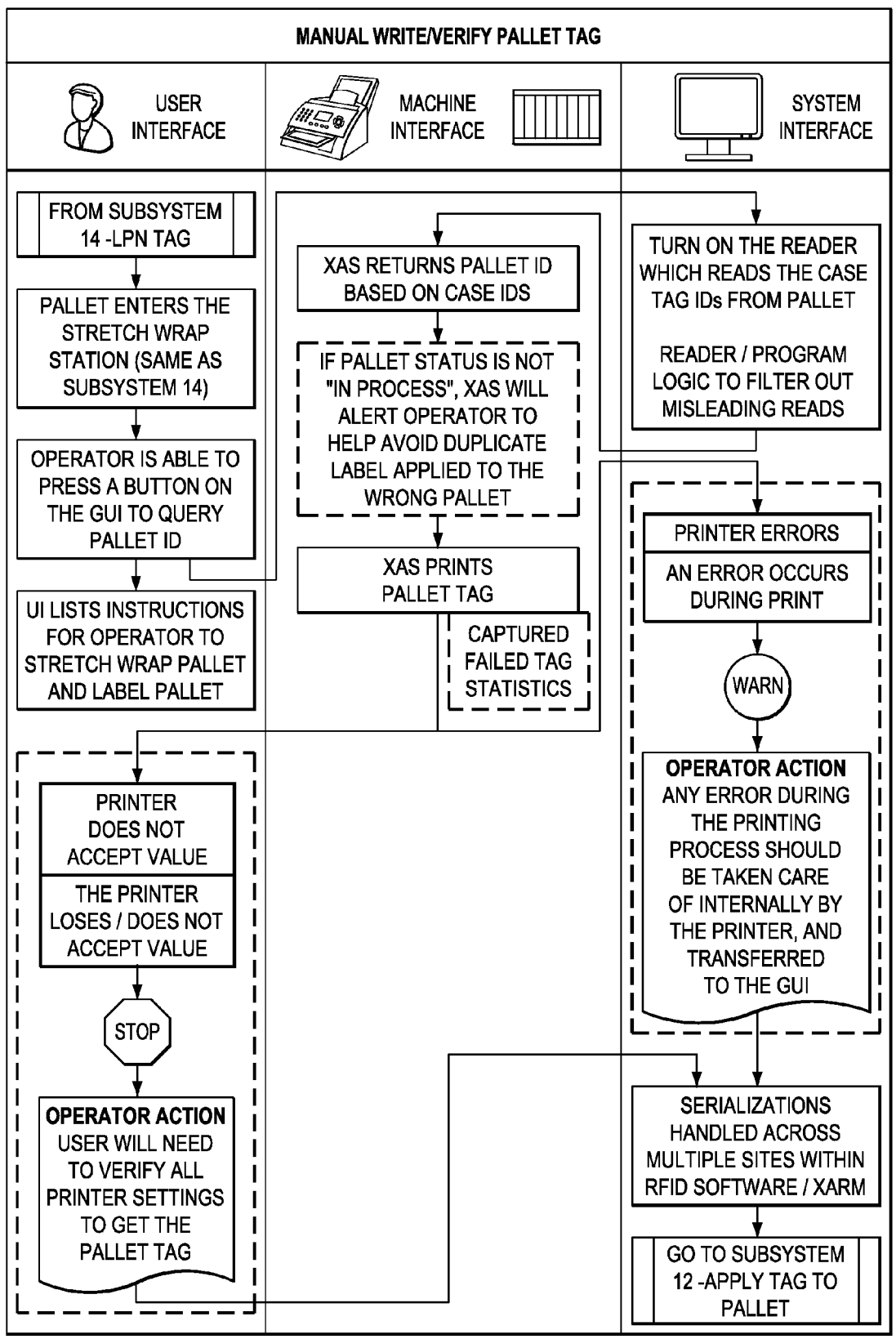

Turning now to FIGS. 21A to 21E, illustrated are flow diagrams and screen shots demonstrating RFID pallet tag encoding (referred to as "Subsystem 11" and designated step "11" in FIG. 8 and steps "11" and "11B" in FIG. 9). FIG. 21A illustrates a flow diagram that includes manual triggering of the RFID pallet tag encoding. The RFID application system reads for unique case identification numbers ("case IDs") that are systemically associated with a unique pallet identification number ("pallet ID") as well as a license plate number ("LPN"). The pallet ID is to the case ID like a parent/child relationship. This parent/child relationship is useful in determining which pallet RFID tag value should be encoded and printed. By RFID reading the children, the identification number of the parent is located in the database and sent, via the printer applicator controller, to a printer applicator or a table top printer for encoding/printing. Additionally, the printer applicator may create and print an RFID tag directly onto the product without a need for a separate label, or the like.

Figure 2:
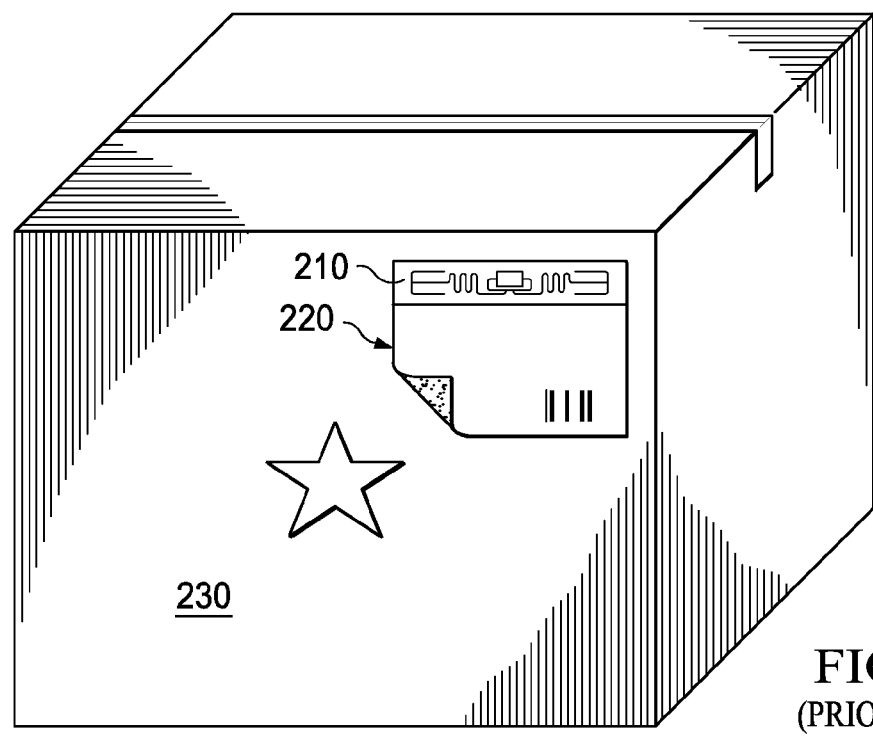
Figure 3A:
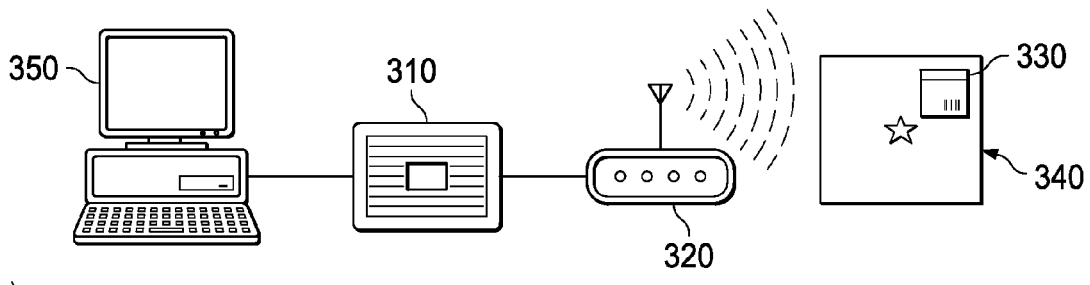
Figure 3B:
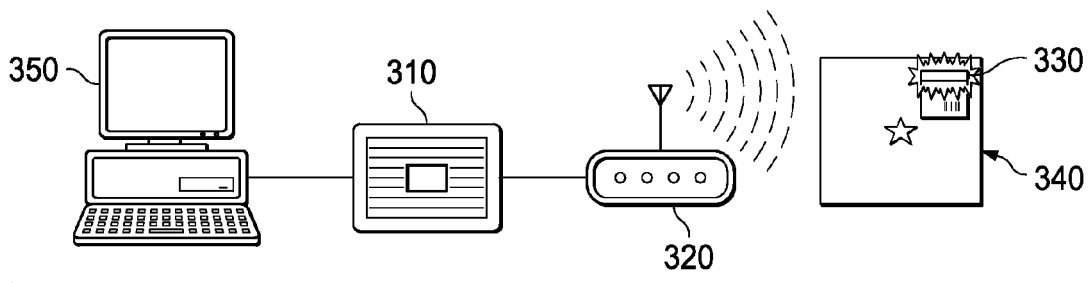
Figure 3C:
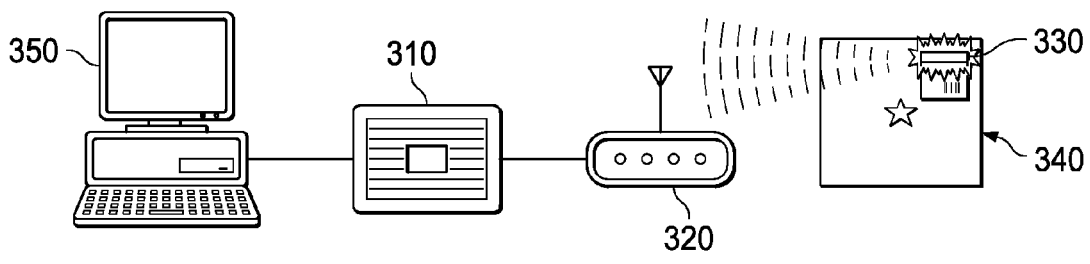
Figure 3D:
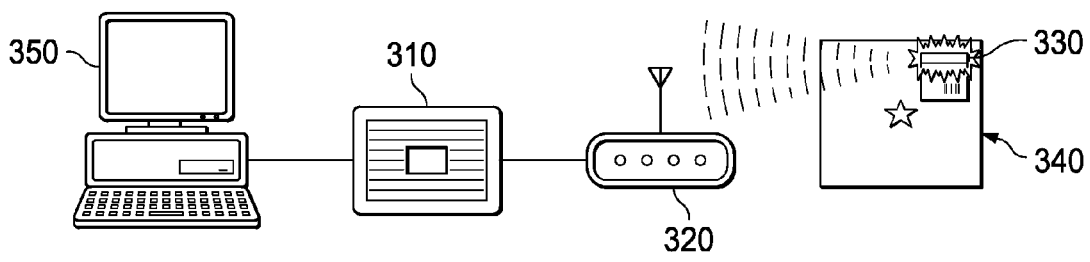
Figure 4:
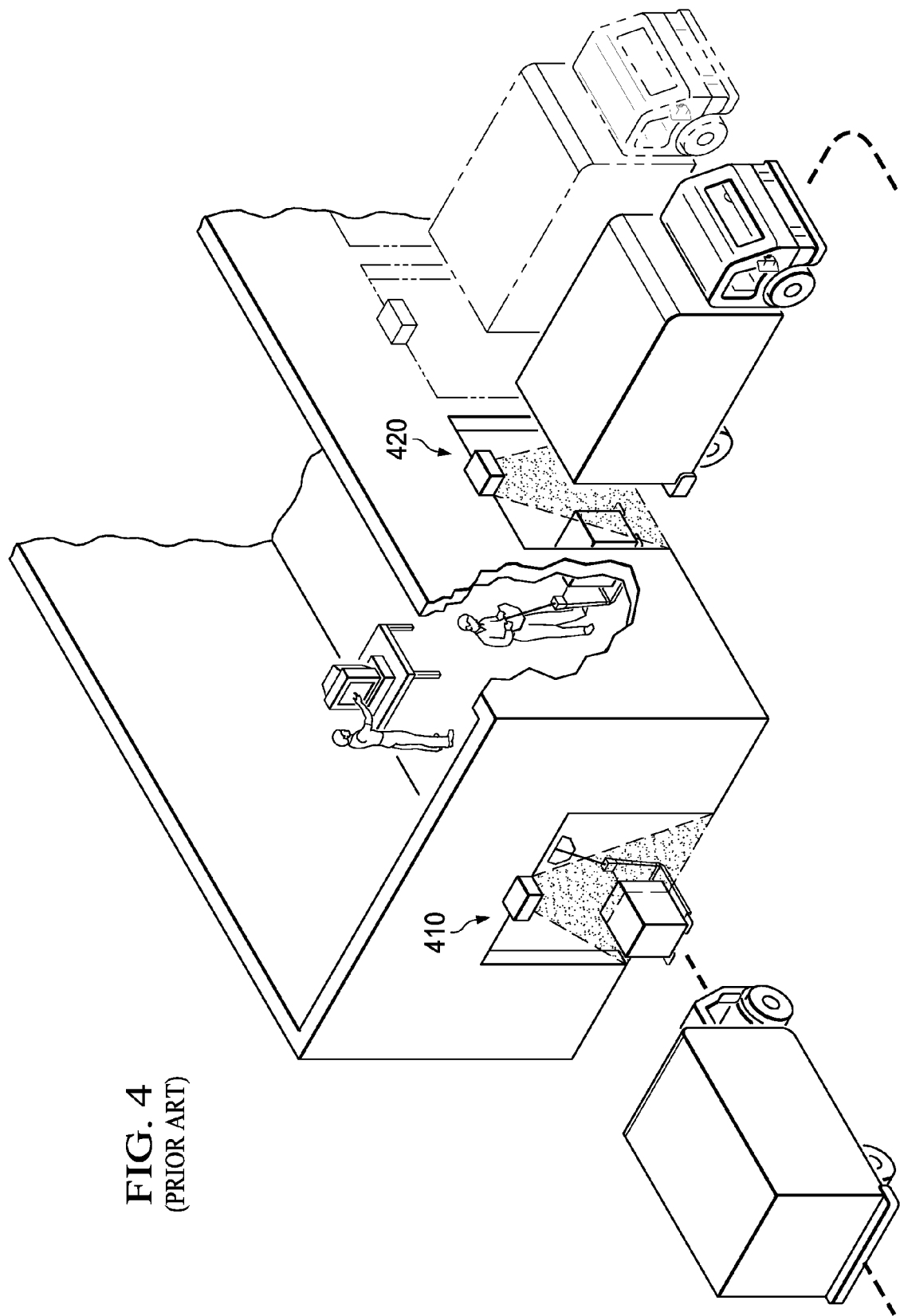
Figure 5:
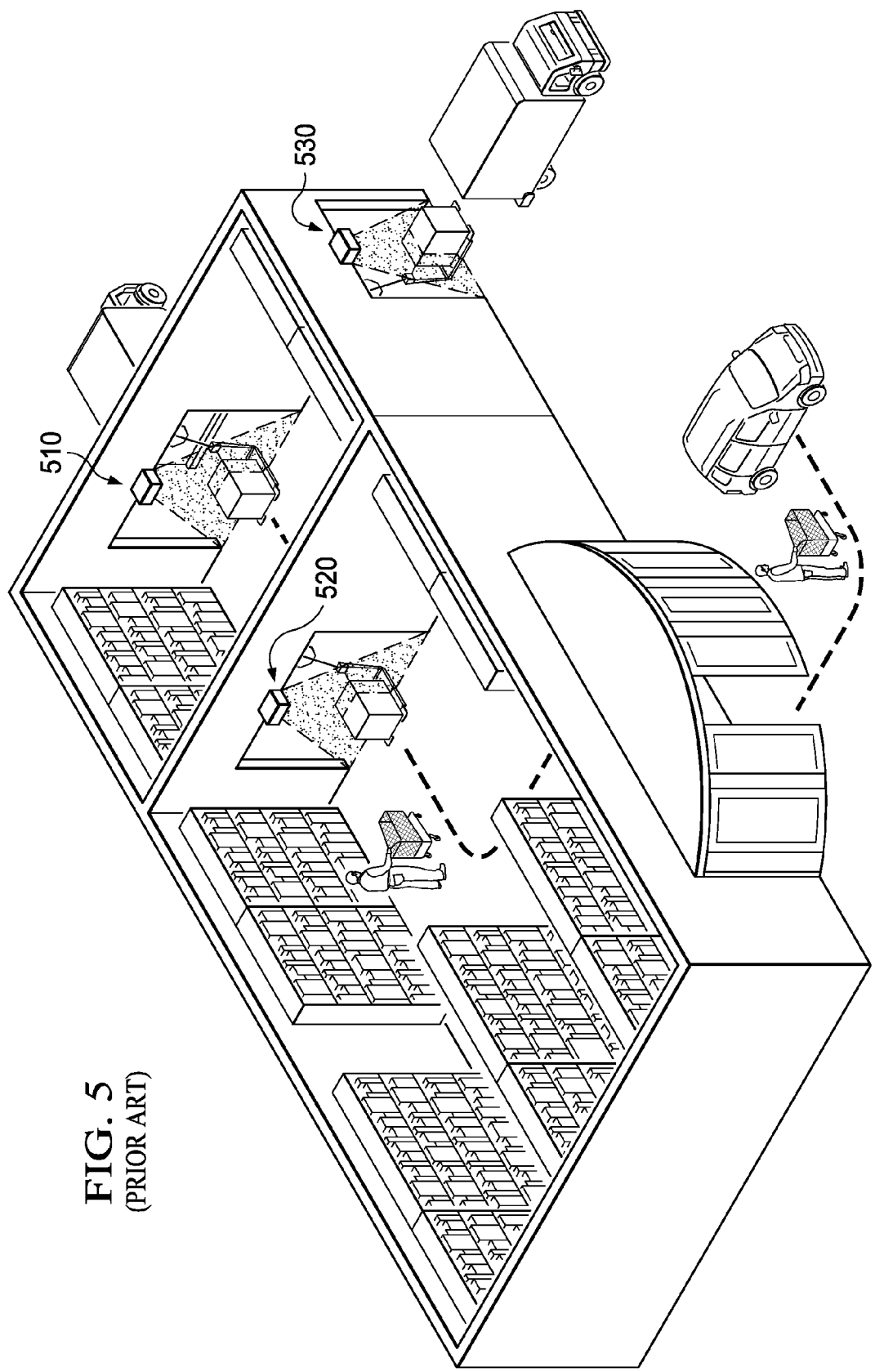
Figure 6:
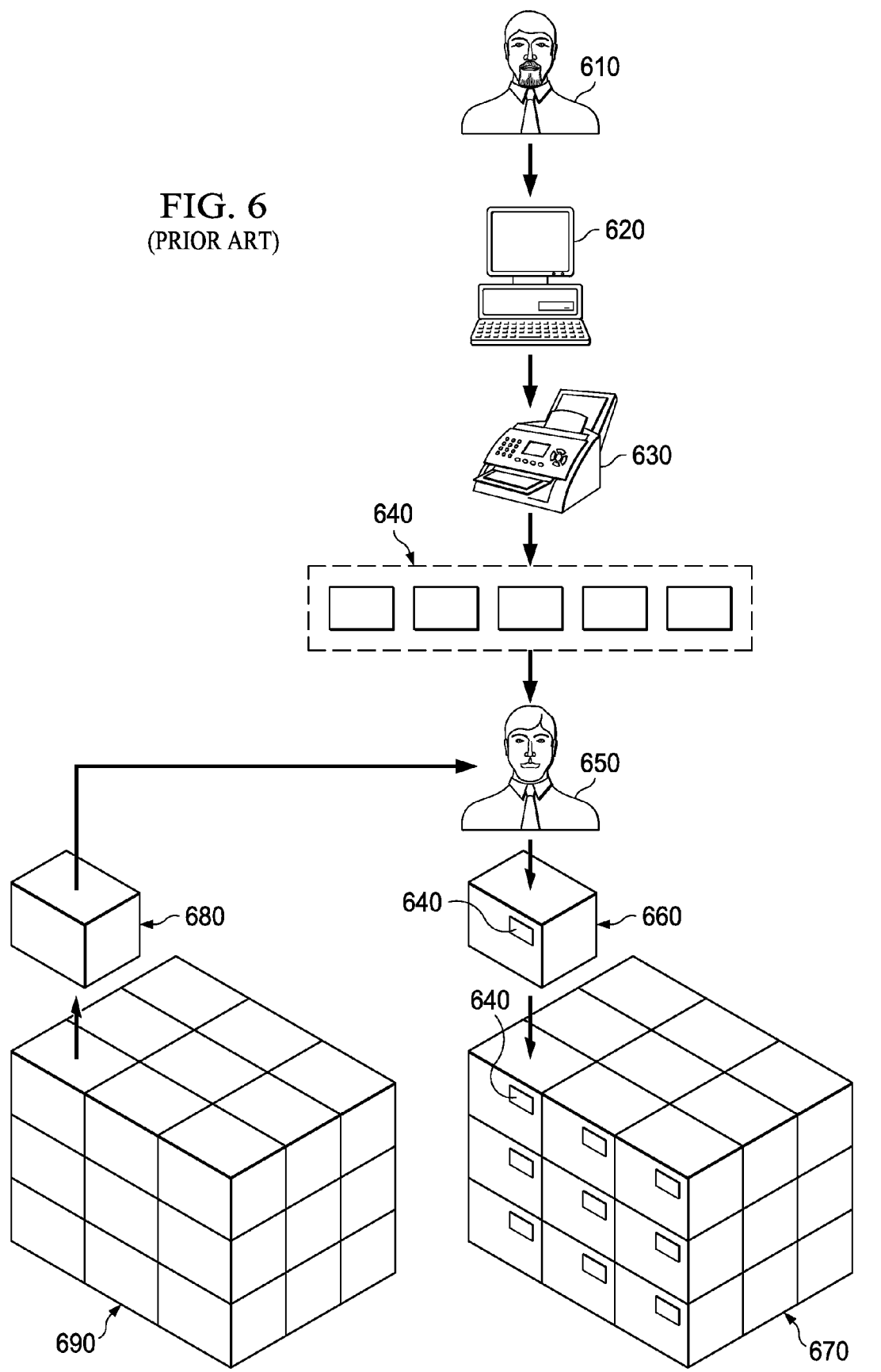
Figures 1, 21B:
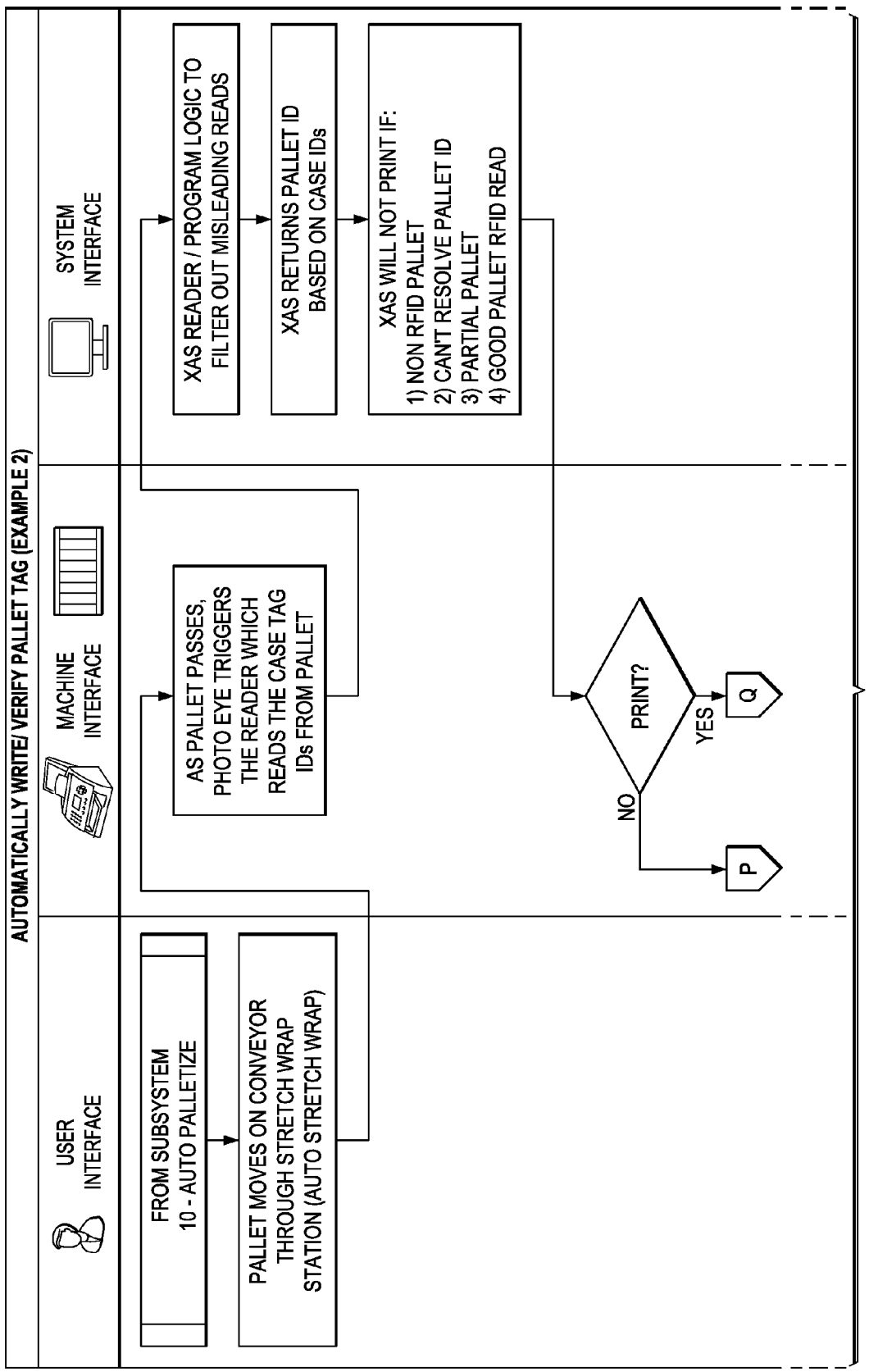

Turning now to FIG. 21B (collectively FIGS. 21B-1 and 21B-2, illustrated is flow diagram of an automated version of the RFID pallet tag encoding subsystem. Instead of the manually triggered event, a photo eye triggers the child read with the parent lookup. Those skilled in the art understand that there could be any number of triggering events that fall within the scope of the present invention. Again, several subsystems such as the compliance manager and printer applicator controller of the RFID application system are invoked to perform RFID pallet tag encoding and verification.

Figure 21C:
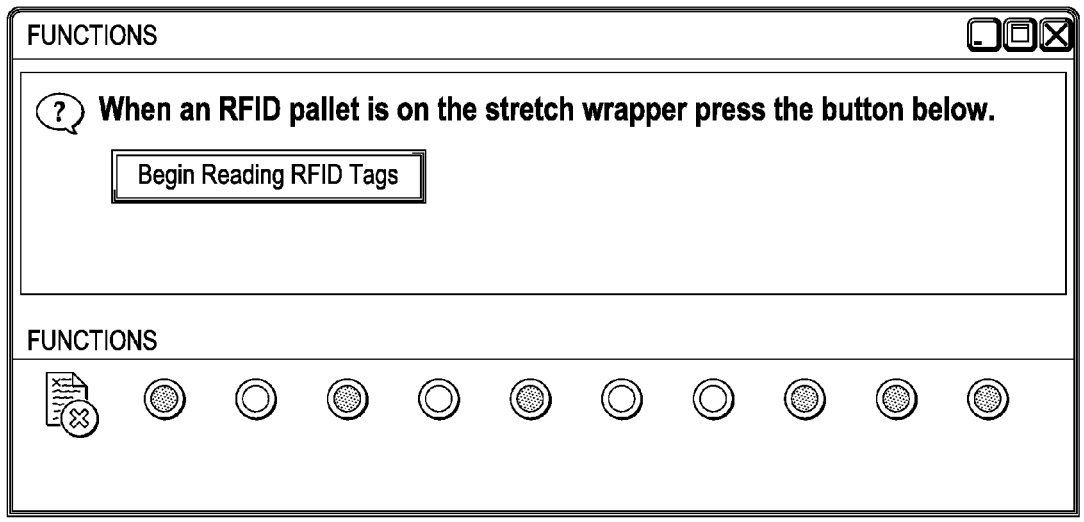
Figure 21E:
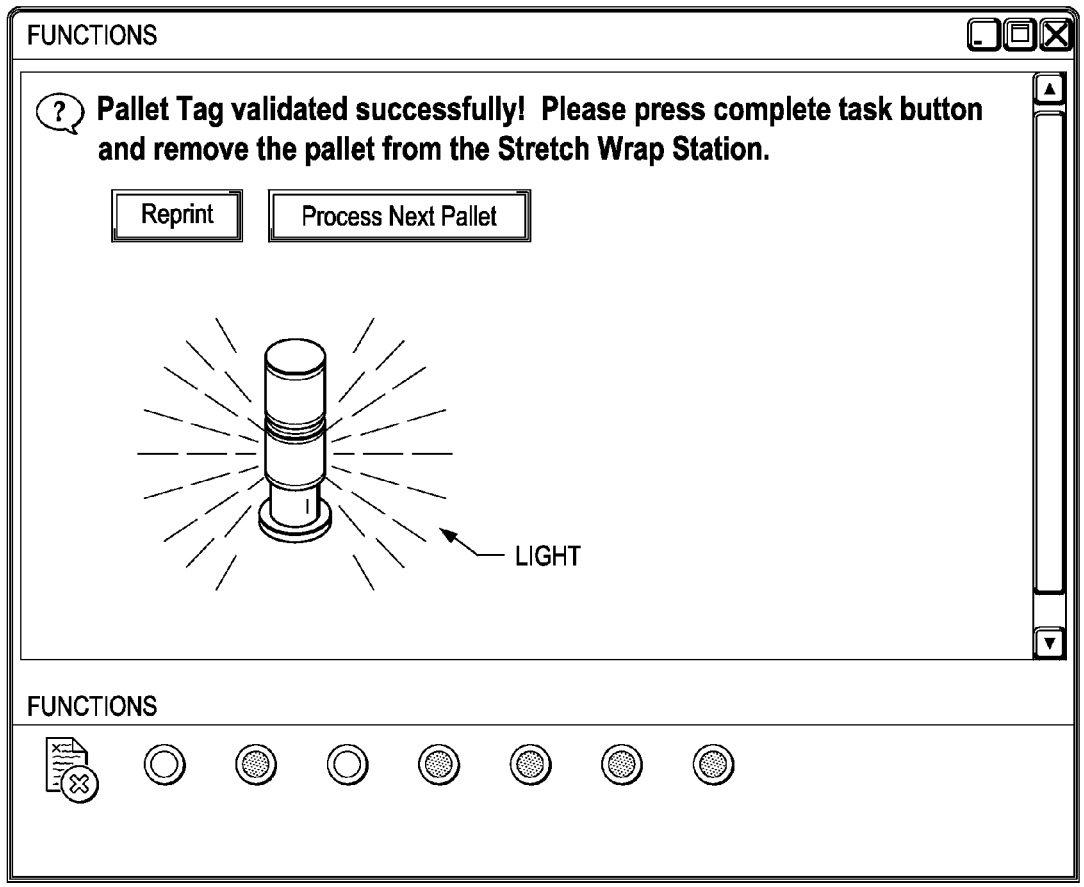
Figure 21D:
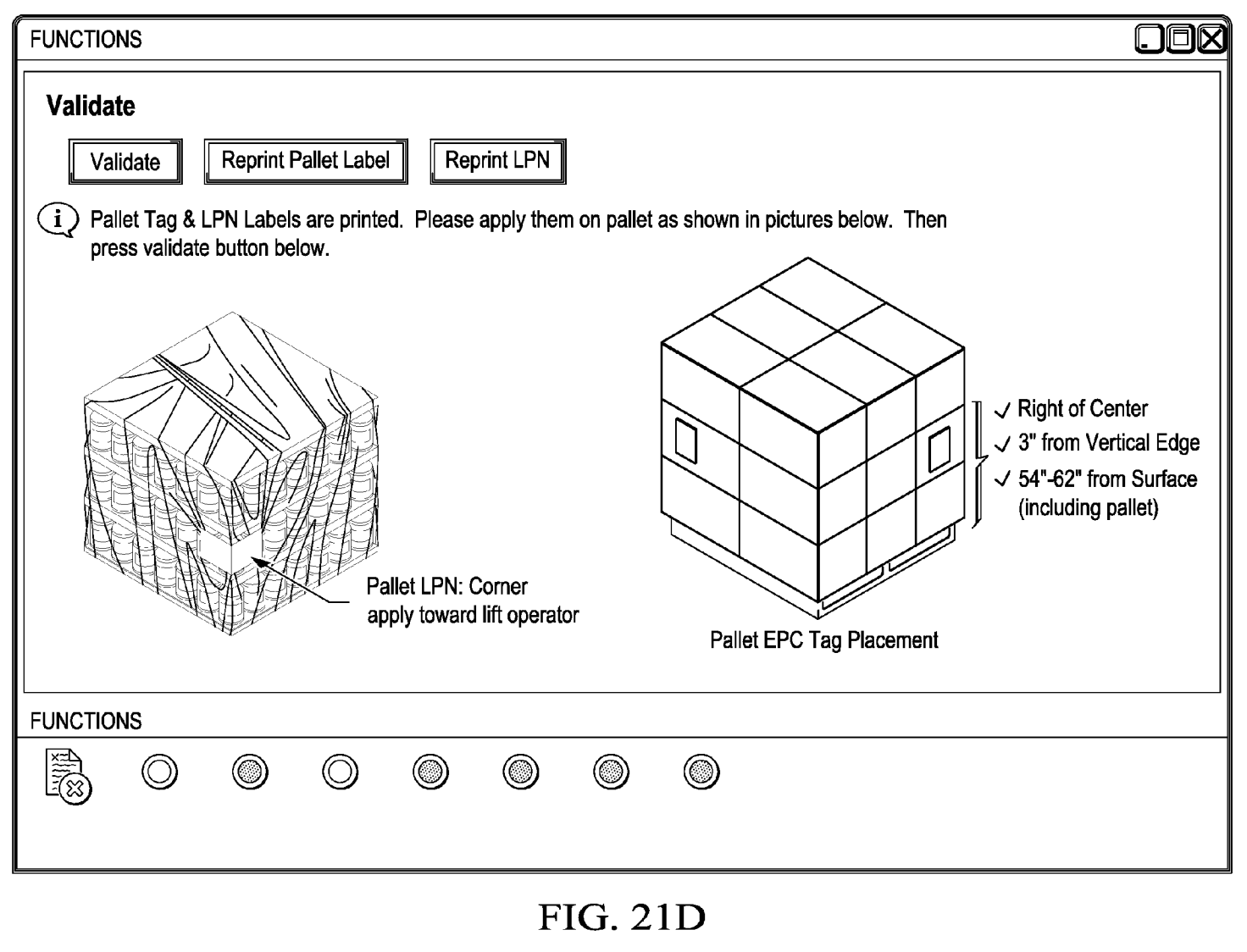

The screen shots provided in FIGS. 21C to 21E illustrate exemplary screens generated by the RFID application system to facilitate pallet RFID tag writing (and encoding) and verification. In addition, operator instructions are provided as needed, thereby reducing operator error and operator training. More specifically, FIG. 21C is an initial operator screen when performing the pallet RFID tag write/verify process. On this screen, the operator triggers the reading of case IDs so that the RFID application system will know to which pallet ID the cases belong. Once the RFID application system has identified which pallet ID and LPN goes on the pallet, it triggers the print jobs to the appropriate printers. The screen shot of FIG. 21D shows exemplary graphical instructions as to pallet RFID tag and LPN placement locations on the pallet. After the pallet RFID tag is applied, the operator will validate that the pallet RFID tag can be read. Once read successfully, the screen as illustrated in FIG. 21E will update dynamically with an icon. In the illustrated embodiment, an icon in the form of a light indicates a passing validation. If the validation failed, the light indicator may be red and the operator would be given the opportunity to reprint the pallet RFID tag and/or revalidate the pallet.

Figure 22:
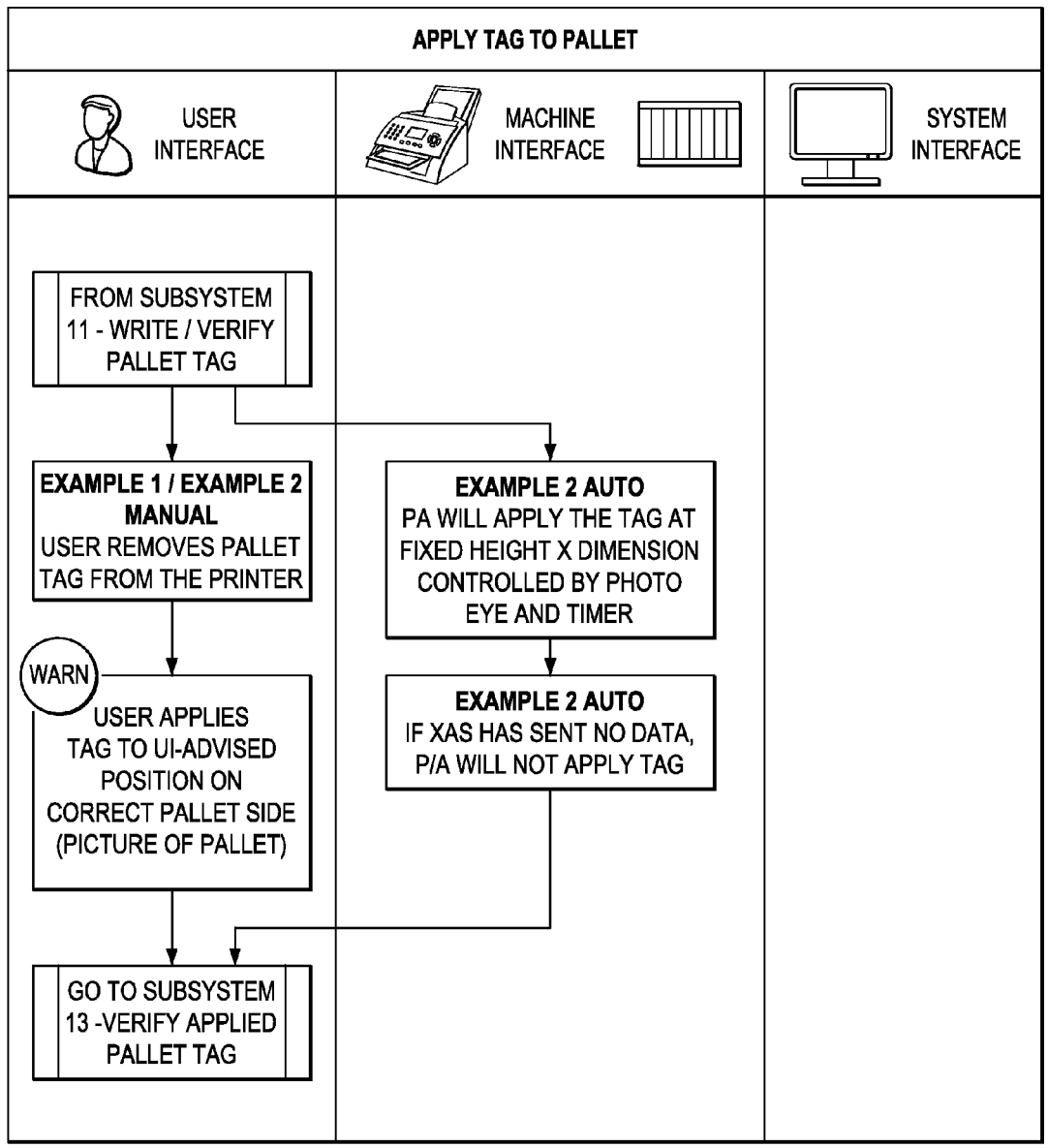

Turning now to FIG. 22, illustrated is a flow diagram of the application of an encoded and printed pallet RFID tag to a pallet in a location per an RFID mandate (referred to as "Subsystem 12" and designated step "12" in FIGS. 8 and 9). This is an illustration of a manual and automated application of the pallet RFID tag. In the manual process, the printed RFID tag is removed from a table top RFID printer, peeled, and applied to the pallet. The RFID application system provides the operator a user interface with a photo or graphic of where to apply the RFID tag on the pallet by specifying side and x-, and y-coordinates when facing that side.

The RFID application system in conjunction with the compliance manager provides a methodology by which the RFID tag may be located in a different place for different RFID mandate standards or in different places based on SKU. In either case, the user interface will provide the appropriate instructions to accomplish the task. Those skilled in the art understand that the location may vary SKU to SKU as the RFID properties of every product are not the same. The ability to account for this variation is within the context of the RFID application system.

Figure 23A:
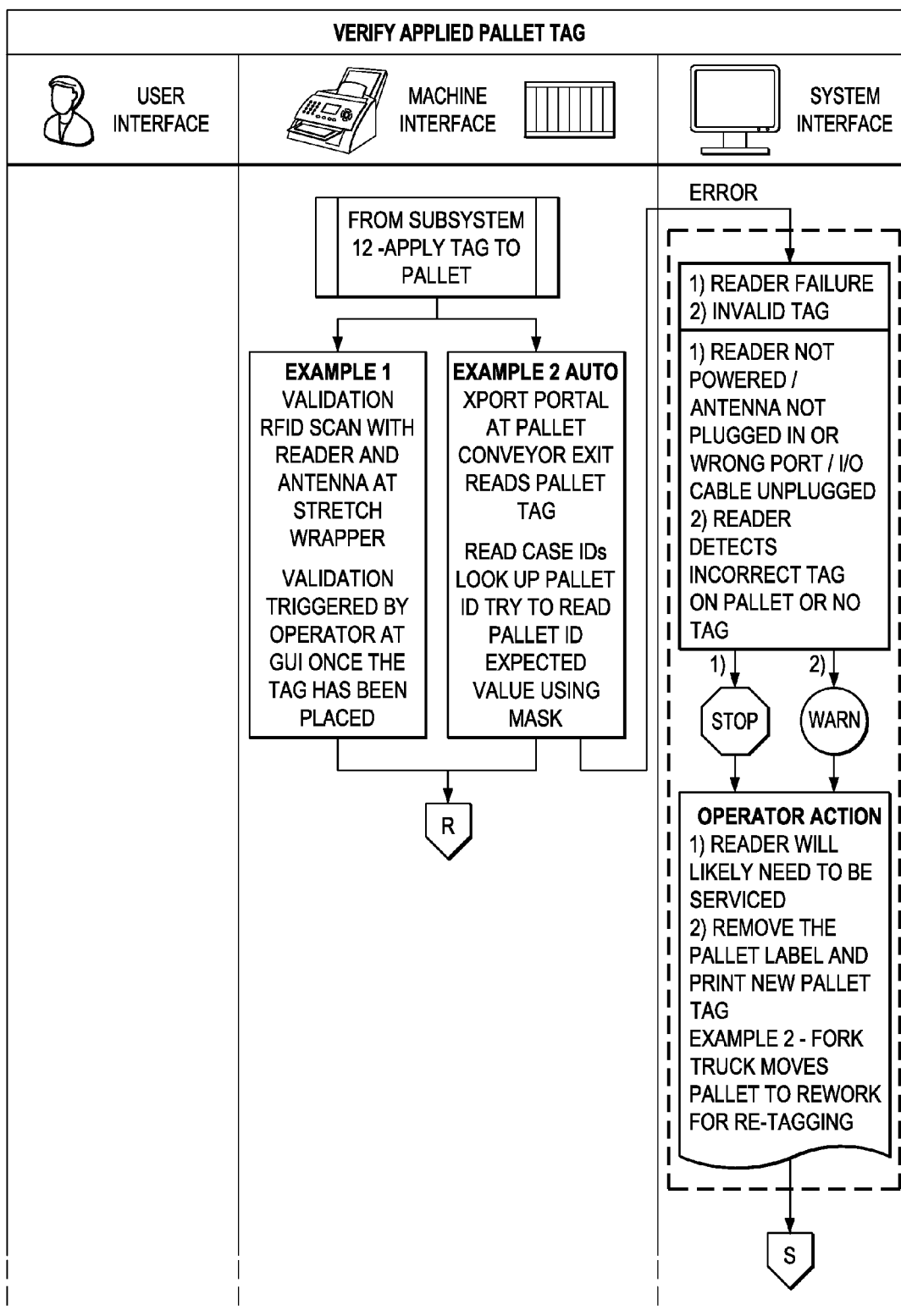
Figure 23B:
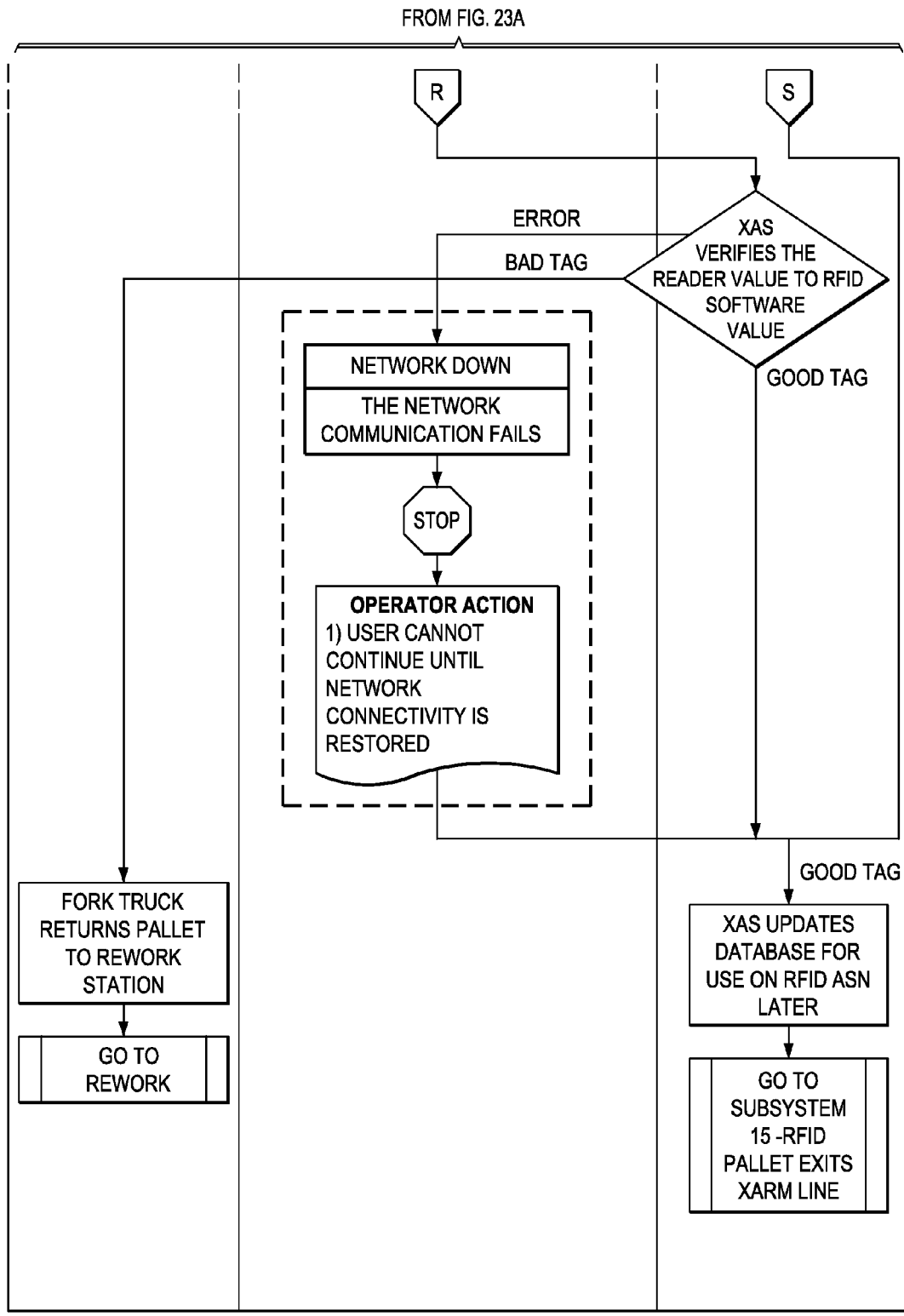

Turning now to FIG. 23 (collectively FIGS. 23A and 23B), illustrated is a flow diagram of a validation of the applied pallet RFID tag once placed on the pallet (referred to as "Subsystem 13" and designated step "13" in FIGS. 8 and 9). Since this is how the specification is defined by the retail establishment's standard in this embodiment (pallet ID should be read on the pallet), it is preferable that a validation read be performed in the same manner in which the retailer will be reading that pallet at their facility. There are automatic and manual methods described in the flow diagram that explain how the validation is performed. Again, an RFID reader may be configured by the configuration system of the RFID application system, and the validation process invokes several subsystems thereof such as the event manager to coordinate an operation of the RFID reader and the compliance manager to validate the RFID tag and the RFID tagged pallet.

The RFID application system also accommodates non-RFID pallets in these processes and has ways of determining if these are RFID pallets or not. For example, a non-RFID pallet would not have case IDs on the cases. The RFID application system leverages this knowledge in that upon sensing a pallet, it first attempts to read case IDs (indicated in a header value on the case ID). If no case RFID tags are read, then the RFID application system deduces that the current pallet is a non-RFID pallet and skips RFID processes therefor. This additional flexibility is important to a complete solution offering since current mandate volumes need not be at 100% of production, and "RFID only" is not a requirement of the RFID application system. As such, customers have the capability to RFID tag a small percentage of their products and scale that volume up as mandates evolve. The RFID application system pragmatically accommodates these operational realities while existing as a scalable solution.

After the pallet RFID tag is applied, operators may take the pallet away to storage or to shipping for loading onto an outbound vehicle. If the pallet is still to be moved with a warehouse management system ("WMS") or with any other type of inventory tracking system, it will likely be necessary to re-apply the license plate number ("LPN") so that the WMS can locate the product efficiently.

Figure 24A:
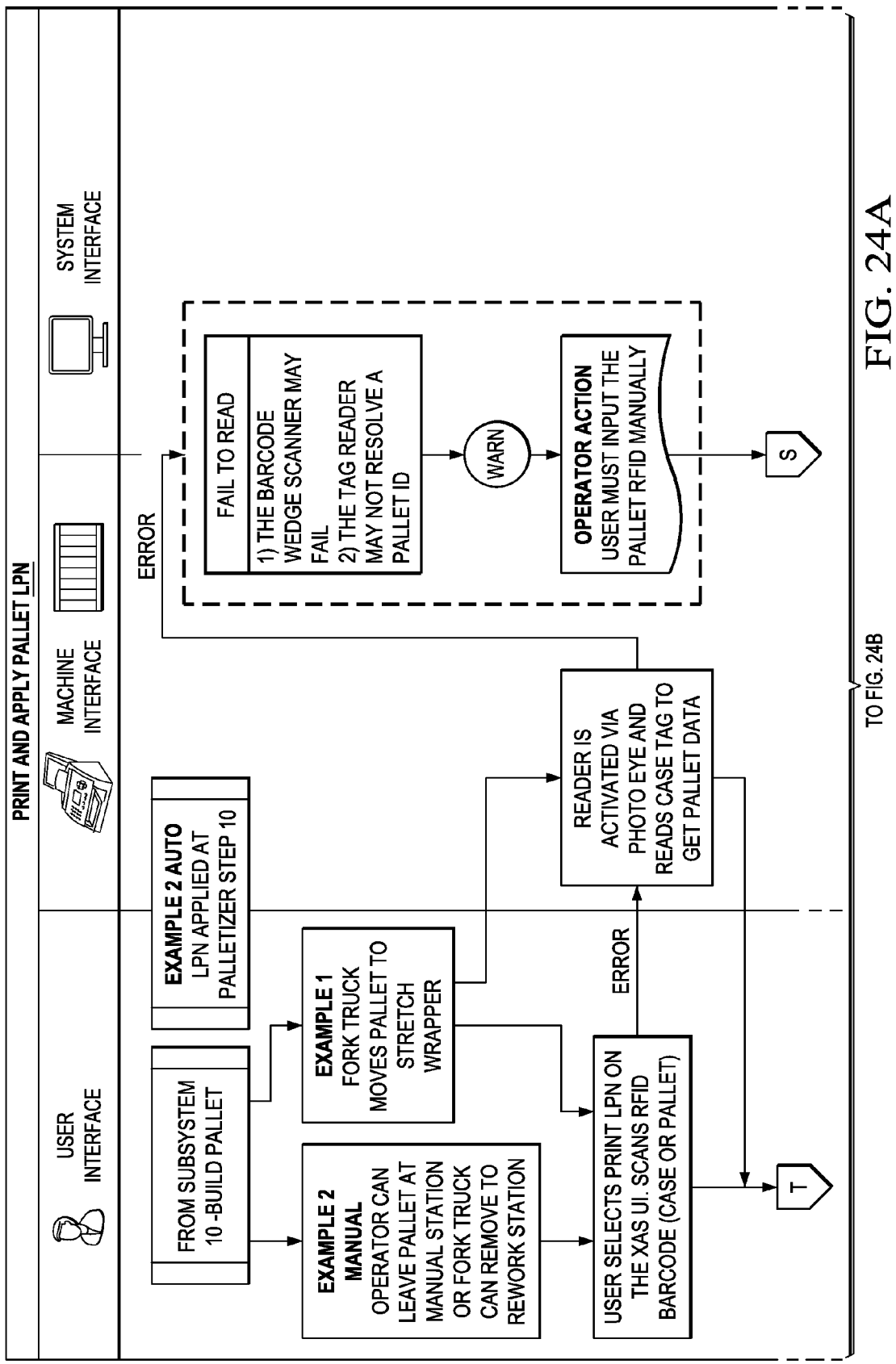

Turning now to FIG. 24 (collectively FIGS. 24A and 24B), illustrated is a flow diagram that demonstrates printing and re-application of the LPN which, as an integration of the RFID application system in cooperation with the WMS operations, further makes the system more seamless to operator (referred to as "Subsystem 14" and designated step "14" in FIGS. 8 and 9). In addition, this step in the process allows for better inventory control of RFID tagged pallets so that the additional cost of RFID tags and labor do not to go to waste if the pallet were to be accidentally shipped to a customer that is not equipped to receive RFID pallets/cases.

Figure 25:
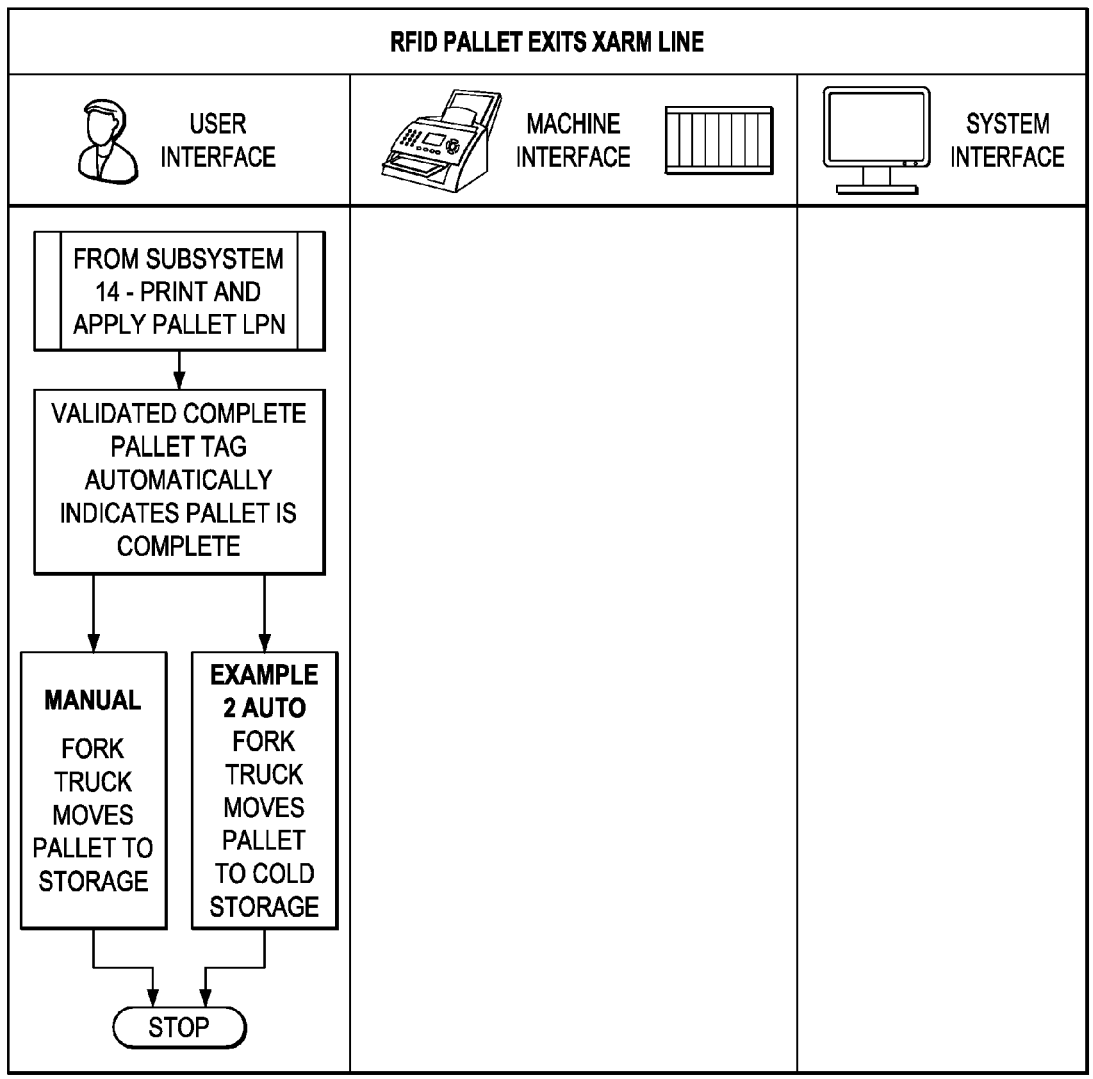

Turning now to FIG. 25, illustrated is a flow diagram demonstrating a pallet leaving the RFID system area once the LPN or moveable unit identification is on the pallet (non-RFID labeled in this example) (referred to as "Subsystem 15" and designated step "15" in FIGS. 8 and 9). The RFID application system allows for fully integrated RFID/LPN tags. The FIGURE illustrates how fork lift operators or material handling equipment are capable of removing the product from a line of the RFID system for movement into storage racks, loading into shipping trucks, or any other pre-designated function. An event manager of the RFID application system may coordinate the activity associated with moving the pallets.

Figures 1, 26A:
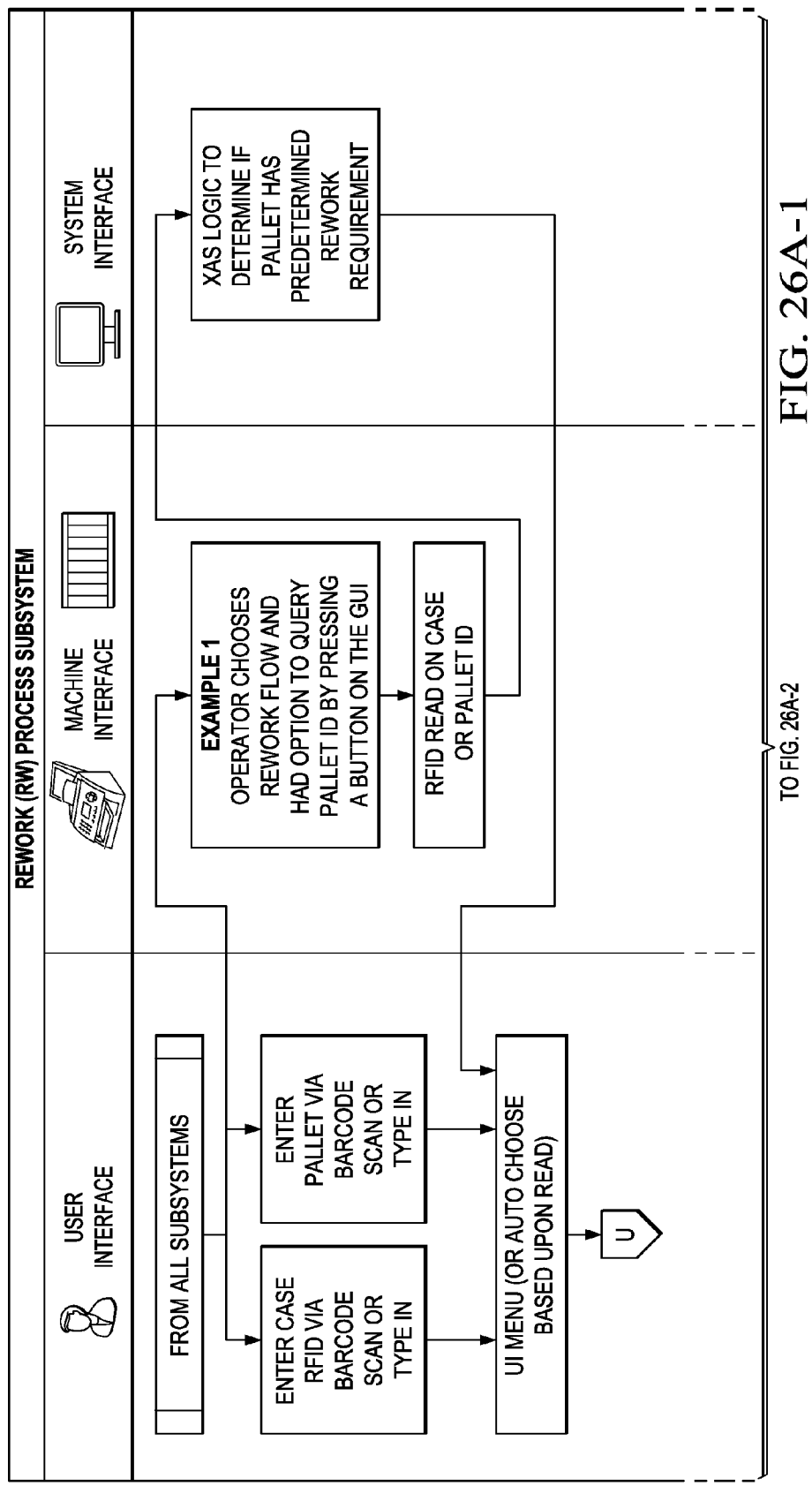

Turning now to FIGS. 26A (collectively FIGS. 26A-1 and 26A-2) to 26F, illustrated are flow diagrams and screen shots demonstrating a rework operation in the event of damaged cases or post-application RFID tag failure (referred to as "REWORK" and designated step "RW" in FIGS. 8 and 9). While the RFID application system alleviates many of the errors associated with the conventional processes, the RFID application system provides end-to-end RFID solution capabilities and includes a capability for reworking RFID tagged products in the event of emergencies or accidents and can maintain records of the specific errors (e.g., RFID tag in the wrong location or defective RFID tag) for quality assurance.

For example, if an RFID tagged pallet is stored in the warehouse racks and an operator of a forklift hits and damages two RFID tagged cases, the RFID tags may survive the impact, but the cases may be damaged to the point of loss. Instead of negating the entire pallet of RFID cases and removing them from the database, the rework process allows for the operator to add two more cases in good condition while the RFID application system automatically provides two more case IDs with correctly encoded values via the compliance manager. Not only are the RFID case labels encoded, but the RFID application system automatically updates the damaged RFID tags as damaged status as well as automatically appends the two new tag identification numbers as children of the original pallet ID. The solution provides that operators tell the RFID application system for which RFID tags they want replacements, and they have three options for identifying the rework candidates.

Figure 26B:
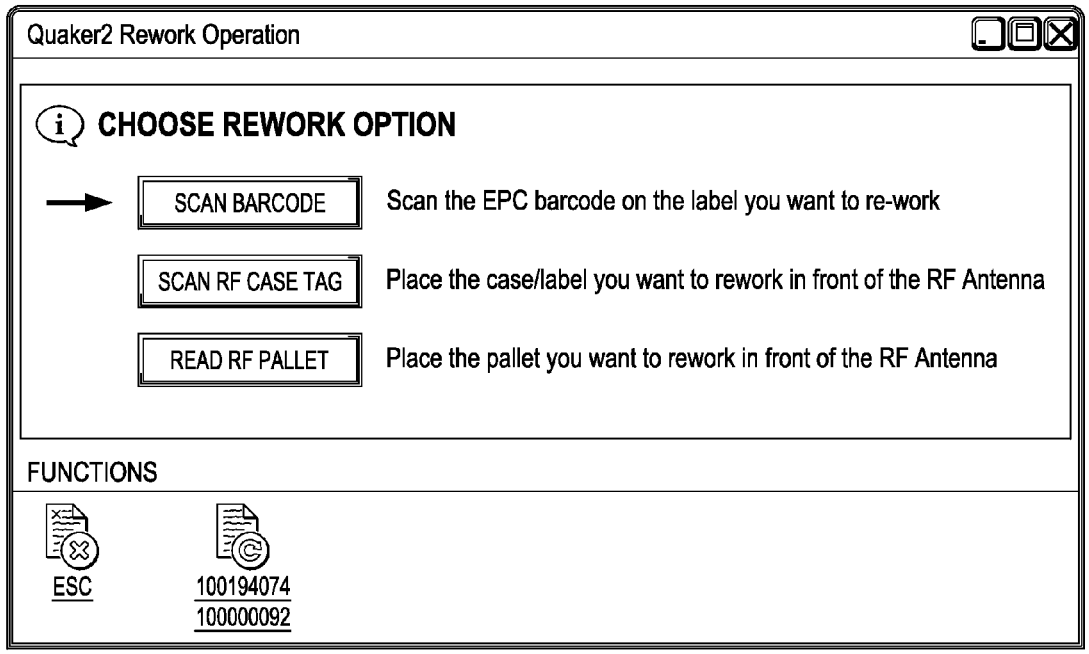
Figure 26C:
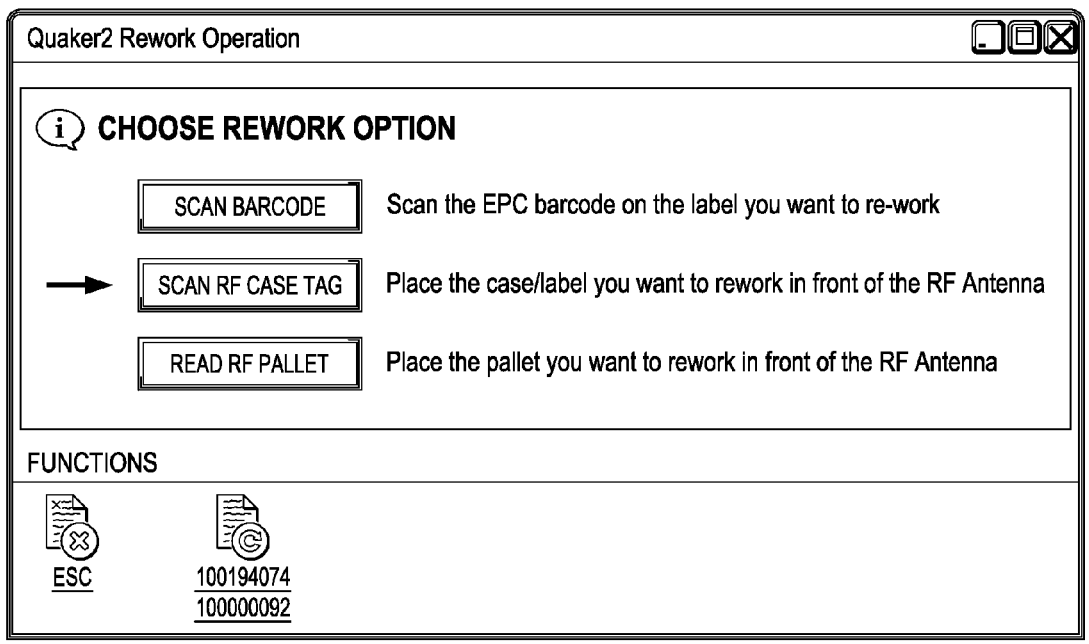
Figure 26D:
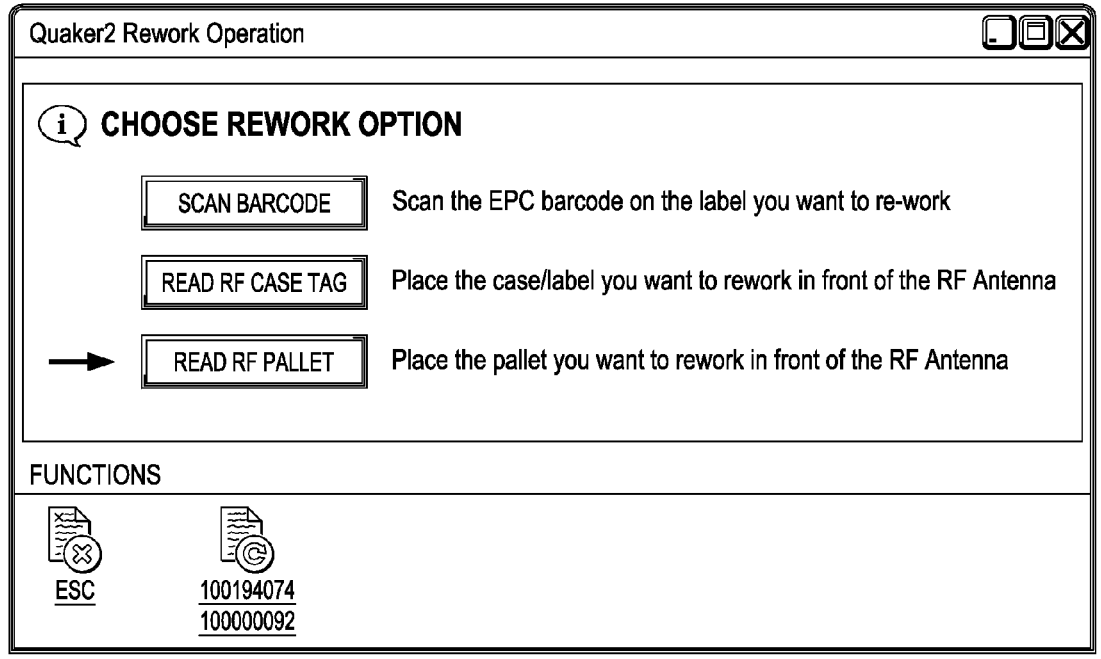
Figure 26E:
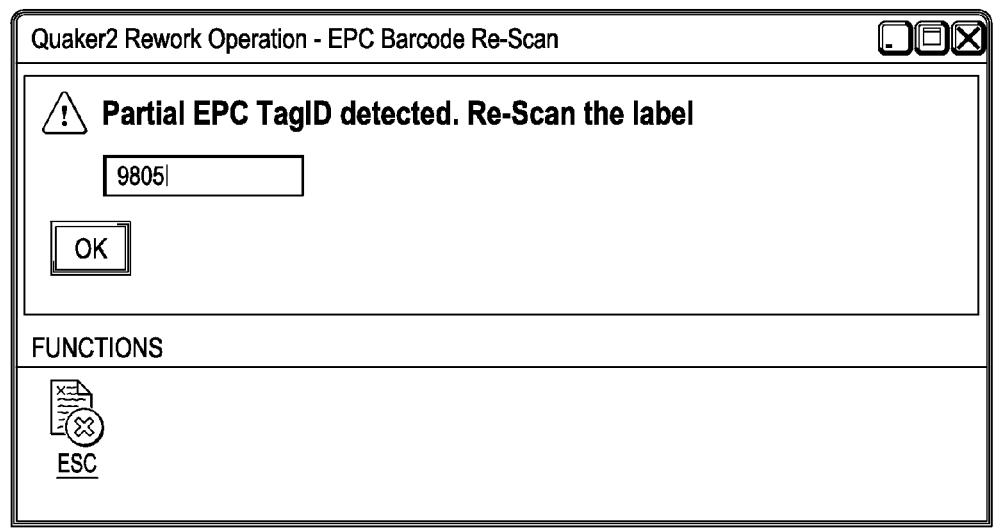
Figure 26F:
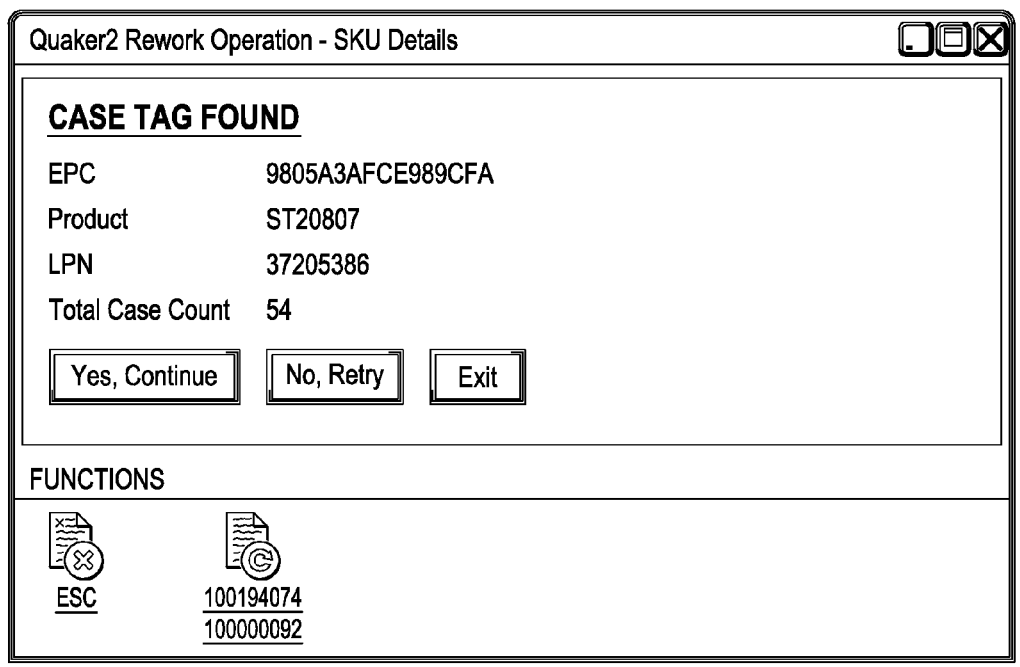
Figure 27:
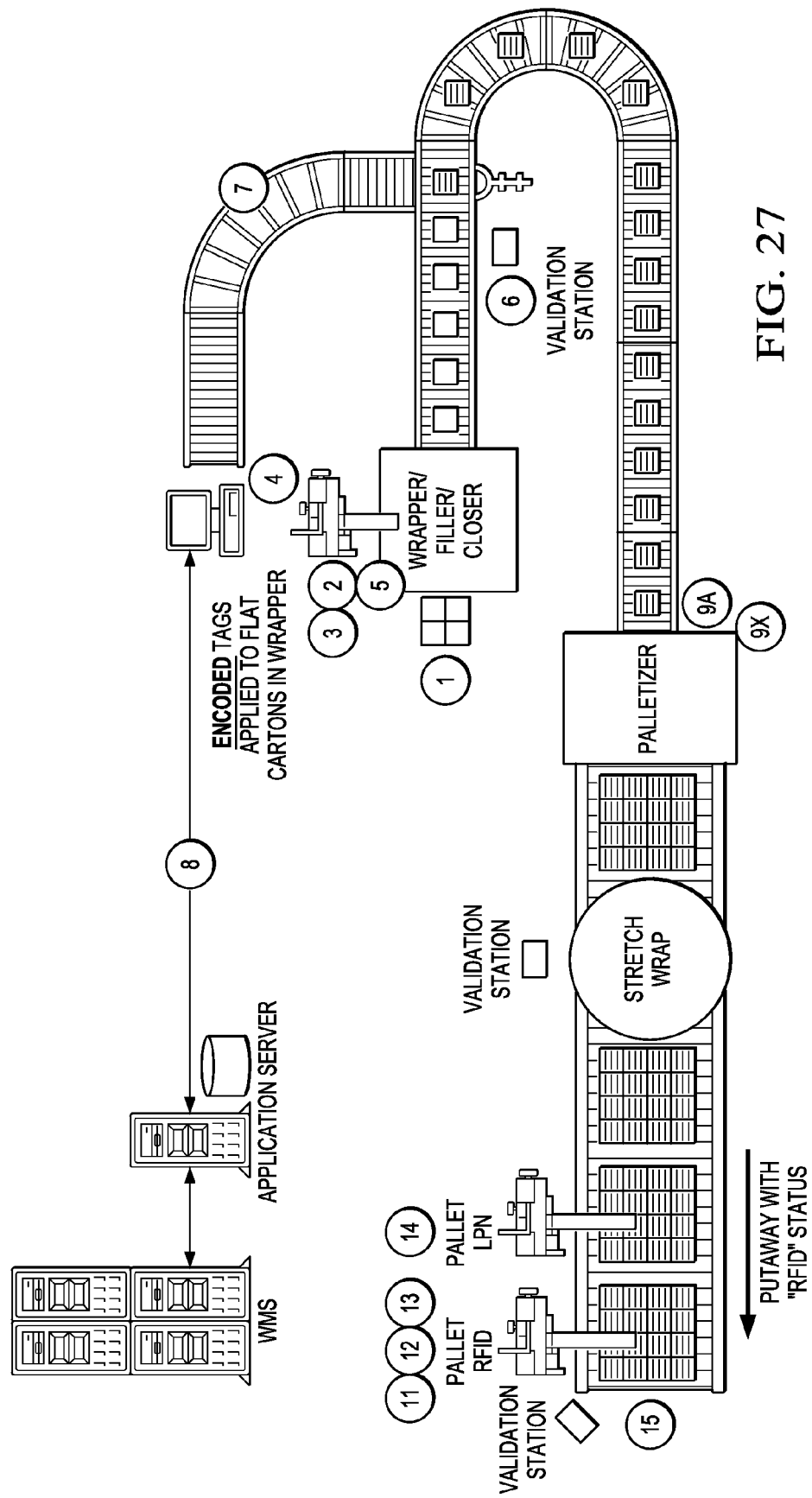
FIGS. 27 to 43 illustrate a system level diagram and flow diagrams of an embodiment of an RFID system including an embodiment of an RFID application system that demonstrate exemplary steps of operating the same in accordance with the principles of the present invention.
Figure 28:
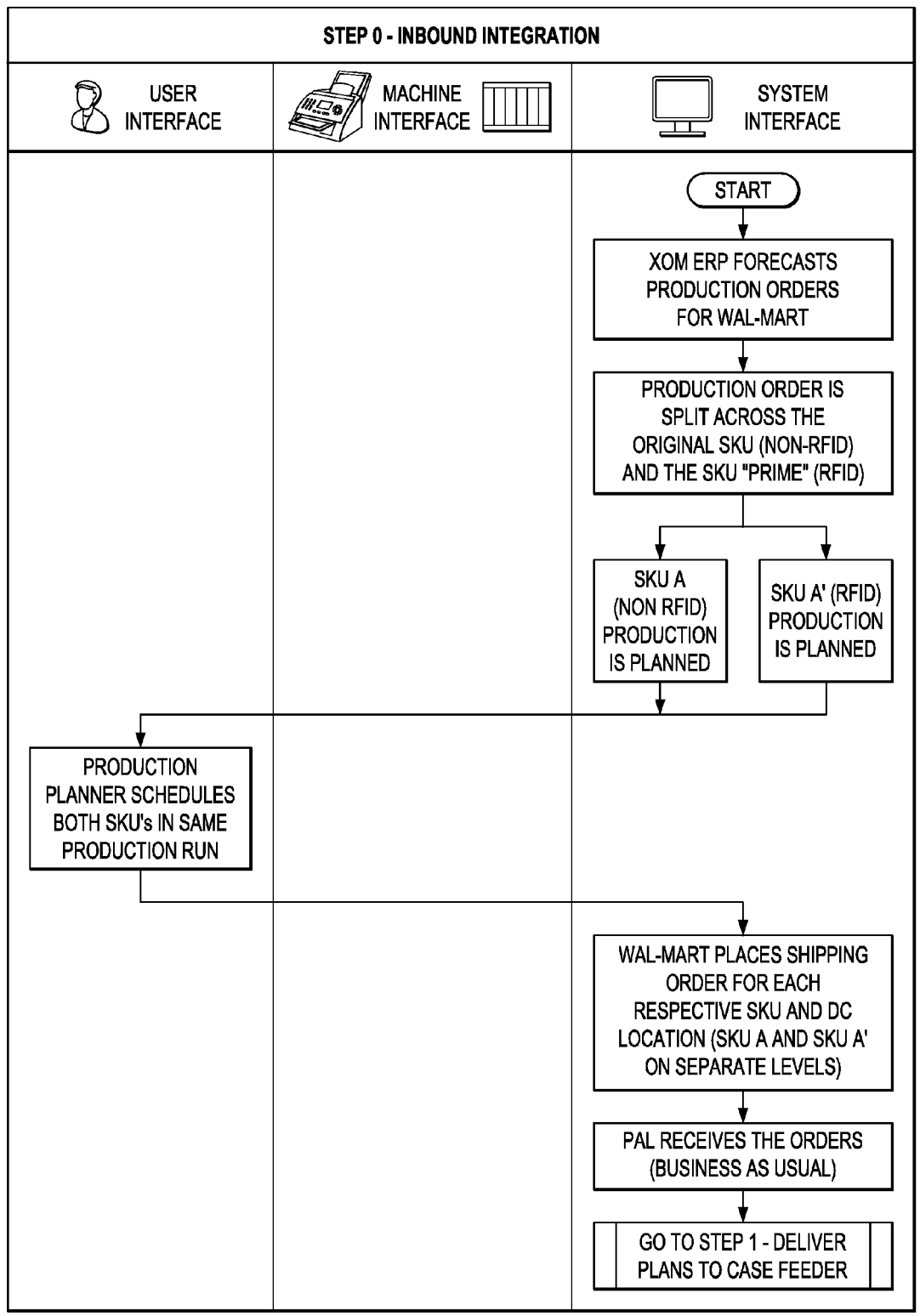
Figure 29:
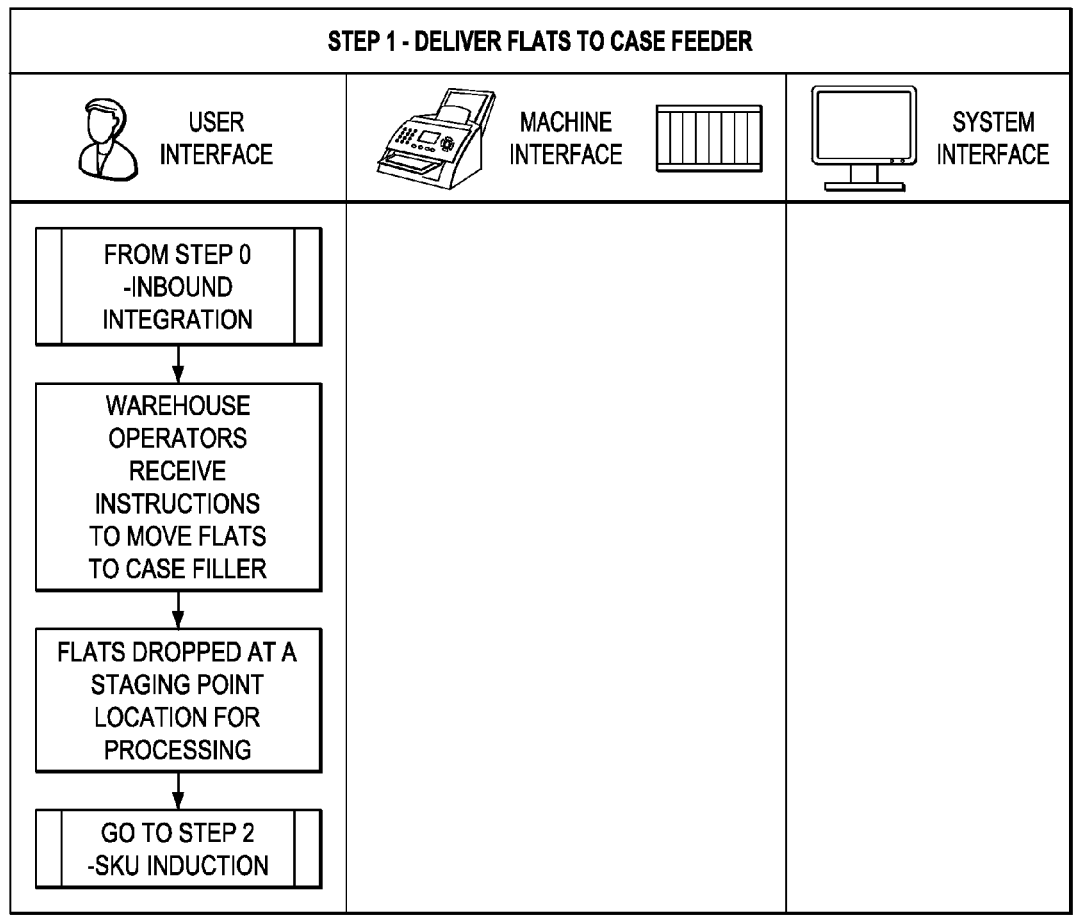
Figure 30:
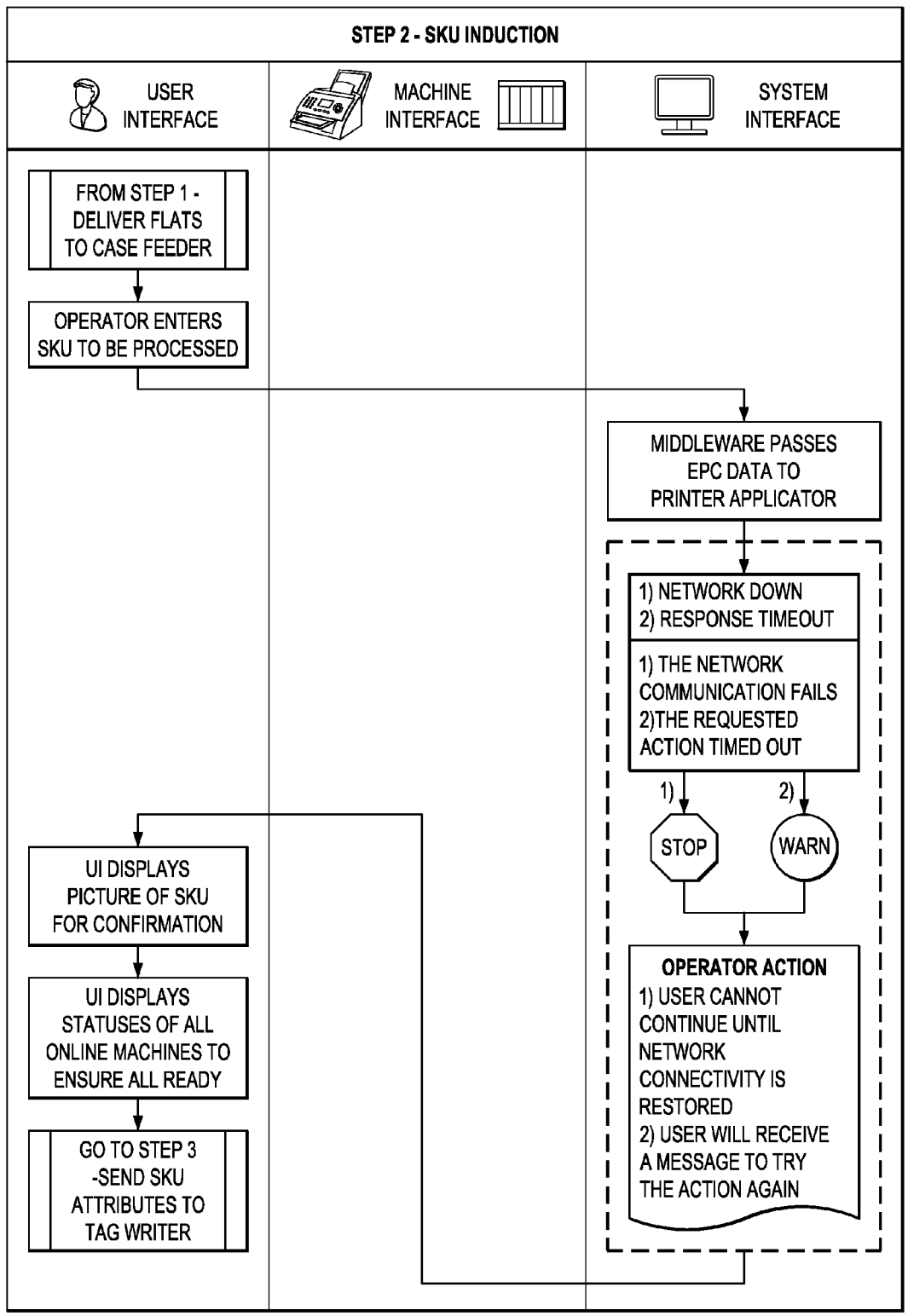
Figure 31:
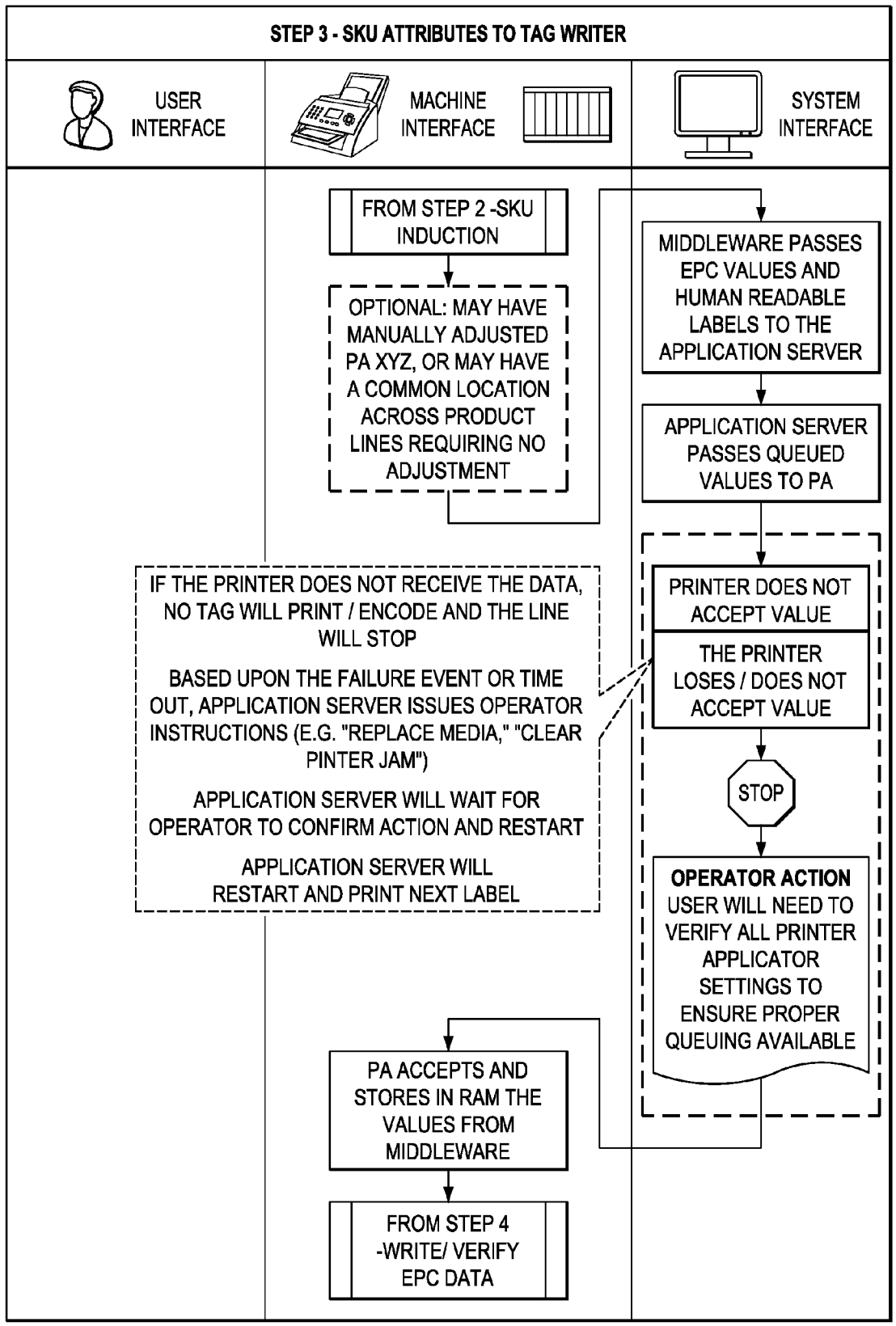
Figure 32:
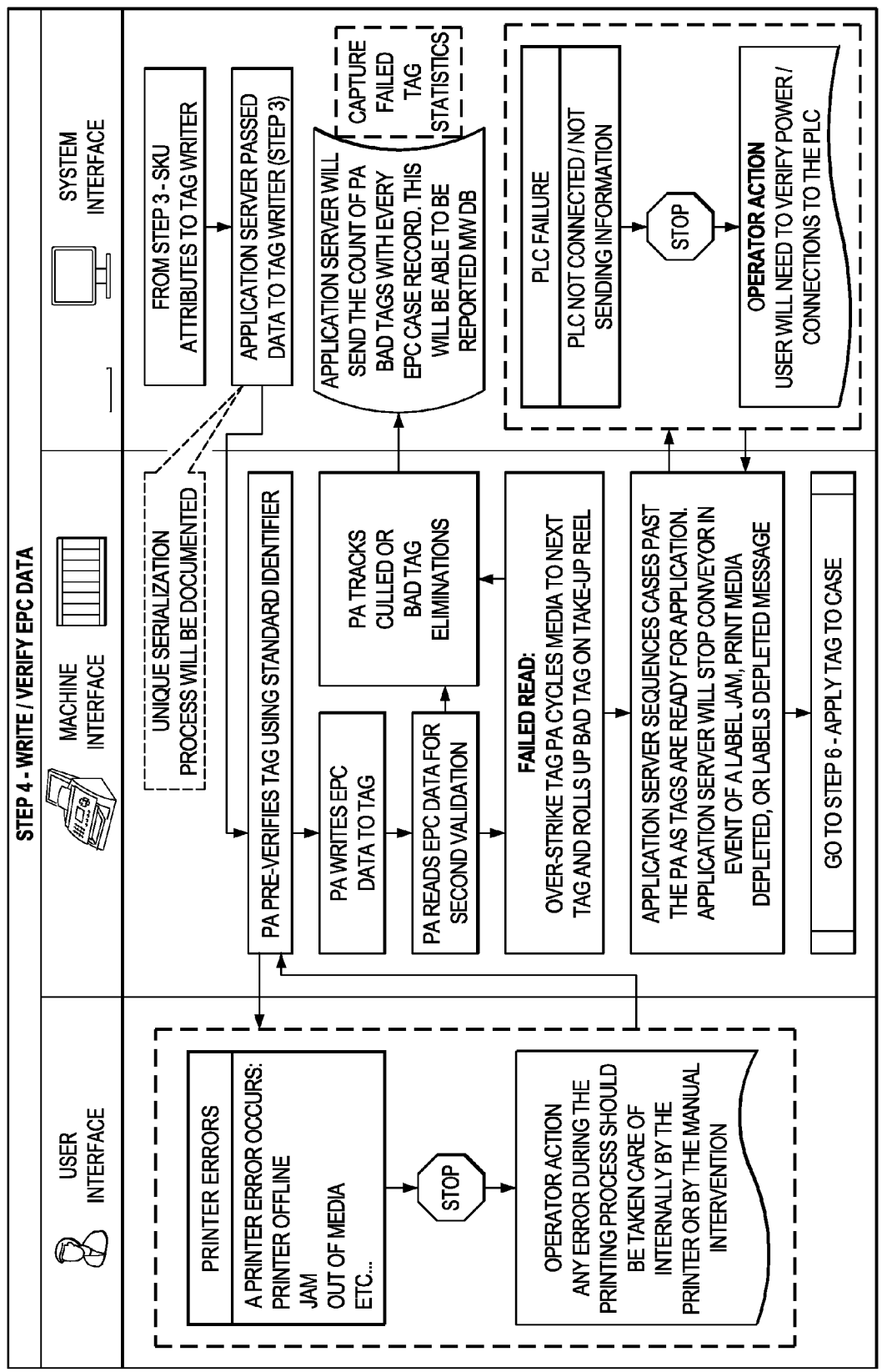
Figure 33:
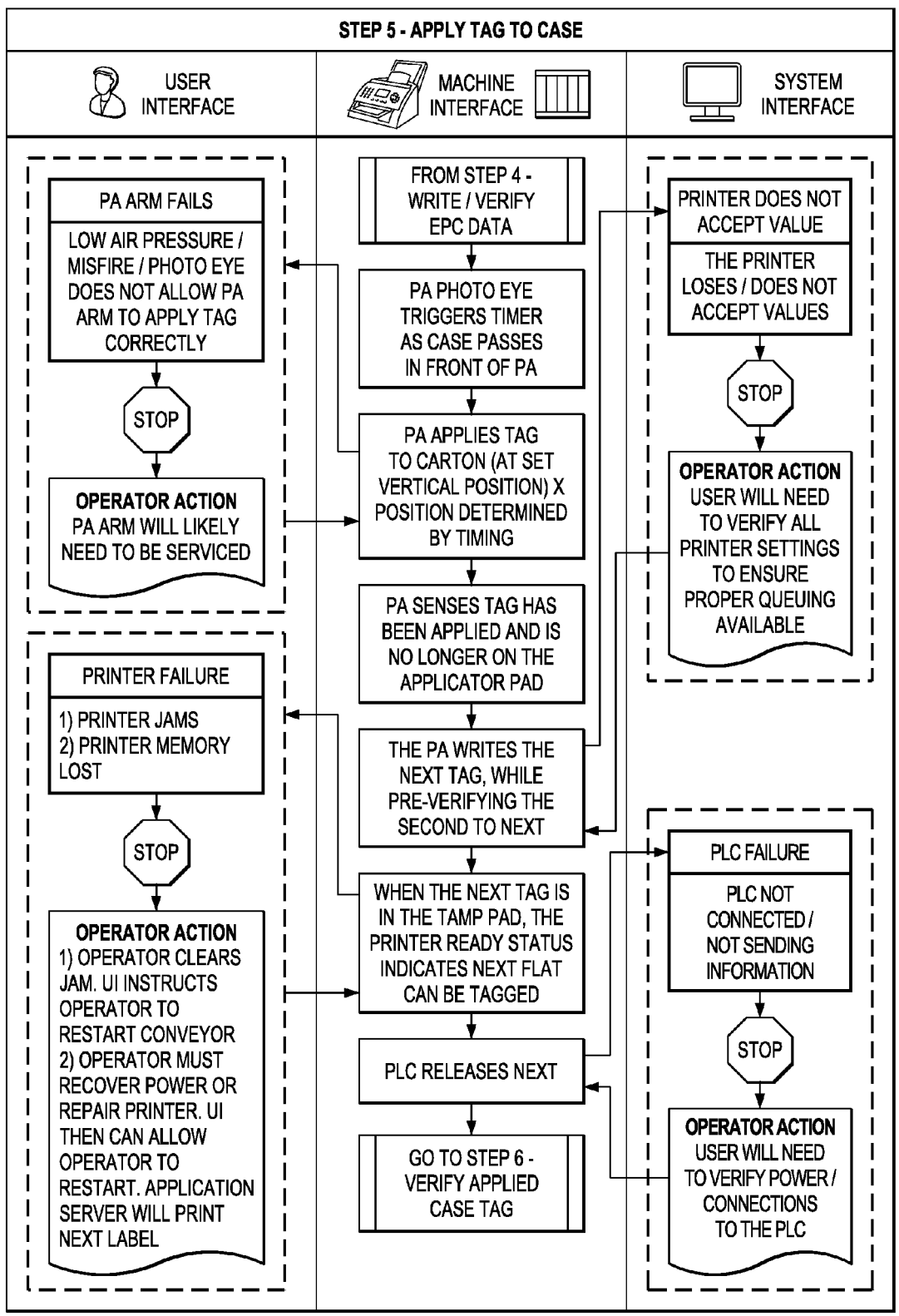
Figure 34:
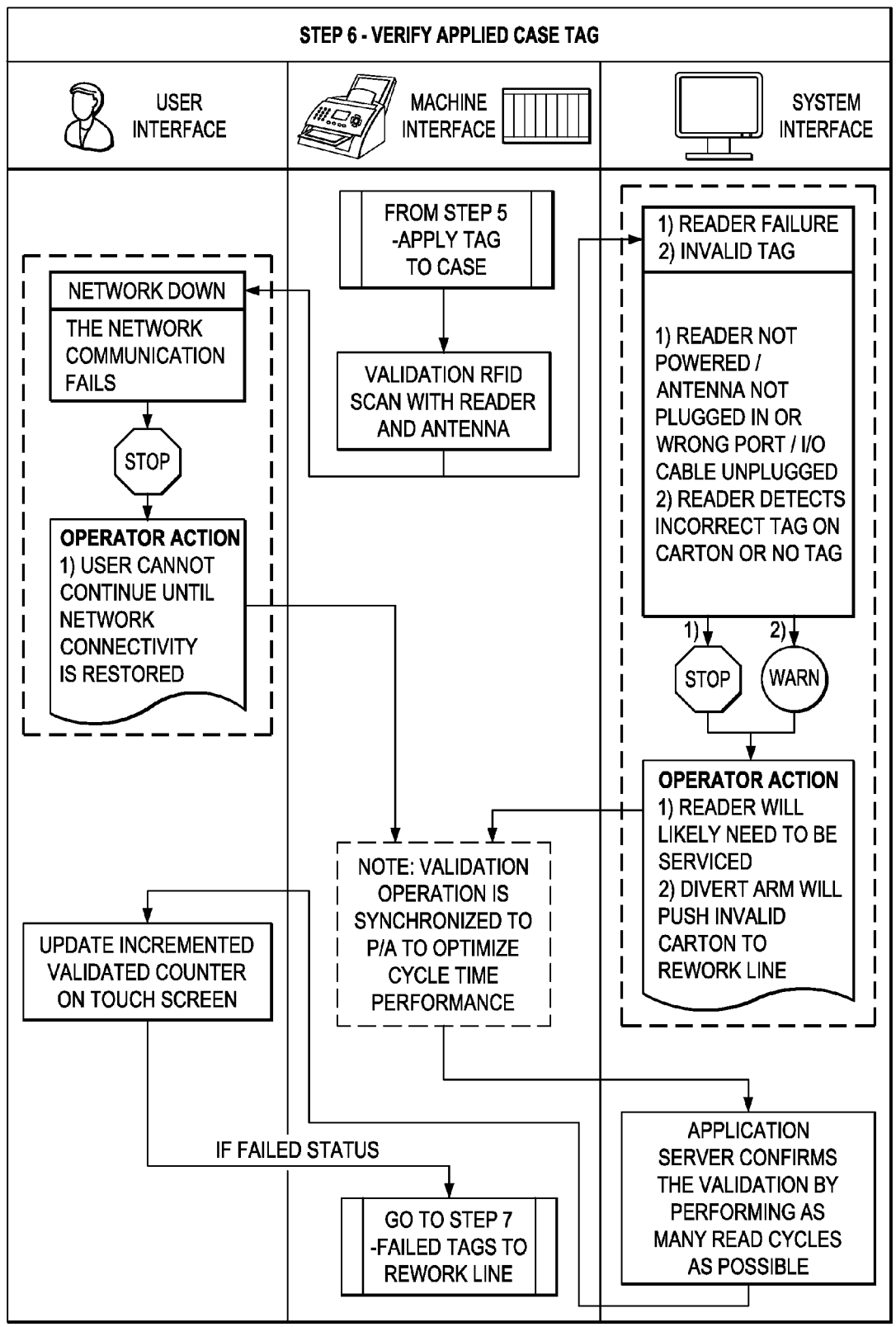
Figure 35:
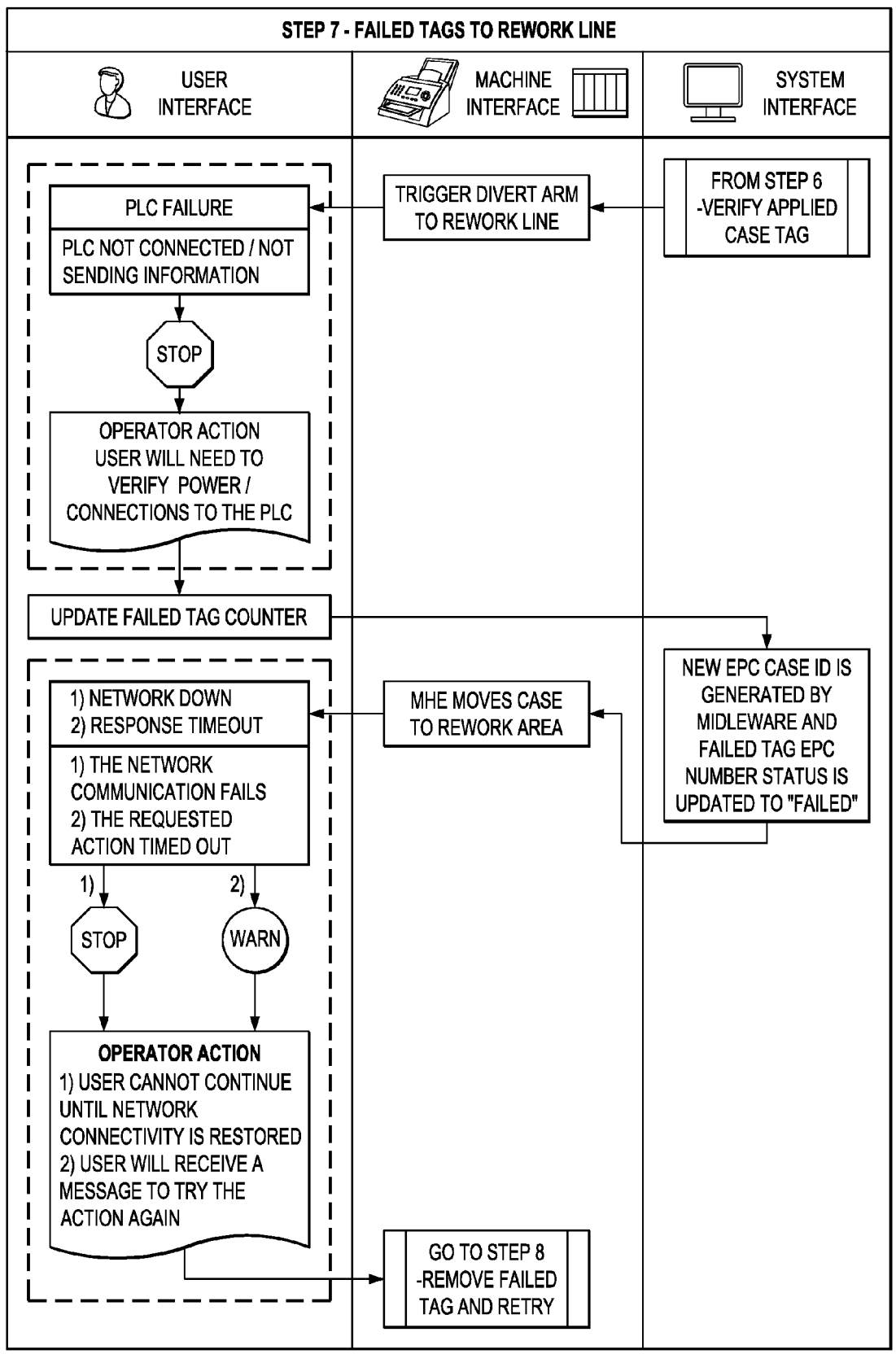
Figure 36:
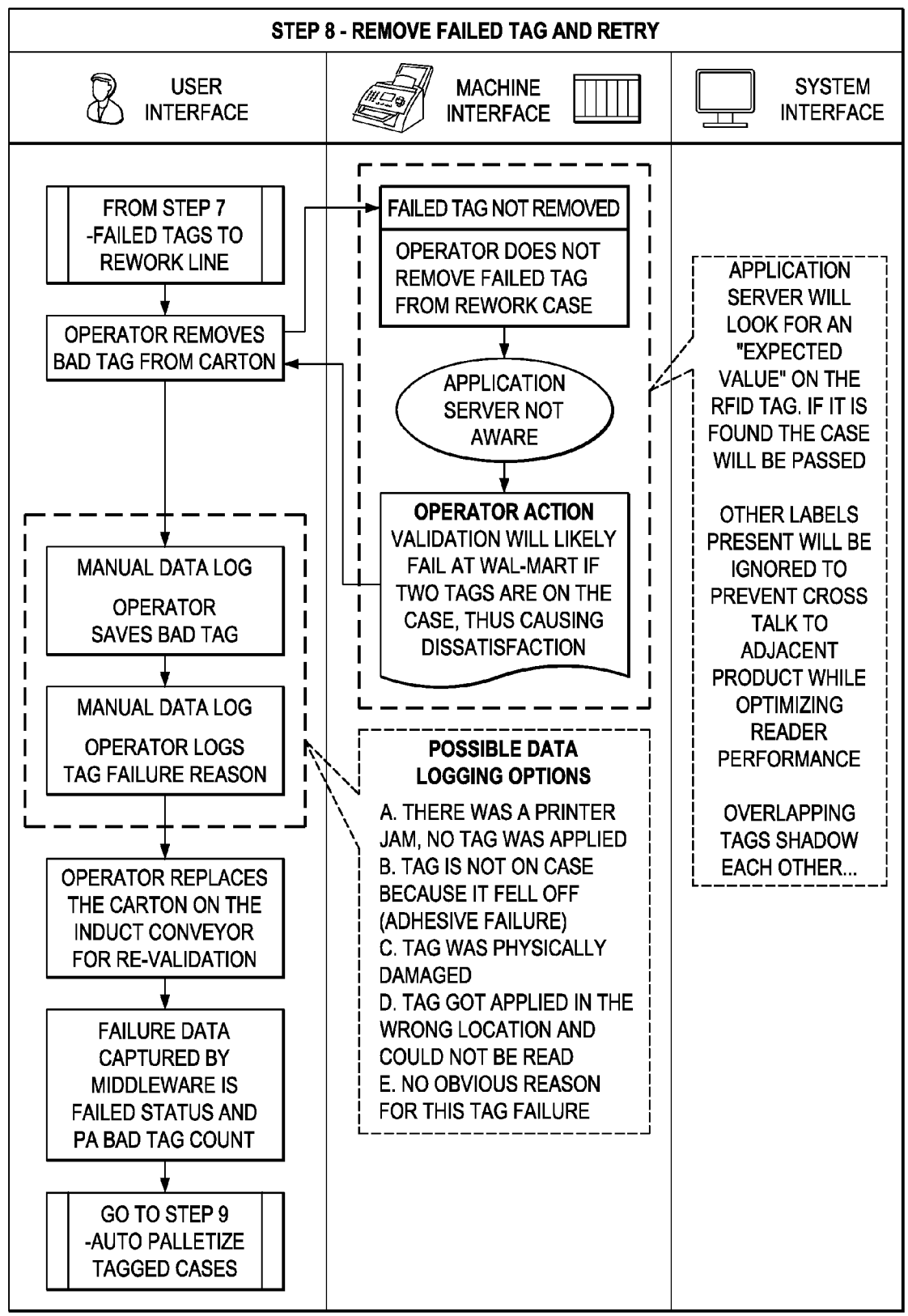

FIGS. 26B to 26F illustrate exemplary screen shots generated by the RFID application system to facilitate the rework process. In addition, operator instructions are provided as needed and, consequently, operator error and operator training are reduced. The options of the screen in FIG. 26B illustrate how operators may scan the tag identification barcode printed on the case label. The RFID application system automatically queries the barcoded value, automatically prints/encodes a replacement, and updates the database records. The options of the screen in FIG. 26C illustrates how operators may RFID scan the tag identification number via an RFID reader and antenna. The RFID application system in conjunction with the event manager, compliance manager and printer applicator controller automatically queries the case tag value, automatically prints/encodes a replacement RFID tag, and updates the database records. The options of the screen in FIG. 26D illustrate how operators may RFID scan the entire pallet of cases and pallet IDs in the event that some case RFID tags are missing entirely. The RFID application system automatically queries the RFID read values, automatically identifies and displays the expected RFID tags on that pallet, allows for the operator to manually choose which RFID tags to replace, automatically prints/encodes a replacement, and updates the database records. The screen in FIG. 26E illustrates an example of how the RFID application system will trap errors if operators supply errant, invalid, or non-existent tag identification numbers. The screen in FIG. 26F illustrates how operators may receive rework RFID tag confirmation so that operators have feedback that the RFID tag entered is located in the system from which it was originally created.

The exemplary FIGURES and accompanying description contained herein are indicative of actual RFID applications, and those skilled in the art realize that many embodiments and permutations of the RFID application system could exist from the systems, subsystems or objects disclosed herein. The aforementioned example is intended to convey an understanding of how the RFID application system can be employed to enable RFID compliance and is not restricted to the illustrations and application provided above. Additionally, exemplary subsystems and modules within the RFID application system were illustratively and non-exhaustedly invoked to perform the aforementioned steps. The RFID application system is preferably an automated system that controls and monitors the RFID system and provides status, alarms, logs and/or corrective measures therefor.

Figure 37A:
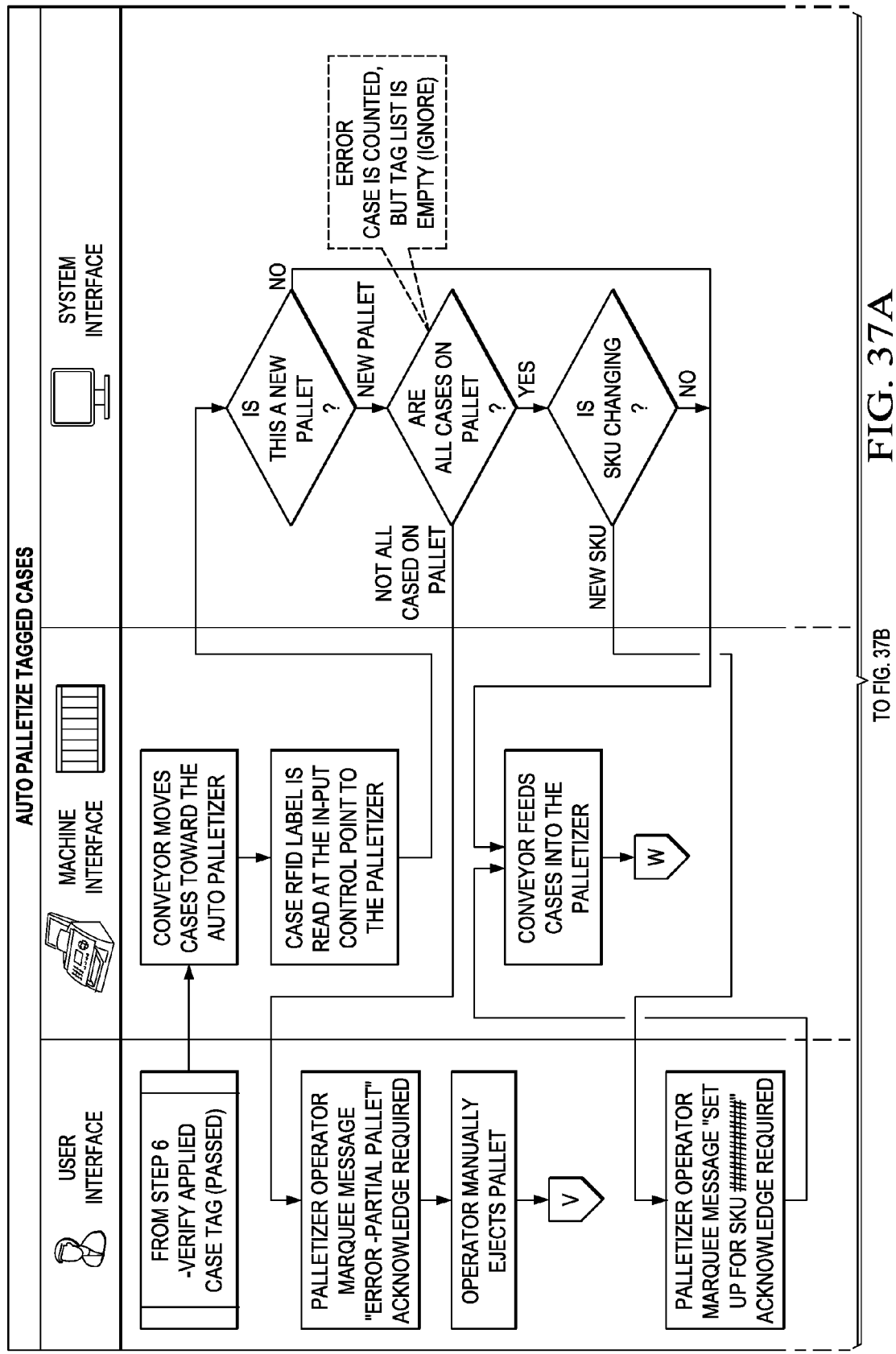
Figure 37B:
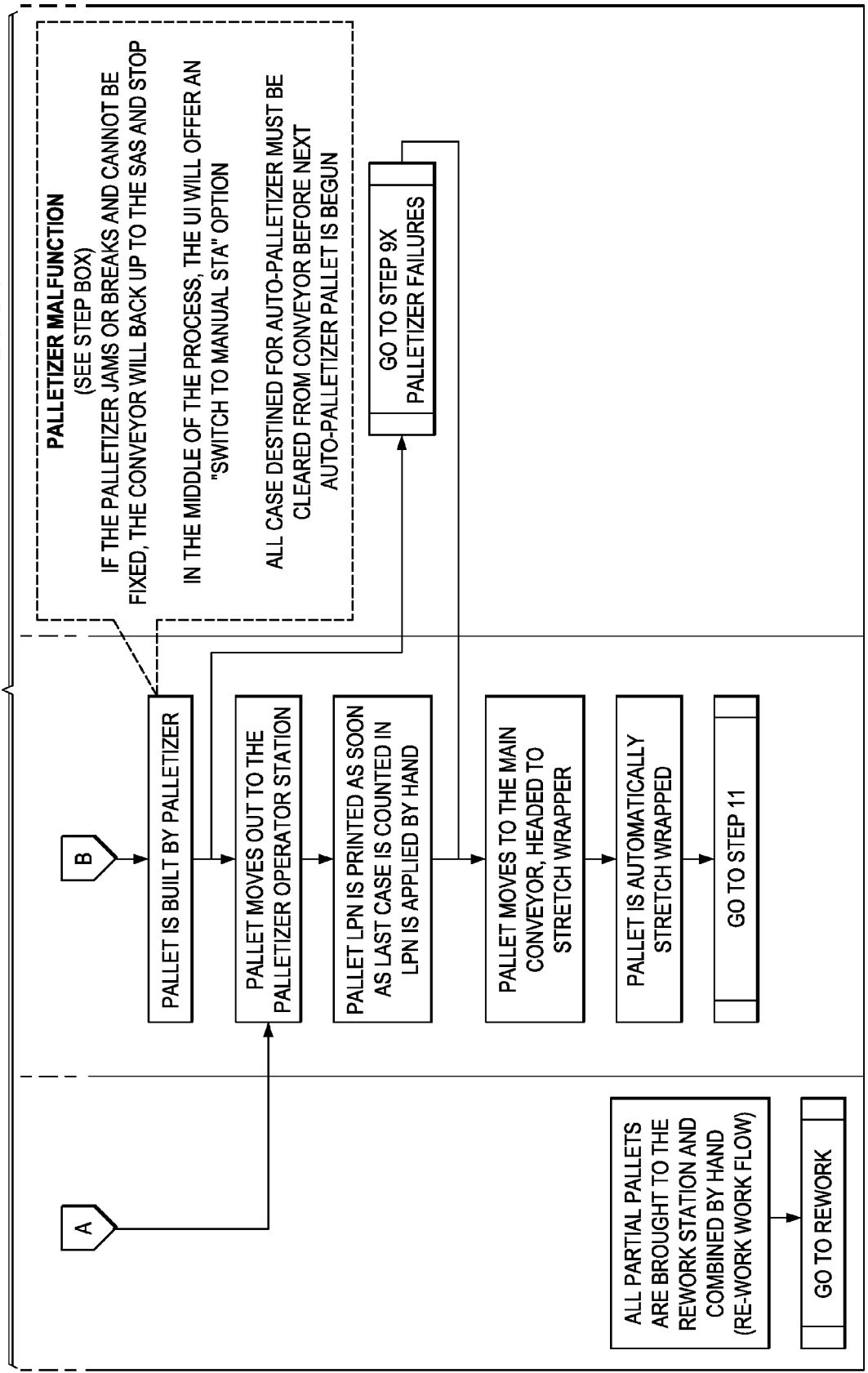
Figure 38A:
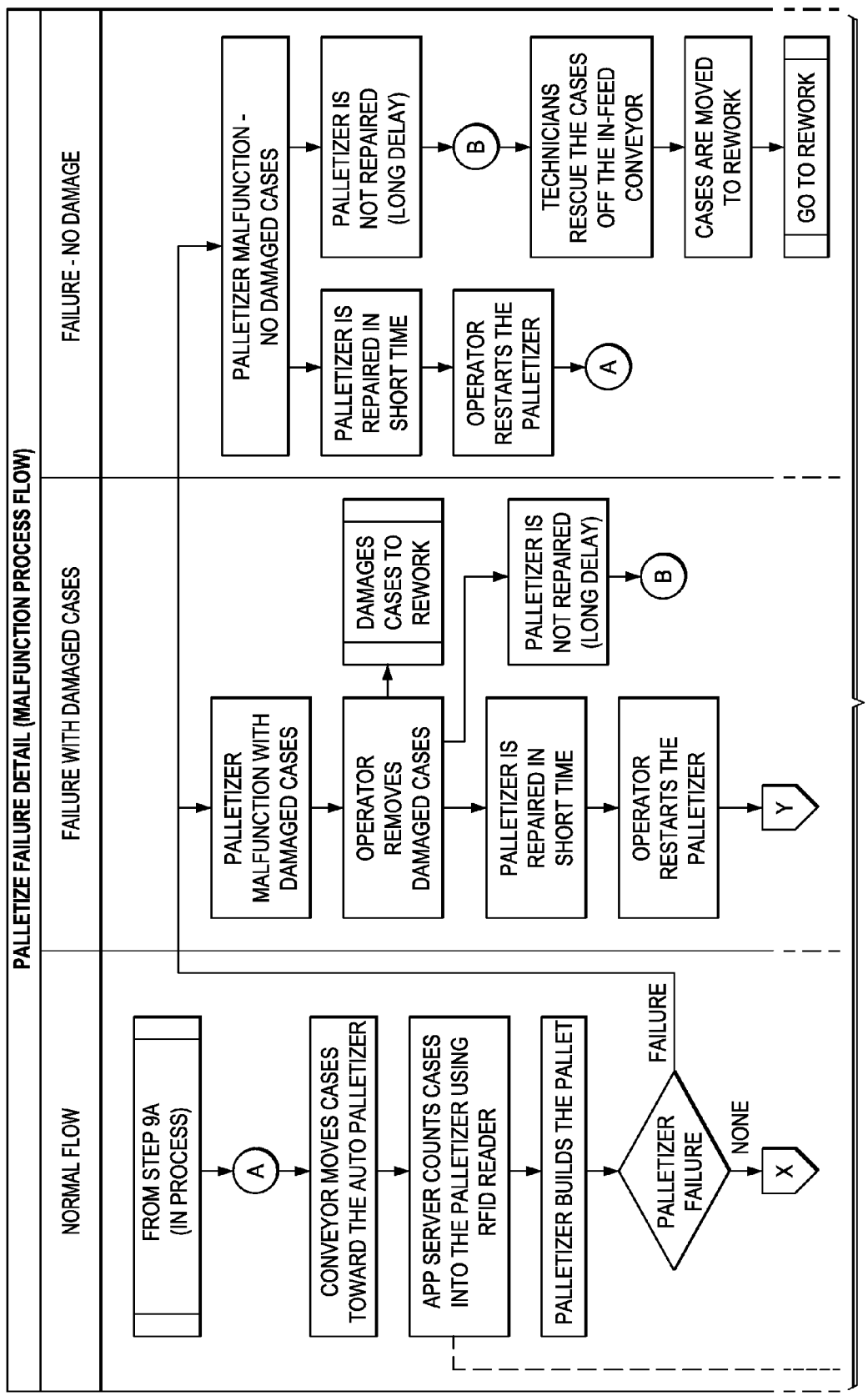
Figure 39A:
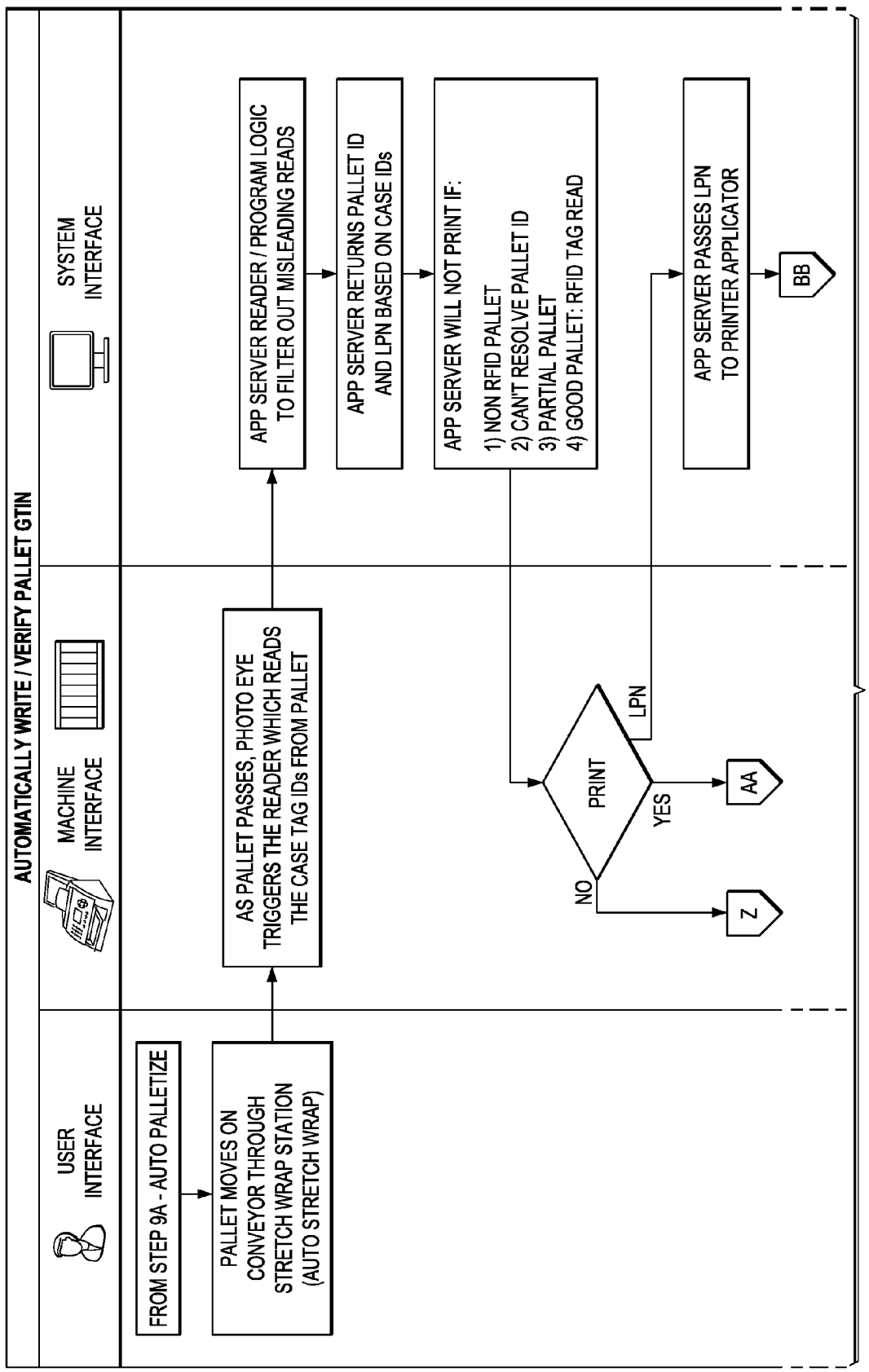
Figure 40:
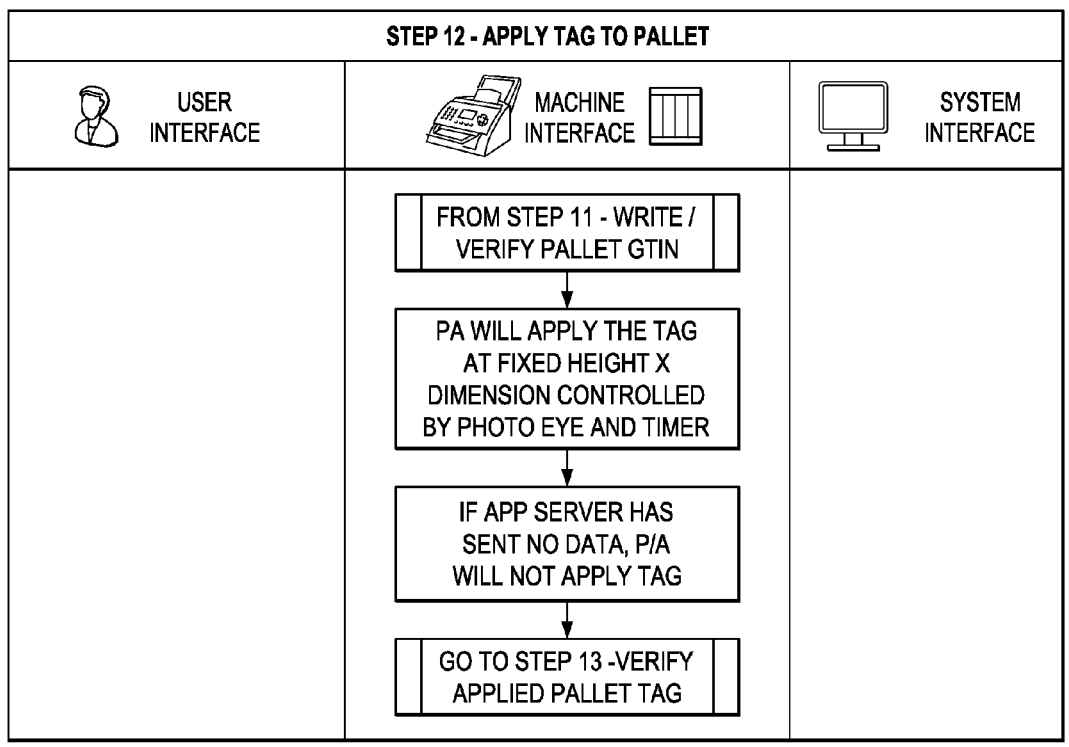
Figure 41:
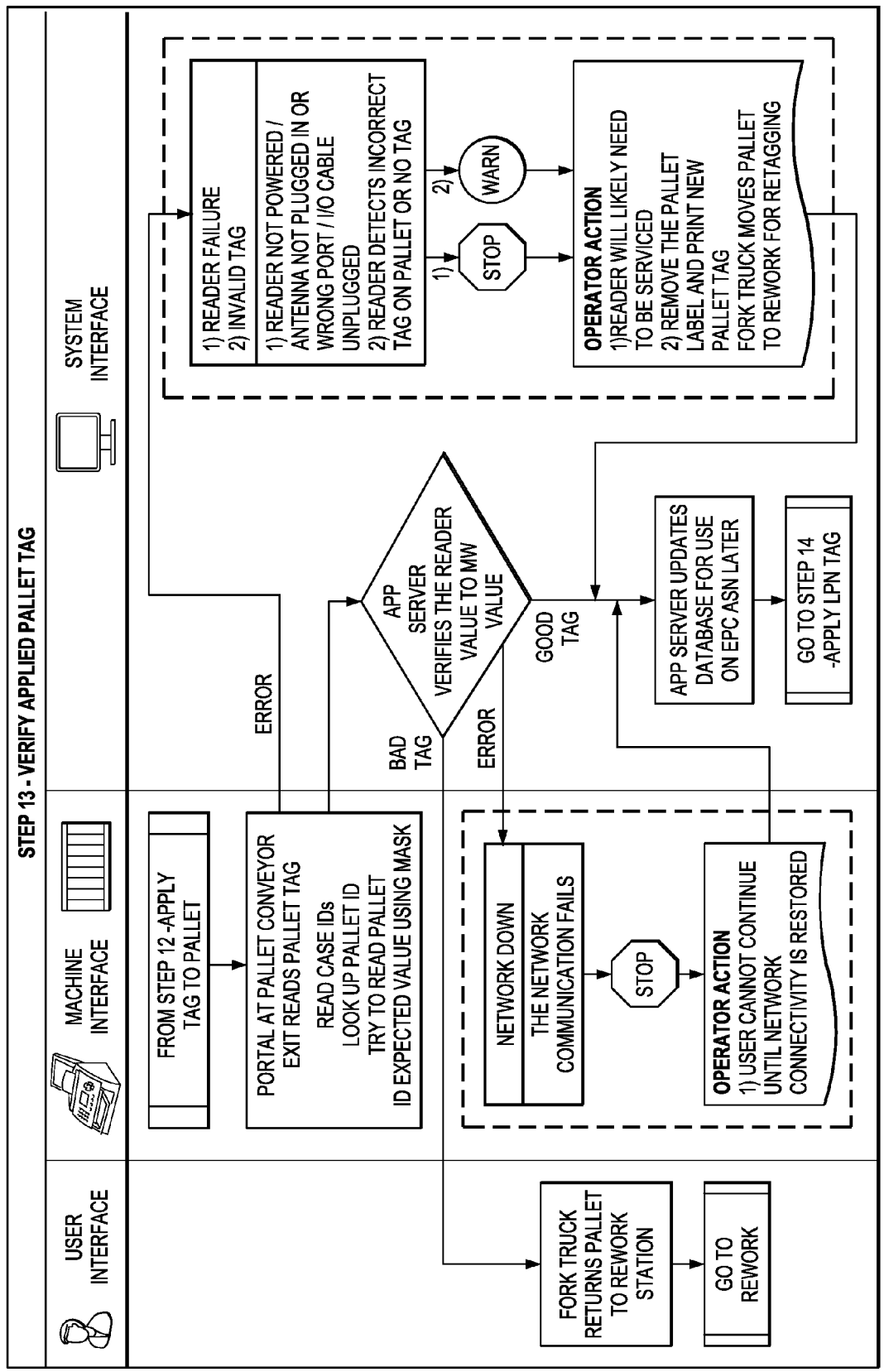
Figure 42:
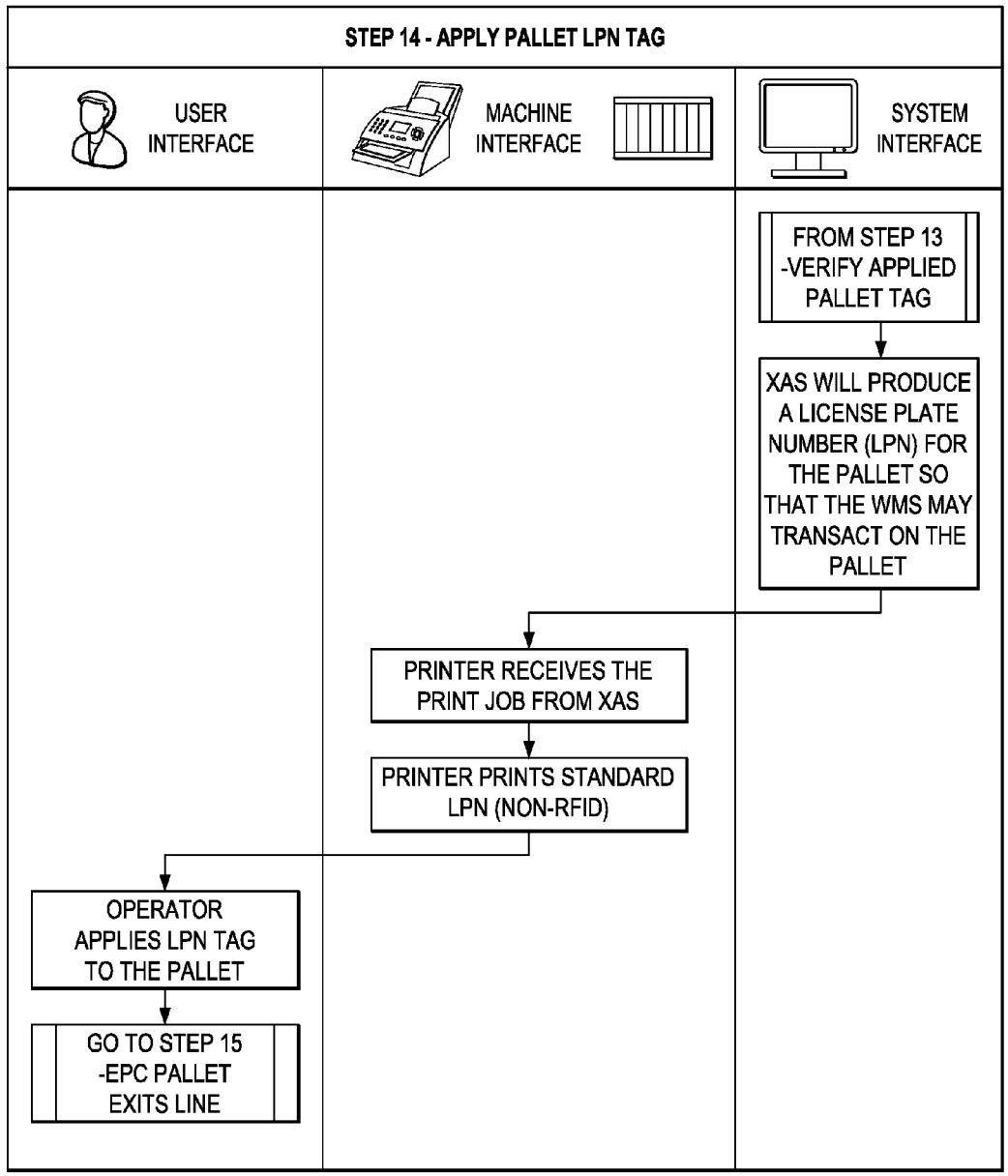
Figure 43:
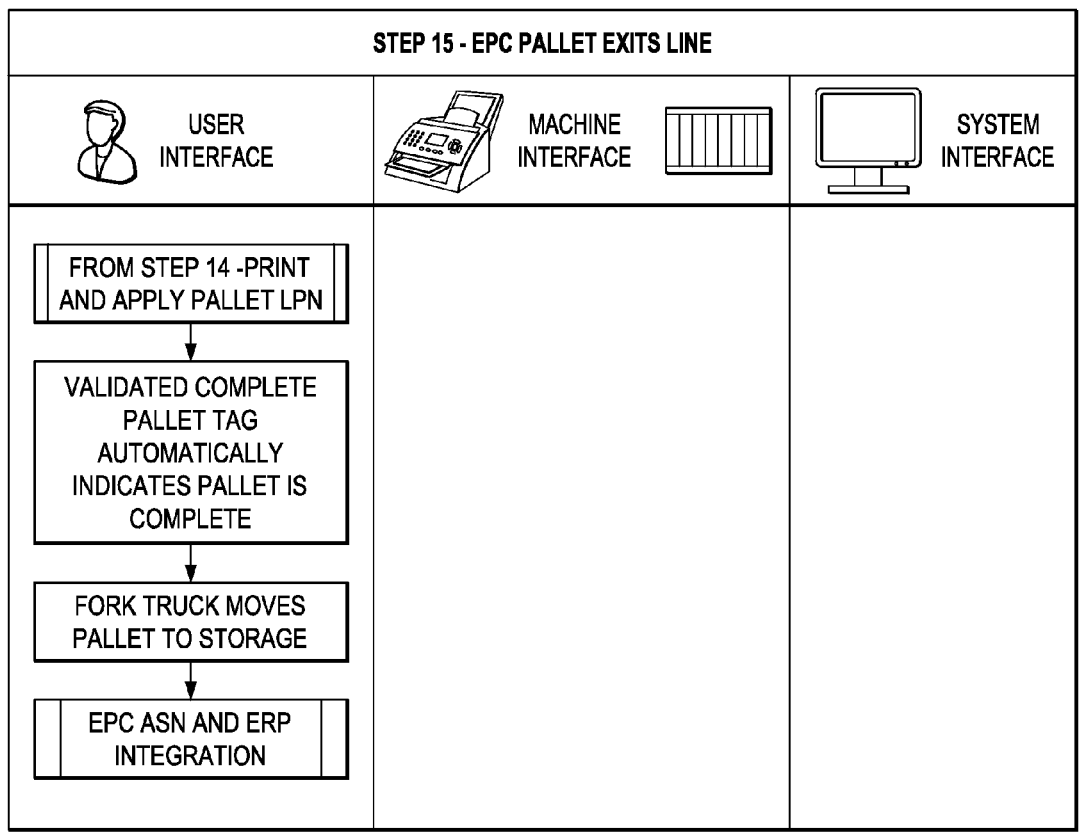

Turning now to FIGS. 27 to 43, illustrated are a system level diagram and flow diagrams of an embodiment of an RFID system including an embodiment of an RFID application system that demonstrate exemplary steps of operating the same in accordance with the principles of the present invention. For purposes of illustration, FIGS. 37, 38 and 39 have been divided into FIGS. 37A and 37B, 38A and 38B, and 39A and 39B, respectively. The aforementioned RFID system and steps of operating the same provide yet another exemplary method of operating the RFID application system. The figures assist in the understanding of a flow of information and goods therefor. As before, the illustrated embodiments provide specific examples associated with the RFID application system, and variations therefrom are well within the broad scope of the present invention. Also, the FIGUREs herein and accompanying description may use definitive language for the sake of specific examples. It should be understood that the definitive language may be replaced with permissive language in accordance with the principles of the present invention.

For a better understanding of RFID technologies, in general, see "RFID Handbook," by Klaus Finkenzeller, published by John Wiley & Sons, Ltd., 2$^{nd}$ edition (2003), which is incorporated herein by reference. For a better understanding of RFID tags in compliance with the EPC, see "Technical Report 860 MHz-930 MHz Class I Radio Frequency Identification Tag Radio Frequency & Logical Communication Interface Specification Candidate Recommendation," Version 1.0.1, November 2002, promulgated by the Auto-ID Center, Massachusetts Institute of Technology, 77 Massachusetts Avenue, Bldg 3-449, Cambridge Mass. 02139-4307, which is incorporated herein by reference. For a related application, see U.S. Patent Application Publication No. 2006/0212141, entitled "Radio Frequency Identification-Detect Ranking System and Method of Operating the Same," Abraham, Jr., et al., filed Feb. 24, 2006, which is incorporated herein by reference. For a better understanding of conventional RFID readers, see the following RFID readers, namely, "MP9320 UHF Long-Range Reader," provided by SAMSys Technologies, Inc. of Ontario, Canada, "MR-1824 Sentinel-Prox Medium Range Reader," by Applied Wireless ID of Monsey, N.Y. (see also U.S. Pat. No. 5,594,384 entitled "Enhanced Peak Detector," U.S. Pat. No. 6,377,176 entitled "Metal Compensated Radio Frequency Identification Reader," and U.S. Pat. No. 6,307,517 entitled "Metal Compensated Radio Frequency Identification Reader"), "2100 UAP Reader," provided by Intermec Technologies Corporation of Everett, Wash. and "ALR-9780 Reader," provided by Alien Technology Corporation of Morgan Hill, Calif. The aforementioned references, and all references herein, are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the systems, subsystems and methodologies discussed above can be implemented in different methodologies and replaced by other related systems and subsystems, or a combination thereof, to advantageously form an RFID application system for an RFID system as described herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A radio frequency identification (RFID) application system for use with an RFID system adapted to apply an RFID tag to a product, comprising:
   a printer applicator controller configured to manage an operation of a printer applicator of said RFID system;
   a compliance manager configured to coordinate RFID compliance data to derive a unique identification number for said RFID tag;
   an event manager configured to coordinate an operation of said printer applicator controller to facilitate proper placement of said RFID tag on said product; and
   a pallet configuration subsystem configured to direct a rebuilding of a pallet after depalletization.

2. The RFID application system as recited in claim 1 further comprising an interface configured to provide connectivity to external systems associated with said RFID system.

3. The RFID application system as recited in claim 1 further comprising an interface configured to provide connectivity to external systems associated with said RFID system and an electronic data interchange configured to provide RFID compliance data from a database of said RFID application system to said external systems via said interface.

4. The RFID application system as recited in claim 1 further comprising a configuration subsystem configured to setup systems of said RFID system.

5. The RFID application system as recited in claim 1 further comprising a workflow manager configured to derive workflow processes associated with said RFID system.

6. The RFID application system as recited in claim 1 further comprising a workflow manager configured to derive workflow processes associated with said RFID system, wherein said event manager is configured to coordinate said operation of said printer applicator controller as a function of said workflow processes.

7. The RFID application system as recited in claim 1 further comprising a conveyor controller configured to manage an operation of a conveyor of said RFID system employable with a manufacturing line associated with a supply chain management system.

8. The RFID application system as recited in claim 1 wherein said pallet configuration subsystem is configured to provide pictorial training diagrams to direct a rebuilding of said pallet.

9. The RFID application system as recited in claim 1 further comprising a database configured to store said RFID compliance data.

10. The RFID application system as recited in claim 1 further comprising a user interface configured to provide a graphical user interface with an operator of said RFID application system.

11. The RFID application system as recited in claim 1 wherein said RFID compliance data is selected in accordance with at least one of a license plate number, a standard and a product code.

12. The RFID application system as recited in claim 1 wherein said printer applicator controller is configured to employ Cartesian coordinates to facilitate proper placement of said RFID tag on said product.

13. The RFID application system as recited in claim 1 wherein said event manager is configured to coordinate an operation of an RFID reader of said RFID system to validate said RFID tag.

14. The RFID application system as recited in claim 1 wherein said RFID application system is at least partially embodied in a server of said RIFD system.

15. The RFID application system as recited in claim 1 wherein said printer application controller, said compliance manager and said event manager cooperate to facilitate proper placement of a replacement RFID tag on said product.

16. A method of operating a radio frequency identification (RFID) application system for use with an RFID system adapted to apply an RFID tag to a product, comprising:
- managing an operation of a printer applicator of said RFID system;
- deriving a unique identification number for said RFID tag from RFID compliance data;
- coordinating an operation of said printer applicator to facilitate proper placement of said RFID tag on said product; and
- directing a rebuilding of a pallet after depalletization.

17. The method as recited in claim 16 further comprising providing connectivity to external systems associated with said RFID system.

18. The method as recited in claim 16 further comprising providing connectivity to external systems associated with said RFID system and providing said RFID compliance data to said external systems.

19. The method as recited in claim 16 further comprising setting up systems of said RFID system.

20. The method as recited in claim 16 further comprising deriving workflow processes associated with said RFID system.

21. The method as recited in claim 16 further comprising deriving workflow processes associated with said RFID system and coordinating said operation of said printer applicator as a function thereof.

22. The method as recited in claim 16 further comprising managing an operation of a conveyor of said RFID system employable with a manufacturing line associated with a supply chain management system.

23. The method as recited in claim 16 wherein said directing said rebuilding of said pallet is performed in accordance with pictorial training diagrams.

24. The method as recited in claim 16 further comprising storing said RFID compliance data.

25. The method as recited in claim 16 further comprising providing a graphical user interface with an operator of said RFID application system.

26. The method as recited in claim 16 wherein said RFID compliance data is selected in accordance with at least one of a license plate number, a standard and a product code.

27. The method as recited in claim 16 wherein said coordinating said operation of said printer applicator further comprises employing Cartesian coordinates to facilitate proper placement of said RFID tag on said product.

28. The method as recited in claim 16 further comprising coordinating an operation of an RFID reader of said RFID system to validate said RFID tag.

29. The method as recited in claim 16 wherein said method is at least partially performed in a server of said RIFD system.

30. The method as recited in claim 16 further comprising coordinating an operation of said printer applicator to facilitate proper placement of a replacement RFID tag on said product.

\* \* \* \* \*

UNITED STATES PATENT AND TRADEMARK OFFICE
CERTIFICATE OF CORRECTION

| | |
|---|---|
| PATENT NO. | : 7,570,165 B2 |
| APPLICATION NO. | : 11/364675 |
| DATED | : August 4, 2009 |
| INVENTOR(S) | : Abraham, Jr. et al. |

It is certified that error appears in the above-identified patent and that said Letters Patent is hereby corrected as shown below:

In the drawings, Sheet 9, Fig. 11A, in the System Interface section, delete "RIFD" and insert --RFID--.
In the drawings, Sheet 10, Fig. 11B, in the $3^{rd}$ column, delete "INTIATES" and insert --INITIATES--.
In the drawings, Sheet 17, Fig. 14B, in the $1^{st}$ column, delete "WILL WILL" and insert --WILL--.
In the drawings, Sheet 19, Fig. 16, in the middle column, delete "PER-VERIFYING" and insert --PRE-VERIFYING--.
In the drawings, Sheet 26, Fig. 20B-2, in the $1^{st}$ column, after BROUGHT insert --TO--.
In the drawings, Sheet 26, Fig. 20B-2, in the last column, delete "DEATAIL" and insert --DETAIL--.
In the drawings, Sheet 50, Fig. 31, in the Machine Interface section, delete "PINTER" and insert --PRINTER--.
In the drawings, Sheet 54, Fig. 35, in the System Interface section, delete "MIDLEWARE" and insert --MIDDLEWARE--.
In the drawings, Sheet 56, Fig. 37A, in the System Interface section, delete "CASED" and insert --CASES--.
In the drawings, Sheet 57, Fig. 37B, in the $3^{rd}$ column, delete "CASE" and insert --CASES--.
In the drawings, Sheet 58, Fig. 38A, in the middle section, delete "DAMAGES" and insert --DAMAGED--.
In Col. 1, line 29, delete "An" and insert --an--.
In Col. 7, line 1, after also delete "in".
In Col. 8, line 63, delete "handing" and insert --handling--.
In Col. 14, line 10, after is insert --a--.

UNITED STATES PATENT AND TRADEMARK OFFICE
CERTIFICATE OF CORRECTION

PATENT NO. : 7,570,165 B2
APPLICATION NO. : 11/364675
DATED : August 4, 2009
INVENTOR(S) : Abraham, Jr. et al.

It is certified that error appears in the above-identified patent and that said Letters Patent is hereby corrected as shown below:

In Col. 15, line 44, after not delete "to".
In Col. 17, line 66, delete "skilled" and insert --skill--.
In Col. 19, line 7, claim 14, delete "RIFD" and insert --RFID--.
In Col. 20, line 28, claim 29, delete "RIFD" and insert --RFID--.

Signed and Sealed this

Sixth Day of October, 2009

David J. Kappos
*Director of the United States Patent and Trademark Office*